United States Patent
Putter et al.

(10) Patent No.: US 9,138,011 B2
(45) Date of Patent: Sep. 22, 2015

(54) TASTE-MASKING COMPOSITIONS, SWEETENER COMPOSITIONS AND CONSUMABLE PRODUCT COMPOSITIONS CONTAINING THE SAME

(71) Applicant: Nutrinova Nutrition Specialties & Food Ingredients GmbH, Sulzbach (DE)

(72) Inventors: Clemens M. Putter, Zeeland (NL); Johann Wonschik, Brevörde (DE)

(73) Assignee: Nutrinova Nutrition Specialist & Food Ingredients GmbH, Sulzbach (DE)

( * ) Notice: Subject to any disclaimer, the term of this patent is extended or adjusted under 35 U.S.C. 154(b) by 160 days.

(21) Appl. No.: 13/630,384

(22) Filed: Sep. 28, 2012

(65) Prior Publication Data
US 2014/0004244 A1     Jan. 2, 2014

Related U.S. Application Data

(60) Provisional application No. 61/664,887, filed on Jun. 27, 2012.

(30) Foreign Application Priority Data

Jun. 27, 2012   (EP) .................................. 12004804

(51) Int. Cl.
| | | |
|---|---|---|
| A23L 1/227 | (2006.01) | |
| A23L 1/053 | (2006.01) | |
| A23L 2/56 | (2006.01) | |
| A23L 2/60 | (2006.01) | |
| A23L 1/22 | (2006.01) | |
| A23L 1/236 | (2006.01) | |
| A23L 1/09 | (2006.01) | |
| A23G 1/32 | (2006.01) | |
| A23G 3/36 | (2006.01) | |
| A23G 4/06 | (2006.01) | |
| A23G 9/32 | (2006.01) | |

(52) U.S. Cl.
CPC . *A23L 1/053* (2013.01); *A23G 1/32* (2013.01); *A23G 3/36* (2013.01); *A23G 4/06* (2013.01); *A23G 9/32* (2013.01); *A23L 1/09* (2013.01); *A23L 1/095* (2013.01); *A23L 1/097* (2013.01); *A23L 1/22075* (2013.01); *A23L 1/22083* (2013.01); *A23L 1/22091* (2013.01); *A23L 1/236* (2013.01); *A23L 1/2361* (2013.01); *A23L 1/2363* (2013.01); *A23L 1/2364* (2013.01); *A23L 1/2365* (2013.01); *A23L 1/2367* (2013.01); *A23L 1/2369* (2013.01); *A23L 2/56* (2013.01); *A23L 2/60* (2013.01); *A23V 2002/00* (2013.01)

(58) Field of Classification Search
CPC ........... A23V 2200/15; A23V 2200/16; A23V 2250/06; A23V 2250/5028; A23V 2250/5114; A23L 1/097; A23L 1/2075; A23L 1/22083

USPC .................................................. 426/534, 548
See application file for complete search history.

(56) References Cited

U.S. PATENT DOCUMENTS

| | | |
|---|---|---|
| 3,924,017 A | 12/1975 | Lee et al. |
| 3,934,047 A | 1/1976 | Schade |
| T104,004 I4 | 3/1984 | Von Rymon Lipinski |
| 4,495,170 A | 1/1985 | Beyts et al. |
| 6,019,851 A * | 2/2000 | Pittet et al. ........................ 127/2 |
| 6,242,029 B1 * | 6/2001 | Pittet et al. .................... 426/533 |
| 2002/0177576 A1 | 11/2002 | McGregor et al. |
| 2004/0142084 A1 | 7/2004 | Knueven |
| 2007/0116819 A1 * | 5/2007 | Prakash et al. ................ 426/548 |
| 2008/0107775 A1 | 5/2008 | Prakash et al. |
| 2008/0107776 A1 | 5/2008 | Prakash et al. |
| 2008/0107787 A1 | 5/2008 | Prakash et al. |
| 2008/0108710 A1 | 5/2008 | Prakash et al. |
| 2008/0226789 A1 | 9/2008 | Roy et al. |
| 2008/0292765 A1 | 11/2008 | Prakash et al. |
| 2009/0004360 A1 * | 1/2009 | Bingley et al. ................ 426/590 |
| 2009/0124701 A1 * | 5/2009 | Langer et al. ................. 514/627 |
| 2010/0112138 A1 | 5/2010 | Roy et al. |
| 2011/0293538 A1 | 12/2011 | Ley et al. |
| 2013/0136836 A1 | 5/2013 | Putter et al. |
| 2013/0136839 A1 | 5/2013 | Putter et al. |

FOREIGN PATENT DOCUMENTS

| | | |
|---|---|---|
| GB | 1477292 | 6/1977 |
| JP | 2000-270804 | 10/2000 |
| WO | WO 2006/072921 | 7/2006 |

OTHER PUBLICATIONS

Burdock, G.A. 2005. Fenaroli's handbook of flavor ingredients. 5th Ed. CRC Press. Boca Raton, FL. pp. 881-882.*
PCT International Search Report for application PCT/EP2012/004079 dated May 2013.*
Burdock, G.A. 2005. Fenaroli's handbook of flavor ingredients. 5th Ed. CRC Press. Boca Raton, FL. pp. 883-884.*
Extended European Search Report for EP Appl. No. 12004804.6-2114 dated Oct. 8, 2012.
Office Action for U.S. Appl. No. 13/630,254 dated Aug. 14, 2014.
Office Action for U.S. Appl. No. 13/630,341 dated Sep. 3, 2014.
Office Action for U.S. Appl. No. 13/630,254 dated Dec. 9, 2014.

* cited by examiner

*Primary Examiner* — Nikki H Dees

(57) ABSTRACT

The present invention relates to novel compositions X comprising following substances:
(1) L-valine;
(2) maltol;
(3) naringin;
(4) maltodextrine MD 14
(5) arabicgum (spraygum);
(6) acetoin;
(7) delta dodecalactone;
(8) delta decalactone; and
(9) massoia lactone.

22 Claims, No Drawings

TASTE-MASKING COMPOSITIONS, SWEETENER COMPOSITIONS AND CONSUMABLE PRODUCT COMPOSITIONS CONTAINING THE SAME

CROSS REFERENCE TO RELATED APPLICATIONS

This application claims priority to U.S. Provisional Application No. 61/664,887 filed on Jun. 27, 2012, and European Application No. 12 004 804.6 filed on Jun. 27, 2012. These applications are incorporated by reference herein.

FIELD OF THE INVENTION

The present invention relates to novel compositions X comprising following substances:
(1) L-valine;
(2) maltol;
(3) naringin;
(4) maltodextrine MD 14
(5) arabicgum (spraygum);
(6) acetoin;
(7) delta dodecalactone;
(8) delta decalactone; and
(9) massoia lactone;
to the use of the compositions X for modifying, masking, reducing and/or suppressing an unpleasant off-taste, aftertaste or lingering sweetness of at least one sweetener, sweetness enhancer or consumable product; and to a process for the preparation of the compositions X. Further, the invention relates to sweetener compositions comprising at least one sweetener and the novel compositions X; to a method of providing sweetener or sweetness enhancer compositions; to methods of modifying, masking, reducing and/or suppressing an unpleasant off-taste, aftertaste or lingering sweetness of at least one sweetener or sweetness enhancer; and to tabletop sweetener compositions comprising the novel compositions X. The invention also relates to consumable product compositions comprising a consumable product and the novel compositions X; to methods of modifying, masking, reducing and/or suppressing an unpleasant off-taste, aftertaste or lingering sweetness of a consumable product composition; and to methods of imparting rich taste to a consumable product.

BACKGROUND OF THE INVENTION

Consumable products with a high content of sugar(s), e.g., sucrose (saccharose), glucose, fructose and/or mixtures thereof, are generally afforded much greater preference by consumers due to their sweetness. However, it is commonly known that a high content of sugar(s) can greatly increase the blood sugar level, lead to the formation of fatty deposits and ultimately result in health problems such as childhood obesity, type II diabetes, and related illnesses. Therefore, it has long been an aim to reduce the sugar content of consumable products to the absolute minimum necessary. One way to reduce sugar content is to replace at least a portion of the sugar(s) with one or more non-caloric high-intensity sweeteners. These non-caloric sweeteners provide sweetnesses significantly higher than those of conventional sweeteners, e.g., sugars such as sucrose or high-fructose corn syrup (HFCS).

However, unlike conventional sugars, many of the non-caloric or low-caloric sweeteners have unpleasant taste features, e.g., off-tastes, aftertastes and/or lingering sweetness. These off-tastes, aftertastes and/or lingering sweetnesses negatively affect the overall flavor of the respective consumable product to which they are added. For example, sucralose, stevioside and cyclamate contribute to negative time-intensity profiles. As another example, acesulfame potassium, saccharin and stevioside, produce a bitter and/or astringent aftertaste. As another example, neotame produces a bitter and metallic off-taste. As another example, glycyrrhinzinic acid ammonium salt produces marked additional aroma impression. Also, some sweeteners, e.g., brazzein, monellin, thaumatin, are not particularly stable under heat. Others, e.g., aspartame, are not stable in all applications. As another example, saccharin may have a very long-lasting sweetening effect, e.g., a lingering sweetness.

Steviol glycosides occur naturally in Stevia spp. or Rubus spp. Examples of these include dulcoside, rebaudiosides A-H, rubusoside, stevioside, suaviosides A, B and G-J. Steviol glycosides are very good sweeteners, but, when used in concentrations necessary for an adequate sweetening effect, steviol glycosides often exhibit a liquorice-like and/or bitter and/or astringent taste impression. Further unpleasant taste impressions may also be observed, e.g., a long-lasting aftertaste or a sweetener like taste profile.

In particular, when used in beverages, e.g., sweet, calorie-free or very low calorie drinks, such sweeteners may exhibit unpleasant secondary taste impressions and/or aftertastes and may lower the sensory acceptance. As such, these negative taste features often require taste masking.

Some taste-masking substances are known. Although many conventional taste-masking substances may partially modify, mask, reduce and/or suppress unpleasant taste features of specific sweeteners or sweetness enhancers, many taste-masking substances are severely limited in their application.

For example, US 2004/0142084 A1 describes alkaline metal hydrogen sulphates as masking agents. One disadvantage of these sulphates is that they considerably increase the acid content in the consumable product.

As another example, U.S. Pat. No. 3,924,017 discloses the use of caffeic acid as masking agent. As is known in the art, one disadvantage of using caffeic acid is that caffeic acid itself has a slightly bitter taste and easily suppresses the sweetness, so that more sweetener would have to be used.

Further, US 2002/0177576 A1 describes the suppression of a bitter taste by nucleotides, for example cytidine 5'-monophosphates (CMPs). The disadvantage of using CMPs is that the strongly polar compounds can only be used in strongly polar solvents. Therefore, CMPs can be used to only a very limited degree in many fat-containing consumable products. Furthermore, the availability of CMPs is severely limited because of their expensive chemical synthesis.

Thus, there is a need for further taste-masking compositions that can modify, mask, reduce and/or suppress unpleasant taste features left by sweeteners or sweetness enhancers without demonstrating the disadvantages of known taste-masking substances.

SUMMARY OF THE INVENTION

The present invention in one aspect, relates to a composition X comprising the following substances:
(1) L-valin;
(2) maltol;
(3) naringin;
(4) maltodextrine MD 14
(5) arabicgum (spraygum);
(6) acetoin;
(7) delta dodecalactone;
(8) delta decalactone; and
(9) massoia lactone.

In one embodiment, the composition X further comprises the following substance:
(10) diacetyl.

In one embodiment, at least one of the substances (1) to (10) is of natural origin.

In one embodiment, all of the substances (1) to (10) are of natural origin.

In a further embodiment, all of the substances (1) to (10) apart from substances (4) and (5) are of natural origin.

In one embodiment, massoia lactone (9) is (R)-5,6-dihydro-6-pentyl-2H-pyran-2-one.

In one embodiment, the substance (1) is present in the composition X in an amount ranging from 0.01 wt % to 0.09 wt %.

In one embodiment, the substance (2) is present in the composition X in an amount ranging from 30 wt % to 80 wt %.

In one embodiment, the substance (3) is present in the composition X in an amount ranging from 15 wt % to 55 wt %.

In one embodiment, the substance (4) is present in the composition X in an amount ranging from 0.5 wt % to 15.0 wt %.

In one embodiment, the substance (5) is present in the composition X in an amount ranging from 0.6 wt % to 5.0 wt %.

In one embodiment, the substance (6) is present in the composition X in an amount ranging from 0.005 wt % to 0.09 wt %.

In one embodiment, the substance (7) is present in the composition X in an amount ranging from 0.5 wt % to 1.5 wt %.

In one embodiment, the substance (8) is present in the composition X in an amount ranging from 0.06 wt % to 0.6 wt %.

In one embodiment, the substance (9) is present in the composition X in an amount ranging from 0.06 wt % to 0.7 wt %.

In one embodiment, the substance (10) is present in the composition X in an amount ranging from 0.0005 wt % to 0.009 wt %.

In one embodiment, the composition X further comprises at least one additional substance.

In one embodiment, the additional substances are:
(11) L-alanine;
(12) L-leucine;
(13) glycine;
(14) L-aspartic acid;
(15) L-threonine;
(16) L-isoleucine;
(17) L-tyrosine;
(18) L-proline;
(19) L-serine;
(20) L-glutamic acid;
(21) taurine;
(22) syringaldehyde;
(23) delta undecalactone;
(24) whiskey lactone; and
(25) delta tetradecalactone.

In one embodiment, whiskey lactone (24) is a mixture of cis-3-methyl-4-octanolide (cis-whiskey lactone) and trans-3-methyl-4-octanolide (trans-whiskey lactone).

In one embodiment, at least one of the substances (11) to (25) is of natural origin.

In one embodiment, all of the substances (11) to (25) are of natural origin.

The invention, in another aspect, relates to a process for the preparation of a composition X as defined above comprising admixing the substances (1) to (10).

The present invention, in another aspect, relates to a sweetener composition, comprising
(a) at least one sweetener; and
(b) a composition X as defined above.

In one embodiment, the invention relates to a solution, e.g., a taste modifying solution, comprising a solvent and the composition X. Preferably, the solvent is or may include water or another polar solvent. Furthermore, the solvent may be or may include consumable organic solvent and/or a consumable inorganic solvent. Furthermore, the solvent, in particular water, may comprise one or more buffers like Tris/HCl, HEPES and the like.

In one embodiment, the at least one sweetener is selected from the group consisting of abiziasaponin, abrusosides, in particular abrusoside A, abrusoside B, abrusoside C, abrusoside D, acesulfame potassium, advantame, albiziasaponin, alitame, aspartame, superaspartame, bayunosides, in particular bayunoside 1, bayunoside 2, brazzein, bryoside, bryonoside, bryonodulcoside, carnosifloside, carrelame, curculin, cyanin, chlorogenic acid, cyclamates and its salts, cyclocaryoside I, dihydroquercetin-3-acetate, dihydroflavenol, dulcoside, gaudichaudioside, glycyrrhizin, glycyrrhetin acid, gypenoside, hematoxylin, hernandulcin, isomogrosides, in particular iso-mogroside V, lugduname, magap, mabinlins, micraculin, mogrosides (lo han guo), in particular mogroside IV and mogroside V, monatin and its derivatives, monellin, mukurozioside, naringin dihydrochalcone (NarDHC), neohesperidin dihydrochalcone (NDHC), neotame, osladin, pentadin, periandrin I-V, perillartine, D-phenylalanine, phlomisosides, in particular phlomisoside 1, phlomisoside 2, phlomisoside 3, phlomisoside 4, phloridzin, phyllodulcin, polpodiosides, polypodoside A, pterocaryosides, rebaudiosides, in particular rebaudioside A, rebaudioside B, rebaudioside C, rebaudioside D, rebaudioside F, rebaudioside G, rebaudioside H), rubusosides, saccharin and its salts and derivatives, scandenoside, selligueanin A, siamenosides, in particular siamenoside I, stevia, steviolbioside, stevioside and other steviol glycosides, strogines, in particular strogin 1, strogin 2, strogin 4, suavioside A, suavioside B, suavioside G, suavioside H, suavioside I, suavioside J, sucralose, sucronate, sucrooctate, talin, telosmoside $A_{15}$, thaumatin, in particular thaumatin I and II, trans-anethol, trans-cinnamaldehyde, trilobtain and D-tryptophane, including extracts or enriched fractions of the natural sweeteners.

In one embodiment, the at least one sweetener is selected from the group consisting of acesulfame potassium, aspartame, sucralose and thaumatin.

In one embodiment, the at least one sweetener comprises acesulfame potassium.

In one embodiment, the at least one sweetener comprises acesulfame potassium and sucralose.

In one embodiment, the at least one sweetener comprises acesulfame potassium and thaumatin.

In one embodiment, the amount of the substances (1) to (10) in the sweetener composition is below their respective taste threshold concentration.

In one embodiment, the sweetener composition comprises from 80 wt % to 99.5 wt % of the at least one sweetener based on the total weight of the sweetener composition.

In one embodiment, the sweetener composition comprises from 0.5 wt % to 20 wt % of the composition X as defined above based on the total weight of the sweetener composition.

In one embodiment, the sweetener composition comprises at least one additional sweetener.

Preferably, the at least one additional sweetener is selected from the group consisting of erythritol, galactitol, hydrogenated starch syrups, maltitol and sorbitol syrups, inositols, isomalt, lactitol, maltitol, mannitol, xylitol, arabinose, dextrin, dextrose, fructose, high fructose corn syrup, fructooligosaccharides, fructooligosaccharide syrups, galactose, galactooligosaccharides, glucose, glucose and (hydrogenated) starch syrups/hydrolysates, isomaltulose, lactose, hydrolysed lactose, maltose, mannose, rhamnose, ribose, sucrose, tagatose, trehalose, xylose, and combinations thereof.

In one embodiment, the at least one additional sweetener is a caloric sweetener.

In one embodiment, the at least one additional sweetener is a non-caloric sweetener.

In one embodiment, the sweetener composition further comprises at least one sweetness enhancer.

In one embodiment, the sweetener composition comprises the composition X as defined above in an amount effective to modify, mask, reduce and/or suppress an unpleasant off-taste, aftertaste or lingering sweetness of the at least one sweetener or the at least one sweetness enhancer, wherein the amount of the composition X in the sweetener composition is less than a taste threshold concentration associated with the composition X and wherein the effect of the composition X remains at least as long as the taste of the at least one sweetener or the at least one sweetness enhancer is perceived.

Preferably, the unpleasant off-taste of the sweetener or the sweetness enhancer is an acidic off-taste, an astringent off-taste, a bitter off-taste, a liquorice off-taste, a metallic off-taste or a throat-burning off-taste.

Preferably, the unpleasant aftertaste of the sweetener or the sweetness enhancer is an astringent or bitter aftertaste.

In one embodiment, the sweetener composition is a liquid at ambient conditions.

In one embodiment, the sweetener composition is a solid at ambient conditions.

In one embodiment, the sweetener composition further comprises an additional component selected from the group consisting of dust control agents, in particular glycerol, bubble forming agents, surfactants, emulsifiers, salts, fats, gums, and hydrocolloids, bulking agents, carriers, fibers, at least one additional flavoring ingredient, flavor enhancers, flavor stabilizers, acidulants, anti-caking and free-flow agents.

The invention, in another aspect, relates to a method of modifying, masking, reducing and/or suppressing the unpleasant off-taste, aftertaste or lingering sweetness of at least one sweetener or sweetness enhancer, the method comprising combining the composition X as defined above with the at least one sweetener or sweetness enhancer.

In one embodiment, the method comprises modifying, masking, reducing and/or suppressing the unpleasant off-taste, aftertaste or lingering sweetness of at least one sweetener or at least one sweetness enhancer, the method comprising combining an amount of the composition X as defined above effective to modify, mask, reduce and/or suppress an unpleasant off-taste, aftertaste or lingering sweetness of the at least one sweetener or the at least one sweetness enhancer with the at least one sweetener or at least one sweetness enhancer, wherein the amount of the composition X in the sweetener composition is less than a taste threshold concentration associated with the composition X and wherein the effect of the composition X remains at least as long as the taste of the at least one sweetener or the at least one sweetness enhancer is perceived.

In one embodiment, the at least one sweetener used in said method is selected from the group consisting of abiziasaponin, abrusosides, in particular abrusoside A, abrusoside B, abrusoside C, abrusoside D, acesulfame potassium, advantame, albiziasaponin, alitame, aspartame, superaspartame, bayunosides, in particular bayunoside 1, bayunoside 2, brazzein, bryoside, bryonoside, bryonodulcoside, carnosifloside, carrelame, curculin, cyanin, chlorogenic acid, cyclamates and its salts, cyclocaryoside I, dihydroquercetin-3-acetate, dihydroflavenol, dulcoside, gaudichaudioside, glycyrrhizin, glycyrrhetin acid, gypenoside, hematoxylin, hernandulcin, isomogrosides, in particular iso-mogroside V, lugduname, magap, mabinlins, micraculin, mogrosides (lo han guo), in particular mogroside IV and mogroside V, monatin and its derivatives, monellin, mukurozioside, naringin dihydrochalcone (NarDHC), neohesperidin dihydrochalcone (NDHC), neotame, osladin, pentadin, periandrin I-V, perillartine, D-phenylalanine, phlomisosides, in particular phlomisoside 1, phlomisoside 2, phlomisoside 3, phlomisoside 4, phloridzin, phyllodulcin, polpodiosides, polypodoside A, pterocaryosides, rebaudiosides, in particular rebaudioside A, rebaudioside B, rebaudioside C, rebaudioside D, rebaudioside F, rebaudioside G, rebaudioside H), rubusosides, saccharin and its salts and derivatives, scandenoside, selligueanin A, siamenosides, in particular siamenoside I, stevia, steviolbioside, stevioside and other steviol glycosides, strogines, in particular strogin 1, strogin 2, strogin 4, suavioside A, suavioside B, suavioside G, suavioside H, suavioside I, suavioside J, sucralose, sucronate, sucrooctate, talin, telosmoside $A_{15}$, thaumatin, in particular thaumatin I and II, trans-anethol, trans-cinnamaldehyde, trilobtain and D-tryptophane, including extracts or enriched fractions of the natural sweeteners.

In one embodiment, in said method, the at least one sweetener is selected from the group consisting of acesulfame potassium, aspartame, sucralose and thaumatin.

In one aspect, the invention relates to a tabletop sweetener composition comprising
(a) at least one sugar sweetener, which is selected from the group consisting of monosaccharides, disaccharides, oligosaccharides and polysaccharides, preferably the at least one sugar sweetener is selected from the group consisting of arabinose, dextrin, dextrose, fructose, high fructose corn syrup, fructooligosaccharides, fructooligosaccharide syrups, galactose, galactooligosaccharides, glucose, glucose and (hydrogenated) starch syrups/hydrolysates, isomaltulose, lactose, hydrolysed lactose, maltose, mannose, rhamnose, ribose, sucrose, stachyose, tagatose, trehalose, xylose, and combinations thereof, most preferably the at least one sugar sweetener is a disaccharide and/or fructose;
(b) at least one sugar alcohol (or polyol), which is selected from the group consisting of erythritol, galactitol, hydrogenated starch syrups including maltitol and sorbitol syrups, inositols, isomalt, lactitol, maltitol, mannitol, xylitol, and combinations thereof, preferably the at least one sugar alcohol is erythritol;
(c) at least one sweetener as defined above; and
(d) an amount of a composition X as defined above.

Preferably, in said tabletop sweetener, the at least one sweetener is selected from the group consisting of acesulfame potassium, aspartame, sucralose and thaumatin.

In one embodiment, the tabletop sweetener composition further comprises a taste-improving amount of cellulose.

In one embodiment, the tabletop sweetener composition comprises from 40 wt % to 90 wt % sugar alcohol based on the total weight of the tabletop sweetener composition.

In one embodiment, the tabletop sweetener composition comprises from 27 wt % to 50 wt % sugar sweetener based on the total weight of the tabletop sweetener composition.

In one embodiment, the tabletop sweetener composition comprises from 0.5 wt % to 7.0 wt % acesulfame potassium, aspartame, sucralose or thaumatin.

In one embodiment, the tabletop sweetener composition comprises from 0.5 wt % to 20 wt % of the composition X as defined above.

In one embodiment, the tabletop sweetener composition comprises the composition X as defined above in an amount effective to modify, mask, reduce and/or suppress an unpleasant off-taste or aftertaste of acesulfame potassium, aspartame, sucralose and thaumatin, wherein the amount is less than a taste threshold concentration associated with the composition.

Preferably, the effect of the composition X remains at least as long as the taste of the sugar sweetener, the sugar alcohol and the at least one sweetener are perceived.

In one aspect, the invention relates to a consumable product composition comprising
(a) a consumable product; and
(b) a composition X as defined above.

Consumable product composition comprising
(a) a consumable product; and
(b) a sweetener composition as defined above.

Consumable product composition comprising
(a) a consumable product; and
(b) a tabletop sweetener composition as defined above.

In one embodiment, the consumable product is selected from water-based consumables, solid dry consumables, dairy products, dairy-derived products and dairy-alternative products.

In one embodiment, the consumable product is a water-based consumable product selected from the group consisting of beverage, water, near water drink, aqueous beverage, enhanced/slightly sweetened water drink, flavored carbonated and still mineral and table water, non-carbonated beverage, carbonated water, still water, soft drink, carbonated soft drink, non-alcoholic drink, alcoholic drink, beer, wine, liquor, fruit drink, juice drink, juice, fruit juice, vegetable juice, nectar, broth drink, coffee, tea, black tea, green tea, oolong tea, herbal infusion, cacao (water-based), tea-based drink, coffee-based drinks, cacao-based drink, dessert, syrup, frozen fruit, frozen fruit juice, water-based ice, fruit ice, sorbet, dressing, salad dressing, jams, marmalades, canned fruit, savoury, delicatessen products like delicatessen salads, sauces, ketchup, mustard, pickles and marinated fish, sauce, soup, and beverage botanical materials (whole or ground), or instant powder for reconstitution (coffee beans, ground coffee, instant coffee, cacao beans, cacao powder, instant cacao, tea leaves, instant tea powder).

In one embodiment, the consumable product is a solid dry consumable product selected from the group consisting of cereals, baked food products, biscuits, bread, breakfast cereal, cereal bar, energy bars/nutritional bars, granola, cakes, rice cakes, cookies, crackers, donuts, muffins, pastries, confectioneries, chewing gum, chocolate products, chocolates, fondant, candy, hard candy, marshmallow, pressed tablets, snack foods, botanical materials (whole or ground), and instant powders for reconstitution.

In one embodiment, the consumable product is a dairy product, dairy-derived product and/or dairy-alternative product selected from the group consisting of milk, fluid milk, cultured milk product, cultured and noncultured dairy-based drink, cultured milk product cultured with lactobacillus, yoghurt, yoghurt-based beverage, smoothy, lassi, milk shake, acidified milk, acidified milk beverage, butter milk, kefir, milk-based beverages, milk/juice blend, fermented milk beverage, icecream, dessert, sour cream, dip, salad dressing, cottage cheese, frozen yoghurt, soy milk, rice milk, soy drink, and rice milk drink.

In one embodiment, wherein the consumable product is a beverage, in particular a near water drink, a carbonated beverage, in particular a carbonated soft drink, a juice drink, nectar, or a tea-based drink.

In one embodiment, the consumable product is a dental product selected from the group consisting of toothpaste, dental floss, mouthwash, denture adhesive, enamel whitener, fluoride treatments and oral care gels, preferably toothpaste.

In one embodiment, the consumable product is a cosmetic product selected from the group consisting of lipstick, lip balm, lip gloss and petroleum jelly.

In one embodiment, the consumable product is a pharmaceutical product selected from the group consisting of over-the-counter and prescription drugs, non-tobacco snuff, tobacco substitutes, chewable medications, cough syrups, throat sprays, throat lozenges, cough drops, antibacterial products, pill coatings, gel caplets, soluble fiber preparations, antacids, tablet cores, rapidly absorbed liquid compositions, stable foam compositions, rapidly disintegrating pharmaceutical dosage forms, beverage concentrates for medicinal purposes, aqueous pharmaceutical suspensions, liquid concentrate compositions, and stabilized sorbic acid solutions, phosphate buffers, saline solutions, emulsion, non-aqueous pharmaceutical solvents, aqueous pharmaceutical carriers, solid pharmaceutical carrier, and pharmaceutical preservatives/additives (antimicrobials, antioxidants, chelating agents, inert gases, additional flavoring agents, coloring agents).

In one embodiment, the consumable product is an animal feed or animal food.

In one embodiment, the composition X as defined above is present in the consumable product composition in an amount effective to modify, mask, reduce and/or suppress an unpleasant off-taste, aftertaste or lingering sweetness of at least one sweetener, a sweetness enhancer or a consumable product, wherein the amount is less than a taste threshold concentration associated with the composition, wherein the amount of the composition X is less than a taste threshold concentration associated with the composition X and wherein the effect of the composition X remains at least as long as the taste of the sweetener, the sweetness enhancer or the consumable product are perceived.

Preferably, the unpleasant off-taste of the sweetener, the sweetness enhancer or the consumable product is an acidic off-taste, an astringent off-taste, a bitter off-taste, a liquorice off-taste, a metallic off-taste or a throat-burning off-taste.

Preferably, the unpleasant aftertaste of the sweetener, the sweetness enhancer or the consumable product is an astringent or bitter aftertaste.

Preferably, the composition X as defined above is present in an amount effective to impart rich taste to a consumable product.

In one embodiment, the composition X as defined above is present in the consumable product composition in a concentration from 0.01 wppm to 50 wppm.

In one embodiment, the sweetener composition as defined above is present in the consumable product composition in a concentration from 0.1 wppm to 900 wppm.

In one embodiment, the tabletop sweetener composition as defined above is present in the consumable product composition in a concentration from 0.1 wppm to 80 wppm.

In one embodiment, the sweetener composition or the tabletop sweetener composition comprises acesulfame potassium.

In one embodiment, the sweetener composition or the tabletop sweetener composition comprises acesulfame potassium and sucralose.

In one embodiment, the sweetener composition or the tabletop sweetener composition comprises acesulfame potassium and thaumatin.

In one embodiment, the consumable product is a beverage and the sweetener composition comprises acesulfame potassium, sucralose and the composition X as defined above.

In one aspect, the invention relates to a method of modifying, masking, reducing and/or suppressing an unpleasant off-taste, aftertaste or lingering sweetness of a consumable product composition, comprising the step of adding to a consumable product the composition X as defined above in an amount effective to modify, mask, reduce or suppress the unpleasant off-taste, aftertaste or lingering sweetness of at least one sweetener, a sweetness enhancer or a consumable product, that is less than the composition's taste threshold concentration.

Preferably, the amount of the composition X is less than the composition X's taste threshold concentration and wherein the effect of the composition X remains at least as long as the taste of the consumable product is perceived.

In one aspect, the invention relates to a method of imparting rich taste to a consumable product, comprising adding to a consumable product the composition X as defined above.

In one aspect, the composition X as defined above shall be contained in the consumable product in an amount of 0.01 wppm to 50 wppm.

In another aspect, the invention relates to the use of a composition X as defined above for modifying, masking, reducing and/or suppressing an unpleasant off-taste, aftertaste or lingering sweetness of at least one sweetener, at least one sweetness enhancer or a consumable product.

In one embodiment, the amount of the composition X in the sweetener composition as defined above is less than a taste threshold concentration associated with the composition X and wherein the effect of the composition X remains at least as long as the taste of the at least one sweetener, the at least one sweetness enhancer or the consumable product are perceived.

In one embodiment, the unpleasant off-taste of the sweetener, the sweetness enhancer or a consumable product is an acidic off-taste, an astringent off-taste, a bitter off-taste, a liquorice off-taste, a metallic off-taste or a throat-burning off-taste.

Preferably, the unpleasant aftertaste of the sweetener, the sweetness enhancer or the consumable product is an astringent or bitter aftertaste.

In another aspect, the invention relates to the use of a composition X as defined above for imparting rich taste to a consumable product.

In another aspect, the invention relates to a method of sweetening a consumable product composition, comprising the step of adding to a consumable product the composition X as defined above to yield a sweetened consumable product composition, wherein the sweetened consumable product has substantially no unpleasant off-taste, aftertaste or lingering sweetness. Preferably, the sweetened consumable product has a rich taste.

In another aspect, the invention relates to a method of providing a sweetener or sweetness enhancer composition, comprising the step of adding to a sweetener or sweetness enhancer the composition X as defined above to yield a sweetener or sweetness enhancer composition, wherein the sweetener or sweetness enhancer composition has substantially no unpleasant off-taste, aftertaste or lingering sweetness.

DETAILED DESCRIPTION OF THE INVENTION

Novel Taste-Masking Compositions

As indicated above, there is a need for further taste-masking compositions that can modify, mask, reduce and/or suppress unpleasant taste features associated with sweeteners or sweetness enhancers without demonstrating disadvantages, e.g., the disadvantages of known taste-masking substances. In particular, the need exists for compositions that add no taste of their own and that do not reduce the sweetening power of the sweetener or sweetness enhancer. Preferably, the taste-masking compositions provide for reductions in the quantity of sweetener or sweetness enhancer used therewith. In addition, there has been much recent interest in "natural" consumable products, e.g., products that are derived from natural sources. In some cases, because such consumable products are naturally derived, the perception of the consumer is that the products are more healthy than a similar, synthetically derived product.

The problem underlying the present invention was to provide compositions, e.g., naturally derived compositions, which are suitable for taste-masking, in particular for modifying, masking, reducing and/or suppressing unpleasant taste features that are associated with sweeteners or sweetness enhancers.

The present invention in one aspect, relates to a composition X comprising the following substances:
(1) L-valin;
(2) maltol;
(3) naringin;
(4) maltodextrine MD 14
(5) arabicgum (spraygum);
(6) acetoin;
(7) delta dodecalactone;
(8) delta decalactone; and
(9) massoia lactone.

In one embodiment, the composition X further comprises the following substance:
(10) diacetyl.

The substances (1) to (10) are commercially available or can be prepared by the skilled person based on his general knowledge.

The substances (1) to (10) may be of synthetic or of natural origin.

In a preferred embodiment all substances (1) to (10) are of natural origin.

In a further preferred embodiment, all substances (1) to (10) apart from substances (4) and (5) are of natural origin.

In a preferred embodiment, composition X consists of substances (1) to (9).

Naringin as used herein, e.g. as substance (3) in the composition X is a known compound. Exemplary names for naringin are 7-[[2-O-(6-deoxy-α-L-mannopyranosyl)-β-D-glucopyranosyl]]oxy]-2,3-dihydro-5-hydroxy-2-(4-hydroxyphenyl)-4H-1-benzopyran-4-one (IUPAC name), naringoside, 4',5,7-trihydroxyflavanone-7-rhamnoglucoside and 4',5,7-trihydroxyflavanone-7-rutinoside. This listing of names is not meant to limit the scope of the invention. Preferably naringin with the CAS registry number 10236-47-2 is used in the present invention. Naringin is commercially available and may be of synthetic or of natural origin. When naturally occurring naringin is employed as substance (3), naringin is preferably used in its pure form. In one embodiment, naringin extracted from *Citrus paradisi* may be used. In another embodiment, naringin may be used in the form of naringin containing extracts or naringin enriched (fractions of) extracts.

Massoia lactone as used herein, e.g. as substance (9) in the composition X is a known compound. Massoia lactone, in one embodiment, comprises alkyl lactones derived from the bark of the Massoia tree (*Cryptocaria massoia*) which may be found throughout Malaysia. In other embodiments, the compounds may be found as a component of cane sugar molasses, cured tobacco and the essential oil of Sweet *Osmanthus* (*Osmanthus fragrans*). Exemplary synonyms for the massoia lactone are (R)-5,6-dihydro-6-pentyl-2H-pyran-2-one, (R)-5-hydroxy-2-decenoic acid lactone, cocolactone, 5-pentyl-pent-2-en-5-olide, C-10 massoia lactone and C-12 massoia lactone. This listing of names is not meant to limit the scope of the invention. Preferably, C-10 massoia lactone and/or C-12 massoia lactone are used, with C-10 massoia lactone being particularly preferred. As used herein, "massoia lactone" may mean any possible enantiomers, e.g., the R— and the S-enantiomers, mixtures and racemates thereof. Preferably the C-10 massoia lactone (R)-5,6-dihydro-6-pentyl-2H-pyran-2-one with the CAS registry number 51154-96-2 is used is used in the present invention. The massoia lactone is commercially available and may be of synthetic or of natural origin. When naturally occurring massoia lactone is employed as substance (10), massoia lactone is preferably used in its pure form. In one embodiment, massoia lactone may be used in the form of massoia lactone containing extracts or massoia lactone enriched (fractions of) extracts. Preferably, massoia lactone is of synthetic origin.

In one embodiment, substance (9) is (R)-5,6-dihydro-6-pentyl-2H-pyran-2-one, i.e. (R)—C-10-massoia lactone.

It has now been surprisingly and unexpectedly found that the compositions X as defined above are useful for taste-masking, in particular for modifying, masking, reducing and/or suppressing unpleasant taste features, in particular an unpleasant off-taste, aftertaste or lingering sweetness, left by sweeteners or sweetness enhancers in the oral cavity and/or for imparting rich taste to a consumable product. Surprisingly, the effect of the composition X remains as long as the taste of the at least one sweetener or the at least one sweetness enhancer is perceived. In one embodiment, the effect of the composition X does not remain any longer than the taste of the at least one sweetener or the at least one sweetness enhancer is perceived, i.e., the composition X does not have a lingering effect.

As used herein, the term "taste-masking" as it relates to the composition X as defined above means that the composition X as defined above imparts an unexpected improvement in a taste profile, e.g., for example the taste profile of a sweetener composition, tabletop sweetener composition and/or a consumable product composition. Preferably, taste-masking is perceived as a modification, masking, reduction and/or suppression of an unpleasant off-taste, aftertaste or lingering sweetness in the oral cavity that may be left by sweeteners or sweetness enhancers. Taste-masking may also be perceived as imparting rich taste to a consumable product. In some instances, for example, the taste-masking may be perceived as a reduction or masking of the bitterness of a sweetener composition or of a beverage or foodstuff containing the sweetener composition. In other instances, the taste-masking may also be perceived as an enhancement in the sweetness of a sweetener composition or of a beverage or foodstuff containing the sweetener composition. The taste-masking may also be a combination of both bitterness reduction and sweetness enhancement.

As used herein, the term "modifying" as it relates to the composition X as defined above means that consumption thereof creates a new perception of taste, off-taste, aftertaste or lingering sweetness of a sweetener composition or a consumable product in the oral cavity.

As used herein, the term "masking" as it relates to the composition X as defined above means that consumption thereof masks a perception of a taste, off-taste, aftertaste or lingering sweetness of a sweetener composition or a consumable product in the oral cavity.

As used herein, the term "reducing" as it relates to the composition X as defined above means that consumption thereof reduces a perception a taste, off-taste, aftertaste or lingering sweetness of a sweetener composition or a consumable product in the oral cavity.

As used herein, the term "suppressing" as it relates to the composition X as defined above means that consumption thereof suppresses a perception of a taste, off-taste, aftertaste or lingering sweetness of a sweetener composition or a consumable product in the oral cavity.

As used herein, the term "off-taste" means any taste of a sweetener, a sweetness enhancer or a consumable product, e.g., a food or beverage, that is perceived in the oral cavity on or after consumption thereof and that can stay there for a few minutes. Off-tastes include but are not limited to acidic, astringent, bitter, liquorice, metallic or throat-burning. In one embodiment, the off-taste is a metallic off-taste provided by neotame.

As used herein, the term "aftertaste" means any taste of a sweetener, a sweetness enhancer or a consumable product, e.g., a food or beverage, that is perceived in the oral cavity after the sweetener, the sweetness enhancer or the consumable product is removed from the oral cavity, e.g., by swallowing or disgorging. The aftertaste may remain in the oral cavity for example, for a few minutes or a few hours. Unpleasant aftertastes include but are not limited to bitter and/or astringent aftertastes. In one embodiment, the aftertaste is provided by acesulfame potassium, saccharin and/or stevioside.

As used herein, the term "lingering sweetness" means a very long-lasting sweetening effect of a sweetener, a sweetness enhancer or a consumable product, e.g., a food or beverage, which is perceived in the oral cavity after the sweetener, the sweetness enhancer or the consumable product is removed from the oral cavity by swallowing or disgorging. The lingering sweetness may remain in the oral cavity for example, for a few minutes or a few hours.

As used herein, the term "rich taste" means an impression of creaminess, milk fattiness and/or sweetness of a consumable product that is perceived in the oral cavity on or after consumption of a consumable product.

As used herein, the term "sweetener(s)" includes all artificial and natural sweeteners, sugar alcohols (or polyols) and sugar sweeteners (or carbohydrates). Artificial and natural sweeteners include but are not limited to abiziasaponin, abrusosides, in particular abrusoside A, abrusoside B, abrusoside C, abrusoside D, acesulfame potassium, advantame, albiziasaponin, alitame, aspartame, superaspartame, bayunosides, in particular bayunoside 1, bayunoside 2, brazzein, bryoside, bryonoside, bryonodulcoside, carnosifloside, carrelame, curculin, cyanin, chlorogenic acid, cyclamates and its salts, cyclocaryoside I, dihydroquercetin-3-acetate, dihydroflavenol, dulcoside, gaudichaudioside, glycyrrhizin, glycyrrhetin acid, gypenoside, hematoxylin, hernandulcin, iso-mogrosides, in particular iso-mogroside V, lugduname, magap, mabinlins, miraculin, mogrosides (lo han guo), in particular mogroside IV and mogroside V, monatin and its derivatives, monellin, mukurozioside, naringin dihydrochalcone (NarDHC), neohesperidin dihydrochalcone (NDHC), neotame, osladin, pentadin, periandrin I-V, perillartine, D-phenylalanine, phlomisosides, in particular phlomisoside 1, phlomisoside 2, phlomisoside 3, phlomisoside 4, phloridzin, phyllodulcin, polpodiosides, polypodoside A, pterocaryosides, rebaudiosides, in particular rebaudioside A, rebaudioside B, rebaudioside C, rebaudioside D, rebaudioside F, rebaudioside G, rebaudioside H), rubusosides, saccharin and its salts and derivatives, scandenoside, selligueanin A, siamenosides, in particular siamenoside I, stevia, steviolbioside, stevioside and other steviol glycosides, strogines, in particular strogin 1, strogin 2, strogin 4, suavioside A, suavioside B, suavioside G, suavioside H, suavioside I, suavioside J, sucralose, sucronate, sucrooctate, talin, telosmoside $A_{15}$, thaumatin, in particular thaumatin I and II, trans-anethol, trans-cinnamaldehyde, trilobtain and D-tryptophane, including extracts or enriched fractions of the natural sweeteners. Sugar alcohols (or polyols) include but are not limited to erythritol, galactitol, hydrogenated starch syrups including maltitol and sorbitol syrups, inositols, isomalt, lactitol, maltitol, mannitol, xylitol, and combinations thereof. Sugar sweeteners (or carbohydrates) include monosaccharides, disaccharides, oligosaccharides and polysaccharides such as but not limited to arabinose, dextrin, dextrose, fructose, high fructose corn syrup, fructooligosaccharides, fructooligosaccharide syrups, galactose, galactooligosaccharides, glucose, glucose and (hydrogenated) starch syrups/hydrolysates, isomaltulose, lactose, hydrolysed lactose, maltose, mannose, rhamnose, ribose, sucrose, stachyose, tagatose, trehalose, xylose, and combinations thereof. The sweeteners are known substances and are for example those described by H. Mitchell (H. Mitchell, "Sweeteners and Sugar Alternatives in Food Technology", Backwell Publishing Ltd, 2006,) and in WO 2009/023975 A2, each of which is incorporated herein by reference in its entirety. The above-identified sweeteners are known in the art and are commercially available.

Suitable hydrogenated starch hydrolysates include, but are not limited to, those disclosed in U.S. Pat. No. 4,279,931, which is hereby incorporated by reference, and various hydrogenated glucose syrups and/or powders which contain sorbitol, maltitol, hydrogenated disaccharides, hydrogenated higher polysaccharides, or combination thereof. Hydrogenated starch hydrosylates are primarily prepared by the controlled catalytic hydrogenation of con syrups. The resulting hydrogenated starch hydrosylates are mixtures of monomeric, dimeric, and polymeric saccharides. The hydrogenated starch hydrolysates are known in the art and are commercially available.

As used herein, the term "sweetness enhancer(s)" means any compound capable of enhancing or intensifying the perception of sweet taste of sweetener compositions or sweetened compositions. The term "sweetness enhancer" is synonymous to the terms "sweet taste potentiator," "sweetness potentiator," and "sweetness intensifier".

As shown in the Examples, the inventors have now surprisingly and unexpectedly found that the compositions X as defined above are useful for taste-masking, in particular for modifying, masking, reducing and/or suppressing an unpleasant taste features, in particular an unpleasant off-taste, aftertaste or lingering sweetness left by sweeteners or sweetness enhancers. Preferably, the effect of the composition X remains at least as long as the taste of the at least one sweetener, the at least one sweetness enhancer or the consumable product are perceived.

Furthermore, it has been found that the compositions X are useful for imparting rich taste to a consumable product.

Thus, in one aspect, the invention relates to the use of a composition X as defined above for modifying, masking, reducing and/or suppressing an unpleasant taste feature, in particular an unpleasant off-taste, aftertaste or lingering sweetness of at least one sweetener, a sweetness enhancer or a consumable product.

Preferably, the effect of the composition X remains at least as long as the taste of the at least one sweetener, the at least one sweetness enhancer or the consumable product are perceived.

In one embodiment, the unpleasant off-taste of the sweetener, the sweetness enhancer or a consumable product is an acidic off-taste, an astringent off-taste, a bitter off-taste, a liquorice off-taste, a metallic off-taste or a throat-burning off-taste.

In one embodiment, the unpleasant aftertaste of the sweetener, the sweetness enhancer or the consumable product is an astringent or bitter aftertaste.

In another embodiment, the invention relates to the use of a composition X as defined above for imparting rich taste to a consumable product.

In one embodiment, the substance (1) is present in the composition X in an amount ranging from 0.01 wt % to 0.09 wt %, e.g. from 0.04 wt % to 0.06 wt %, from 0.045 wt % to 0.065 wt %, from 0.03 wt % to 0.07 wt % or from 0.02 wt % to 0.08 wt %.

In one embodiment, the substance (2) is present in the composition X in an amount ranging from 30 wt % to 80 wt %, e.g. from 50 wt % to 60 wt %, from 45 wt % to 65 wt %, from 40 wt % to 70 wt % or from 35 wt % to 75 wt %.

In one embodiment, the substance (3) is present in the composition X in an amount ranging from 15 wt % to 55 wt %, e.g. from 30 wt % to 40 wt %, from 28 wt % to 44 wt %, from 25 wt % to 48 wt % or from 20 wt % to 50 wt %.

In one embodiment, the substance (4) is present in the composition X in an amount ranging from 0.5 wt % to 15.0 wt %, e.g. from 2 wt % to 7 wt %, from 1.5 wt % to 8 wt %, from 1.0 wt % to 10 wt % or from 0.8 wt % to 12 wt %.

In one embodiment, the substance (5) is present in the composition X in an amount ranging from 0.6 wt % to 5.0 wt %, e.g. from 1.0 wt % to 3.0 wt, from 0.9 wt % to 3.5 wt %, from 0.8 wt % to 4 wt % or from 0.7 wt % to 4.5 wt %.

In one embodiment, the substance (6) is present in the composition X in an amount ranging from 0.005 wt % to 0.09 wt %, e.g. from 0.03 wt % to 0.05 wt %, from 0.02 wt % to 0.06 wt %, from 0.015 wt % to 0.07 wt % or from 0.01 wt % to 0.08 wt %.

In one embodiment, the substance (7) is present in the composition X in an amount ranging from 0.5 wt % to 1.5 wt %, e.g. from 0.7 wt % to 1.1 wt %, from 0.6 wt % to 1.2 wt %, from 0.5 wt % to 1.3 wt % or from 0.4 wt % to 1.4 wt %.

In one embodiment, the substance (8) is present in the composition X in an amount ranging from 0.06 wt % to 0.6 wt %, e.g from 0.09 wt % to 0.2 wt %, from 0.085 wt % to 0.3 wt %, from 0.08 wt % to 0.4 wt %, or from 0.07 wt % to 0.5 wt %.

In one embodiment, the substance (9) is present in the composition X in an amount ranging from 0.06 wt % to 0.7 wt %, e.g. from 0.1 wt % to 0.3 wt %, from 0.09 wt % to 0.4 wt %, from 0.08 wt % to 0.5 wt % or from 0.07 wt % to 0.6 wt %.

In one embodiment, the substance (10) is present in the composition X in an amount ranging from 0.0005 wt % to 0.009 wt %, e.g. from 0.002 wt % to 0.005 wt %, from 0.0015 wt % to 0.006 wt %, from 0.001 wt % to 0.007 wt % or from 0.0008 wt % to 0.008 wt %.

In one embodiment, the composition X further comprises at least one additional substance.

Preferably, the additional substance(s) are selected from the group consisting of amino acids flavoring ingredients, and combinations thereof.

In one embodiment, the additional substances comprise:
(11) L-alanine;
(12) L-leucine;
(13) glycine;
(14) L-aspartic acid;
(15) L-threonine;
(16) L-isoleucine;
(17) L-tyrosine;
(18) L-proline;
(19) L-serine;
(20) L-glutamic acid;
(21) taurine;
(22) syringaldehyde;
(23) delta undecalactone;
(24) whiskey lactone; and
(25) delta tetradecalactone.

The substances (11) to (25) are commercially available or can be prepared by the skilled person based on his general knowledge.

The substances (11) to (25) may be of synthetic or of natural origin.

In one embodiment, in the composition X, the substances (1), (2), (4) to (8) and (11) to (25) are of synthetic origin and the substances (3) and (10) are of natural origin.

In a preferred embodiment, the composition X comprises substances (1) to (9) and (11) to (25).

In a preferred embodiment, composition X consists of substances (1) to (9) and (11) to (25).

Syringaldehyde as used herein, e.g. as substance (22), in the composition X is a known compound. Preferably syringaldehyde with the CAS registry number 134-96-3 is used in the present invention. Exemplary synonyms for syringaldehyde are syringic aldehyde, 4-hydroxy-3,5-dimethoxybenzaldehyde (IUPAC name), 3,5-dimethoxy-4-hydroxybenzene carbonal, gallaldehyde 3,5-dimethyl ether and 4-hydroxy-3,5-dimethoxybenzaldehyde. This listing of names is not meant to limit the scope of the invention. The syringaldehyde is commercially available and may be of synthetic or of natural origin. When naturally occurring syringaldehyde is employed as substance (22), syringaldehyde is preferably used in its pure form. In one embodiment syringaldehyde may be used in the form of syringaldehyde containing extracts or syringaldehyde enriched (fractions of) extracts. Preferably, syringaldehyde is of synthetic origin.

Whiskey lactone as used herein, e.g. as substance (24) in the composition X is a known compound. Exemplary names for whiskey lactone are (4R,5R)-5-butyl-4-methyldihydrofuran-2(3H)-one (IPUAC name), (4S,5S)-5-butyl-4-methyldihydrofuran-2(3H)-one (IUPAC name), cis-3-methyl-4-octanolide, trans-3-methyl-4-octanolide, (3S,4S)-(−)-4-butyl-3-methylbutan-4-olide, (3R,4R)-(−)-4-butyl-3-methylbutan-4-olide quercus lactone; cis-β-methyl-γ-octalactone, trans-β-methyl-γ-octalactone. This listing of names is not meant to limit the scope of the invention. As used herein, "whiskey lactone" may mean any possible enantiomers, e.g., the R— and the S-enantiomers, mixtures and racemates thereof. Preferably whiskey lactone with the CAS registry numbers 252009-40-8, 121644-12-0, 39212-23-2 or 147254-32-8 is used in the present invention. Particularly preferred, a mixture of cis-3-methyl-4-octanolide (cis-whiskey lactone) and trans-3-methyl-4-octanolide (trans-whiskey lactone), with the CAS registry number 39212-23-2 or 147254-32-8 is used in the present invention. The whiskey lactone is commercially available and may be of synthetic or of natural origin. When naturally occurring whiskey lactone is employed as substance (24), whiskey lactone is preferably used in its pure form. In one embodiment, whiskey lactone may be used in the form of whiskey lactone containing extracts or whiskey lactone enriched (fractions of) extracts. Preferably, whiskey lactone is of synthetic origin.

In one embodiment, whiskey lactone (24) is a mixture of cis-3-methyl-4-octanolide (cis-whiskey lactone) and trans-3-methyl-4-octanolide (trans-whiskey lactone).

In one embodiment, composition X comprises methoxy salicylaldehyde as additional substance (26), preferably 4-methoxy salicylaldehyde.

In a preferred embodiment, composition X consists of substances (1) to (9) and (11) to (26). In one embodiment, composition X comprises or consists essentially of substances (1) to (9) and (11) to (26). In one embodiment, composition X consists of substances (1) to (26). In one embodiment, composition X comprises or consists essentially of substances (1) to (26).

In one embodiment, the at least one additional substance(s) are selected from the group consisting of tannic acid, decanoic acid, propanoic acid, phenylethylacetate, phenylethylalcohol, cinnamic alcohol, boronia absolute, guaicwood, e.g., guiacwood oil, onone, e.g., alpha onone and/or beta onone, damascenone, e.g., beta damascenone, indole, and combinations thereof. Preferably, at least one of these additional substances is of natural origin. In one embodiment, all of these additional substances are of natural origin. In one embodiment, at least one of these additional substances is of artificial origin, e.g., synthesized. These additional substances are commercially available.

Methoxy salicylaldehyde as used herein, e.g. as additional substance (26) in the composition X is a known compound, and can in particular be 2-methoxy salicylaldehyde, 3-methoxy salicylaldehyde or 4-methoxy salicylaldehyde. Preferably, 4-methoxy salicylaldehyde, in particular with the CAS registry number 673-22-3 is used in the present invention. An exemplary synonym for the name 4-methoxy salicylaldehyde is 2-hydroxy-4-methoxy-benzaldehyde. 4-Methoxy salicylaldehyde is commercially available and may be of synthetic or of natural origin. When naturally occurring 4-methoxy salicylaldehyde is employed as substance (26), 4-methoxy salicylaldehyde is preferably used in its pure form. In one embodiment 4-methoxy salicylaldehyde may be used in the form of 4-methoxy salicylaldehyde containing extracts or 4-methoxy salicylaldehyde enriched (fractions of) extracts. Preferably, 4-methoxy salicylaldehyde is of synthetic origin.

As used herein, the term "amino acids" may include any natural amino acids, artificial amino acid derivatives and physiologically acceptable salts and hydrates thereof. The natural amino acids may be chosen from the 22 standard amino acids selected from the group consisting of alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, valine, selenocysteine and pyrrolysine and physiologically acceptable salts and hydrates thereof. As used herein, the term "amino acid" means any possible isomers, comprising L- and D-amino acids, R- and S-enantiomers, mixtures and racemates thereof, preferably L-amino acids. The above-identified amino acids are known in the art and are commercially available.

As used herein, the term "salt(s)" as it relates to the amino acids means the physiologically acceptable acid addition salts and base salts of the amino acids. Suitable acid addition salts are formed from acids which form non-toxic salts. Examples include but are not limited to the acetate, aspartate, benzoate, besylate, bicarbonate, carbonate, bisulphate, sulphate, borate, camsylate, citrate, edisylate, esylate, formate, fumarate, gluceptate, gluconate, glucuronate, hexafluorophosphate, hibenzate, hydrochloride/chloride, hydrobromide, bromide, hydroiodide, iodide, isethionate, lactate, malate, maleate, malonate, mesylate, methylsulphate, naphthylate, nicotinate, nitrate, orotate, oxalate, palmitate, pamoate, phosphate, hydrogen phosphate, dihydrogen phosphate, sacharate, stearate, succinate, tartrate, tosylate and trifluoroacetate salts. Suitable base salts are formed from bases which form non-toxic salts. Examples include but are not limited to the aluminium, arginine, benzathine, calcium, choline, diethylamine, diolamine, glycine, lysine, magnesium, meglumine, olamine, potassium, sodium, tromethamine and zinc salts.

As used herein, the term "hydrate(s)" as it relates to amino acids means an amino acid that includes water. "Hydrate(s)" are formed by the addition of water or its elements. In one embodiment, an amino acid may form crystals that incorporate water into the crystalline structure without chemical alteration.

As used herein, the term "flavoring ingredients" may include those flavor ingredients known in the art, such as natural and artificial flavors. These flavoring ingredients may be chosen from synthetic flavor oils and flavoring ingredient aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil. Also useful flavoring ingredients are artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, pineapple, watermelon, apricot, banana, melon, apricot, ume, cherry, raspberry, blackberry, tropical fruit, mango, mangosteen, pomegranate, papaya and so forth. Other potential flavors include a milk flavor, a butter flavor, a cheese flavor, a cream flavor, and a yogurt flavor; a vanilla flavor; tea or coffee flavors, such as a green tea flavor, a oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a camomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavoring ingredients may be used in liquid or solid form and may be used individually or in admixture. Commonly used flavors include mints such as peppermint, menthol, spearmint, artificial vanilla, cinnamon derivatives, and various fruit flavors, whether employed individually or in admixture. Flavors may also provide breath freshening properties, particularly the mint flavors when used in combination with cooling agents.

Other useful flavoring ingredients include aldehydes and esters such as cinnamyl acetate, cinnamaldehyde, citral diethylacetal, dihydrocarvyl acetate, eugenyl formate, p-methylamisol, and so forth may be used. Generally any flavoring ingredient or food additive such as those described in Chemicals Used in Food Processing, publication 1274, pages 63-258, by the National Academy of Sciences, may be used. This publication is incorporated herein by reference.

Further examples of aldehyde flavoring ingredients include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, and mixtures thereof. These listings of flavoring ingredients are merely exemplary and are not meant to limit either the term "flavoring ingredient" or the scope of the invention generally.

In some embodiments, the flavoring ingredient may be employed in either liquid form and/or dried form. When employed in the latter form, suitable drying means such as spray drying the oil may be used. Alternatively, the flavoring ingredient may be absorbed onto water soluble materials, such as cellulose, starch, sugar, maltodextrin, gum arabic and so forth or may be encapsulated. The actual techniques for preparing such dried forms are well-known.

In some embodiments, the flavoring ingredients may be used in many distinct physical forms well-known in the art to provide an initial burst of flavor and/or a prolonged sensation of flavor. Without being limited thereto, such physical forms include free forms, such as spray dried, powdered, beaded forms, encapsulated forms, and mixtures thereof.

The above-identified flavoring ingredients are known in the art and are commercially available.

In one embodiment, the substance (11) is present in the composition X in an amount ranging from 0.05 wt % to 0.15 wt %, e.g. from 0.09 wt % to 0.11 wt %, from 0.08 wt % to 0.12 wt %, from 0.07 wt % to 0.13 wt % or from 0.06 wt % to 0.14 wt %.

In one embodiment, the substance (12) is present in the composition X in an amount ranging from 0.01 wt % to 0.15 wt %, e.g. from 0.05 wt % to 0.07 wt %, from 0.04 wt % to 0.08 wt %, from 0.03 wt % to 0.09 wt % or from 0.02 wt % to 0.1 wt %.

In one embodiment, the substance (13) is present in the composition X in an amount ranging from 0.04 wt % to 0.24 wt %, e.g. from 0.14 wt % to 0.16 wt %, from 0.10 wt % to 0.18 wt %, from 0.08 wt % to 0.2 wt % or from 0.06 wt % to 0.22 wt %.

In one embodiment, the substance (14) is present in the composition X in an amount ranging from 0.05 wt % to 0.50 wt %, e.g. from 0.25 wt % to 0.30 wt %, from 0.20 wt % to 0.35 wt %, from 0.15 wt % to 0.40 wt % or from 0.10 wt % to 0.45 wt %.

In one embodiment, the substance (15) is present in the composition X in an amount ranging from 0.03 wt % to 0.21 wt %, e.g. from 0.11 wt % to 0.13 wt %, from 0.09 wt % to 0.15 wt %, from 0.07 wt % to 0.17 wt % or from 0.05 wt % to 0.19 wt %.

In one embodiment, the substance (16) is present in the composition X in an amount ranging from 0.01 wt % to 0.15 wt %, e.g. from 0.05 wt % to 0.07 wt %, from 0.04 wt % to 0.08 wt %, from 0.03 wt % to 0.09 wt % or from 0.02 wt % to 0.1 wt %.

In one embodiment, the substance (17) is present in the composition X in an amount ranging from 0.05 wt % to 0.15 wt %, e.g. from 0.09 wt % to 0.11 wt %, from 0.08 wt % to 0.12 wt %, from 0.07 wt % to 0.13 wt % or from 0.06 wt % to 0.14 wt %.

In one embodiment, the substance (18) is present in the composition X in an amount ranging from 0.05 wt % to 0.23 wt %, e.g. from 0.13 wt % to 0.15 wt %, from 0.11 wt % to 0.17 wt %, from 0.09 wt % to 0.19 wt % or from 0.07 wt % to 0.21 wt %.

In one embodiment, the substance (19) is present in the composition X in an amount ranging from 0.45 wt % to 0.80 wt %, e.g. from 0.64 wt % to 0.70 wt %, from 0.60 wt % to 0.75 wt %, from 0.55 wt % to 0.80 wt % or from 0.50 wt % to 0.85 wt %.

In one embodiment, the substance (20) is present in the composition X in an amount ranging from 0.20 wt % to 0.55 wt %, from 0.40 wt % to 0.42 wt %, from 0.35 wt % to 0.50 wt %, from 0.30 wt % to 0.55 wt % or from 0.25 wt % to 0.60 wt %.

In one embodiment, the substance (21) is present in the composition X in an amount ranging from 0.03 wt % to 0.21 wt %, e.g. from 0.11 wt % to 0.13 wt %, from 0.09 wt % to 0.15 wt %, from 0.07 wt % to 0.17 wt % or from 0.05 wt % to 0.19 wt %.

In one embodiment, the substance (22) is present in the composition X in an amount ranging from 0.1 wt % to 3.5 wt %, e.g. from 1.60 wt % to 1.80 wt %, from 1.0 wt % to 2.0 wt %, from 0.5 wt % to 2.5 wt % or from 0.3 wt % to 3.0 wt %.

In one embodiment, the substance (23) is present in the composition X in an amount ranging from 0.5 wt % to 1.5 wt %, e.g. from 0.7 wt % to 1.1 wt %, from 0.6 wt % to 1.2 wt %, from 0.5 wt % to 1.3 wt % or from 0.4 wt % to 1.4 wt %.

In one embodiment, the substance (24) is present in the composition X in an amount ranging from 0.10 wt % to 1.3 wt %, e.g. from 0.50 wt % to 0.70 wt %, from 0.40 wt % to 0.80 wt %, from 0.30 wt % to 0.90 wt % or from 0.20 wt % to 1.1 wt %.

In one embodiment, the substance (25) is present in the composition X in an amount ranging from 0.5 wt % to 1.5 wt %, e.g. from 0.7 wt % to 1.1 wt %, from 0.6 wt % to 1.2 wt %, from 0.5 wt % to 1.3 wt % or from 0.4 wt % to 1.4 wt %.

Methods of Making a Composition X of the Invention

In one aspect, the invention relates to a process for the preparation of a composition X as defined above comprising admixing the substances (1) to (9). The substances may be combined in any order or in no particular order at all. In preferred embodiments, the substances are all combined at essentially the same time. In other embodiments, particular substances may be mixed with one another to form intermediate mixtures and the intermediate mixture(s) may then be combined with the remaining substances.

In one embodiment, the method further comprises the step of combining the composition X of the invention with at least one additional substance, wherein the additional substance is preferably selected from amino acids and flavoring ingredients, and combinations thereof.

In one embodiment, the process comprises further admixing the substances (11) to (25).

Sweetener Compositions

It has now been found that sweetener compositions comprising the composition X as defined above are useful in 1) reducing the quantity of standard sugar such as sucrose that may be present in a consumable product; and/or in 2) replacing standard sugar such as sucrose that may be present in a consumable product.

In another aspect, the invention relates to a sweetener composition comprising
(a) at least one sweetener; and
(b) a composition X as defined above.

As used herein, the term "composition X as defined above" includes any and all compositions X as well as their preferred embodiments and specific combinations of substances described above and/or herein.

In one embodiment, the sweetener composition comprises at least one artificial or natural sweetener that, once consumed, is capable of leaving an unpleasant off-taste, aftertaste or lingering sweetness in the oral cavity.

Exemplary artificial or natural sweeteners include but are not limited to abiziasaponin, abrusosides, in particular abrusoside A, abrusoside B, abrusoside C, abrusoside D, acesulfame potassium, advantame, albiziasaponin, alitame, aspartame, superaspartame, bayunosides, in particular bayunoside 1, bayunoside 2, brazzein, bryoside, bryonoside, bryonodulcoside, carnosifloside, carrelame, curculin, cyanin, chlorogenic acid, cyclamates and its salts, cyclocaryoside I, dihydroquercetin-3-acetate, dihydroflavenol, dulcoside, gaudichaudioside, glycyrrhizin, glycyrrhetin acid, gypenoside, hematoxylin, hernandulcin, isomogrosides, in particular iso-mogroside V, lugduname, magap, mabinlins, micraculin, mogrosides (lo han guo), in particular mogroside IV and mogroside V, monatin and its derivatives, monellin, mukurozioside, naringin dihydrochalcone (NarDHC), neohesperidin dihydrochalcone (NDHC), neotame, osladin, pentadin, periandrin I-V, perillartine, D-phenylalanine, phlomisosides, in particular phlomisoside 1, phlomisoside 2, phlomisoside 3, phlomisoside 4, phloridzin, phyllodulcin, polpodiosides, polypodoside A, pterocaryosides, rebaudiosides, in particular rebaudioside A, rebaudioside B, rebaudioside C, rebaudioside D, rebaudioside F, rebaudioside G, rebaudioside H), rubusosides, saccharin and its salts and derivatives, scandenoside, selligueanin A, siamenosides, in particular siamenoside I, stevia, steviolbioside, stevioside and other steviol glycosides, strogines, in particular strogin 1, strogin 2, strogin 4, suavioside A, suavioside B, suavioside G, suavioside H, suavioside I, suavioside J, sucralose, sucronate, sucrooctate, talin, telosmoside $A_{15}$, thaumatin, in particular thaumatin I and II, trans-anethol, trans-cinnamaldehyde, trilobtain and D-tryptophane, including extracts or enriched fractions of the natural sweeteners. The above-identified sweeteners are known in the art and are commercially available.

Extracts or enriched fractions of natural sweeteners may include extracts with more than 10 wt %, preferably with more than 50 wt % and more preferably with more than 90 wt % of the sweetener concerned in relation to the dry mass of the fraction.

In one embodiment, the sweetener is selected from the group consisting of extracts and corresponding enriched fractions of: Thaumatococcus extracts (sweet prayers plant), extracts of *Stevia* ssp. (in particular *Stevia rebaudiana*), swingle extract (*Mormordica* or *Siratia grosvenorii*, Luo-Han-Guo), extracts of *Glycerryzia* ssp. (in particular *Glycerhyzia glabra*), extracts of *Rubus* ssp. (in particular *Rubus suavissimus*), citrus extracts, extracts of *Lippia dulcis*, Buddha tea extracts (*Hydrangea dulcis* and other phyllodulcin-containing *Hydrangea* ssp.).

Preferably, the at least one sweetener is selected from the group consisting of acesulfame potassium, aspartame, sucralose and thaumatin.

Preferably, the at least one sweetener comprises the sweetener acesulfame potassium.

Preferably, the at least one sweetener comprises a first and a second sweetener.

Preferably, the at least one sweetener comprises the sweeteners acesulfame potassium and thaumatin.

In one particularly preferred embodiment, the at least one sweetener comprises the sweeteners acesulfame potassium and sucralose.

In a preferred embodiment, the amount of the substances (1) to (9) in the sweetener composition is such that when the sweetener composition is added to a consumable product, the amount of said substances is below their taste threshold concentration, i.e. the substance cannot be identified and/or recognized in the consumable product.

In a preferred embodiment, the amount of the substances (1) to (25), preferably of the substances (1) to (9) and (11) to (25), in the sweetener composition is such that when the sweetener composition is added to a consumable product, the amount of said substances is below their taste threshold concentration.

In a preferred embodiment, the amount of the substances (1) to (26), preferably of the substances (1) to (9) and (11) to (26), in the sweetener composition is such that when the sweetener composition is added to a consumable product, the amount of said substances is below their taste threshold concentration.

In one embodiment, the amount of some of the substances (1) to (26), e.g., from (1) to (25) or from (1) to (9) in the sweetener composition is such that when the sweetener composition is added to a consumable product, the amount of said substances is below their taste threshold concentration.

In another embodiment, the sweetener composition further comprises at least one additional sweetener.

Exemplary additional sweeteners include but are not limited to sugar alcohols or sugar sweeteners selected from the group consisting of erythritol, galactitol, hydrogenated starch syrups, maltitol and sorbitol syrups, inositols, isomalt, lactitol, maltitol, mannitol, xylitol, arabinose, dextrin, dextrose, fructose, high fructose corn syrup, fructooligosaccharides, fructooligosaccharide syrups, galactose, galactooligosaccharides, glucose, glucose and (hydrogenated) starch syrups/hydrolysates, isomaltulose, lactose, hydrolysed lactose, maltose, mannose, rhamnose, ribose, sucrose, tagatose, trehalose, xylose, and combinations thereof. The above-identified sweeteners are known in the art and are commercially available.

Preferably, the at least one additional sweetener is sucrose.

The at least one additional sweetener may be a caloric sweetener and/or a non-caloric sweetener.

In one embodiment, the inventive sweetener compositions further comprise at least one sweetness enhancer, e.g., at least two or at least three. Suitable sweetness enhancers are well known in the art. In one embodiment, the at least one sweetness enhancer may be selected from the group consisting of terpenes (such as sesquiterpenes, diterpenes, and triterpenes), flavonoids, amino acids, proteins, polyols, other known natural sweeteners (such as cinnamaldehydes, selligueains and hematoxylins), secodammarane glycosides, and analogues thereof.

Exemplary sweetness enhancers include stevioside, steviolbioside, rebaudioside A, rebaudioside B, rebaudioside C, rebaudioside D, rebaudioside F, dulcoside A, rubusoside; hernandulcin; pine rosin diperpenoid; mukurozioside; baiyunosdie; phlomisoside, such as phlomisoside I and phlomisodie II; glycyrrhizic acid; periandrins, such as periandrin I, periandrin II, periandrin III, and periandrin IV; osladin; polypodosides, such as polypodoside A and polypodoside B; mogrosides, such as mogroside IV and mogroside V; abrusoside A and abrusosdie B; cyclocariosdies, such as cyclocarioside A and cyclocarioside B; pterocaryoside A and pterocaryoside B; flavonoids, such as phyllodulcin, phloridzin, neoastilbin, and dihydroquercetin acetate; amino acids, such as glycine and monatin; proteins, such as thaumatins (thaumatin I, thaumatin II, thaumatin iii, and thaumatin IV), monellin, mabinlins (mabinlin I and mabinlin II), brazzein, miraculin, and curculin; polyols such as erythritol; cinnamaldehyde; selligueains, such as selligueain A and selligueain B; hematoxylin; and mixtures thereof.

Additional exemplary sweetness enhancers include pine rosin diterpenoids; phloridizin; neoastilbin; dihydroquercetin acetate; glycine; erythritol; cinnamaldehyde; selligueain A; selligueain B; hematoxylin; rebaudioside A; rebaudioside B; rebaudioside C; rebaudioside D; rebaudioside E; dulcoside A; steviolbioside; rubusoside; stevia; stevioside; steviol 13 O-β-D-glycoside; mogroside V; Luo Han Guo; siamenoside; siamenoside I; monatin and salts thereof (monatin SS, RR, RS, SR); curculin; glycyrrhizic acid and its salts; thaumatin I; thaumatin II; thaumatin III; thaumatin IV; monellin; mabinlin I; mabinlin II; brazzein; hernandulcin; phyllodulcin; glycyphyllin; phloridzin; trilobtain; baiyunoside; osladin; polypodoside A; polypodoside B; pterocaryoside A; pterocaryoside B; mukurozioside; mukurozioside lib; phlomisoside I; phlomisoside II; periandrin I; periandrin II; periandrin III; periandrin VI; periandrin V; cyclocarioside A; cyclocarioside B; suavioside A; suavioside B; suavioside G; suavioside H; suavioside I; suavioside J; labdane glycosides; baiyunoside; gaudichaudioside A; mogroside IV; iso-mogroside; bryodulcoside; bryobioside; bryoside; bryonoside; carnosifloside V; carnosifloside VI; scandenoside R6; 1 1-oxomogroside V; abrusoside A; abrusoside B; abrusoside C; abrusoside D; abrusoside E; gypenoside XX; glycyrrhizin; apioglycyrrhizin; araboglycyrrhizin; pentadin; perillaldehyde; rebaudioside F; steviol; 13-[(2-O-(3-O-α-D-glucopyranosyl)-β-D-glucopyranosyl-3-O-β-D-glucopyranosyl-β-D-glucopyranosyl)oxy]kaur-16-en-18-oic acid β-D-glucopyranosyl ester; 13-[(2-O-β-D-glucopyranosyl-3-O-(4-O-α-D-glucopyranosyl)-β-D-glucopyranosyl-β-D-glucopyranosyl)oxy]kaur-16-en-18-oic acid β-D-glucopyranosyl ester; 13-[(3-O-β-D-glucopyranosyl-β-D-glucopyranosyl)oxy]kaur-16-en-18-oic acid β-D-glucopyranosyl ester; 13-hydroxy-kaur-16-en-18-oic acid β-D-glucopyranosyl ester; 13-methyl-16-oxo-17-norkauran-18-oic acid β-D-glucopyranosyl ester; 13-[(2-0-β-D-glucopyranosyl-3-O-β-D-glucopyranosyl-β-D-glucopyranosyl)oxy]kaur-15-en-18-oic acid β-D-glucopyranosyl ester; 13-[2-O-β-D-glucopyranosyl-3-O-β-D-glucopyranosyl-β-D-glucopyranosyl)oxy]kaur-15-en-18-oic acid; 13-[(2-0-β-D-glucopyranosyl-3-O-β-D-glucopyranosyl]-β-D-glucopyranosyl)oxy]-17-hydroxy-kaur-15-en-18-oic acid β-D-glucopyranosyl ester; 13-[(2-O-β-D-glucopyranosyl-3-O-β-D-glucopyranosyl-β-D-glucopyranosyl)oxy]-16-hydroxy kauran-18-oic acid β-D-glucopyranosyl ester; 13-[(2-O-β-D-glucopyranosyl-3-O-β-D-glucopyranosyl-β-D-glucopyranosyl)oxy]-16-hydroxy kauran-18-oic acid; isosteviol; mogroside IA; mogroside IE; mogroside II-A; mogroside II-E; mogroside III; mogroside V; isomogroside V; 11-Oxomogroside; mogrol; 11-oxomogrol; 11-oxomogroside IA; 1-[13-hydroxykaur-16-en-18-oate]β-D-glucopyranuronic acid; 13-[(2-O-β-D-glucopyranosyl β-D-glucopyranosyl)oxy]-17-hydroxy-kaur-15-en-18-oic acid β-D- glucopyranosyl ester; 13-[(2-0-β-D-glucopyranosyl-β-D-glucopyranosyl)oxy]kaur-16-en-18-oic acid-(2-O-β-D-glucopyranosyl-β-D-glucopyranosyl)ester (rebaudioside E); 13-[(2-O-α-L-rhamnopyranosyl-3-O-β-D-glucopyranosyl-β-D-glucopyranosyl)oxy]kaur-16-en-18-oic acid-(2-0β-D-glucopyranosyl-β-D-glucopyranosyl)ester; 13-[(2-O-β-D-glucopyranosyl-3-O-β-D-glucopyranosyl-β-D-glucopyranosyl)oxy]-kaur-16-en-18-oic acid-(2-O-α-L-rhamnopyranosyl-β-D-glucopyranosyl) ester; 13-[(2-O-β-D-glucopyranosyl β-D-glucopyranosyl)oxy]-17-oxo-kaur-15-en-oic acid β-D-glucopyranosl ester; 13-[(2-O-(6-O-β-D-glucopyranosyl)-β-D-glucopyranosyl-β-D-glucopyranosyl)oxy]kaur-16-en-18-oic acid β-D-glucopyranosyl ester; 13-[(2-O-β-D-glucopyranosyl-3-O-β-D-fructofuranosyl-β-D-glucopyranosyl)oxy]kaur-16-en-18-oic acid β-D-glucopyranosyl ester; 13-[(2O-β-D-glucopyranosyl-β-D-glucopyranosyl)oxy]kaur-16-en-18-oic acid-(6-O-β-D-xylopyranosyl-β-D-glucopyranosyl)ester; 13-[(2-O-β-D-glucopyranosyl-β-D-glucopyranosyl)oxy]kaur-16-en-18-oic acid-(4-O-(2-O-α-D-glucopyranosyl)-α-D-glucopyranosyl-D-glucopyranosyl) ester; 13-[(2-O-β-D-glucopyranosyl-3-O-β-D-glucopyranosyl-β-D-glucopyranosyl)oxy]kaur-16-en-18-oic acid-(2-O-6-deoxy-β-D-glucopyranosyl-β-D-glucopyranosyl)ester; 13-[(2-O-β-D-glucopyranosyl-β-D-glucopyranosyl)oxy]kaur-15-en-18-oic acid β-D-glucopyranosyl ester; 13-[(2-O-β-D-glucopyranosyl-3-O-β-D-xylopyranosyl-β-D-glucopyranosyl)oxy]kaur-16-en-18-oic acid β-D-glucopyranosyl ester; 13-[(2-O-β-D-xylopyranosyl-β-D-glucopyranosyl)oxy]kaur-16-en-18-oic acid β-D-glucopyranosyl ester; 13-[(3-O-β-D-glucopyranosyl-β-D-glucopyranosyl)oxy]kaur-16-en-18-oic acid β-D-glucopyranosyl ester; 13-[(2-O-6-deoxy-β-D-glucopyranosyl-3-O-β-D-glucopyranosyl-β-D-glucopyranosyl)oxy]kaur-16-en-18-oic acid β-D-glucopyranosyl ester; 13-[(2-O-6-deoxy β-D-glucopyranosyl-β-D-glucopyranosyl)oxy]kaur-16-en-18-oic acid β-D-glucopyranosyl ester; and mixtures thereof.

Additional exemplary sweetness enhancers include rebaudioside C, rebaudioside F, rebaudioside D, 13-[(2-O-β-D-glucopyranosyl-3-O-β-D-glucopyranosyl]-β-D-glucopyranosyl)oxy]-17-hydroxy-kaur-15-en-18-oic acid β-D-glucopyranosyl ester, 13-[(2-O-(3-O-β-D-glucopyranosyl)-β-D-glucopyranosyl-3-O-β-D-glucopyranosyl-β-D-glucopyranosyl)oxy]kaur-16-en-18-oic acid β-D-glucopyranosyl ester, and Rubusoside. Further for example, the at least one sweetness enhancer is chosen from rebaudioside A, stevioside, rebaudioside D, rebaudioside E, mogroside V, mogroside IV, brazzein, and monatin.

In one embodiment, the composition X as defined above is present in the sweetener composition in an amount effective to modify, mask, reduce and/or suppress an unpleasant off-taste, aftertaste or lingering sweetness of the at least one sweetener or the sweetness enhancer, wherein the amount is less than a taste threshold concentration associated with the composition X.

Preferably, the effect of the composition X remains at least as long as the taste of the at least one sweetener or the at least one sweetness enhancer is perceived.

As used herein, the term "taste threshold concentration associated with the composition X" means the minimum concentration at which a person can still taste the composition X as defined above by the human sense of taste, in particular in an aqueous solution. In some embodiments, the taste threshold concentration may vary from person to person.

Based on the description of the composition X as defined above and on the specific ranges as defined above a person skilled in the art will be able to select the amount effective to modify, mask, reduce and/or suppress an unpleasant off-taste, aftertaste or lingering sweetness of the at least one sweetener or the sweetness enhancer, wherein the amount is less than a taste threshold concentration associated with the composition X.

In a preferred embodiment, in the sweetener composition as defined above, the composition as defined above is present in an amount effective to modify, mask, reduce and/or suppress an unpleasant bitter and/or astringent aftertaste of acesulfame potassium. In one embodiment, the sweetener composition comprises from 0.5 wt % to 20 wt % of the composition X as defined above based on the total weight of the sweetener composition, e.g. from 1.0 wt % to 20 wt %, from 3 wt % to 18 wt % or from 4 wt % to 16 wt %, from 0.55 wt % to 18 wt %, from 0.60 wt % to 16 wt %, from 0.65 wt % to 14 wt %, from 0.70 wt % to 12 wt %, from 0.75 wt % to 10 wt %, from 0.80 wt % to 8 wt %, from 0.80 wt % to 7 wt %, from 0.80 to 6 wt %, from 0.80 to 5 wt %, from 0.85 wt % to 4 wt %, from 0.85 wt % to 3 wt %, from 0.85 wt % to 2.5 wt %, from 0.85 to 2.3 wt %, from 0.90 wt % to 2.2 wt %, 1.6 wt % to 2.2 wt % from 0.90 wt % to 2.1 wt %, from 1.0 wt % to 1.15 wt %, from 0.9 wt % to 1.2 wt %, from 0.90 to 2.0 wt %, or from 0.90 to 1.8 wt %.

In a preferred embodiment, the sweetener composition comprises at least 0.1 wt % of the composition X as defined above based on the total weight of the sweetener composition, e.g., 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 1.96 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt % or 3.0 wt %.

In one embodiment, the sweetener composition comprises from 80 wt % to 99.5 wt % of the at least one sweetener based on the total weight of the sweetener composition, e.g. from 82 wt % to 99.5 wt %, from 84 wt % to 99.4 wt %, from 94 wt % to 99.5 wt %, from 86 wt % to 99.3 wt %, from 88 wt % to 99.2 wt %, from 86 wt % to 99.1 wt %, from 88 wt % to 99.0 wt %, from 90 wt % to 98.9 wt %, from 92 wt % to 98.9 wt %, from 93 wt % to 98.9 wt %, from 93 wt % to 99 wt %, from 94.2 wt % to 98.1 wt %, from 94 wt % to 99.1 wt %, from 85.1 wt % to 98.9 wt %, from 94 wt % to 99.5 wt %, from 94 wt % to 98.9 wt %, from 94 wt % to 98.4 wt %, from 95 wt % to 98.9 wt %, from 82 wt % to 96 wt %, from 84 wt % to 94 wt % or from 86 wt % to 92 wt %.

In one embodiment, the sweetener composition comprises from 35 wt % to 99.9 wt % of acesulfame potassium based on the total weight of the sweetener composition, e.g. from 45 wt % to 99.9 wt %, from 50 wt % to 99.5 wt %, from 60 wt % to 99.5 wt %, from 70 wt % to 99.5 wt %, from 75 wt % to 99.0 wt %, from 70 wt % to 96 wt %, from 75 wt % to 95 wt %, from 76 wt % to 96 wt %, from 81 wt % to 91 wt %, from 80 wt % to 86 wt %, or from 83 wt % to 89 wt %.

In one embodiment, the sweetener composition comprises from 1 wt % to 50 wt % of sucralose based on the total weight of the sweetener composition, e.g. from 1 wt % to 40 wt %, from 3 wt % to 40 wt %, from 5 wt % to 35 wt %, from 5 wt % to 30 wt %, from 5 wt % to 15 wt %, from 5 wt % to 17 wt %, from 12 wt % to 25 wt %, from 15 wt % to 22 wt %, or from 9 wt % to 15 wt %.

In one embodiment, the sweetener composition further comprises from 0.1 wt % to 20 wt % of the composition X as defined above, e.g. from 0.5 wt % to 20 wt %, from 0.55 wt % to 18 wt %, from 0.60 wt % to 16 wt %, from 0.65 wt % to 14 wt %, from 0.70 wt % to 12 wt %, from 0.75 wt % to 10 wt %, from 0.80 wt % to 8 wt %, from 0.80 wt % to 7 wt %, from 0.80 to 6 wt %, from 0.80 to 5 wt %, from 0.85 wt % to 4 wt %, from 0.85 wt % to 3 wt %, from 0.85 wt % to 2.5 wt %, from 0.85 to 2.3 wt %, from 0.90 wt % to 2.2 wt %, 1.6 wt % to 2.2 wt % from 0.90 wt % to 2.1 wt %, from 1.0 wt % to 1.15 wt %, from 0.9 wt % to 1.2 wt %, from 0.90 to 2.0 wt %, or from 0.90 to 1.8 wt %.

In a preferred embodiment, the sweetener composition comprises from 77.0 wt % to 87.0 wt % acesulfame potassium. In one embodiment, the sweetener composition further comprises from 11.0 wt % to 19.0 wt % sucralose. In one embodiment, the sweetener composition further comprises 0.9 wt % to 2.2 wt % of the composition X as defined above. In one embodiment the sweetener composition may further comprise from 0.0 wt % to 5.0 wt % glycerol. The above weight percentages may be based on the total weight of the sweetener composition.

In a preferred embodiment, the sweetener composition comprises from 35 wt % to 99.9 wt % of acesulfame potassium based on the total weight of the sweetener composition, e.g. from 45 wt % to 99.9 wt %, from 50 wt % to 99.5 wt %, from 60 wt % to 99.5 wt %, from 70 wt % to 99.5 wt %, from 75 wt % to 99.0 wt %, from 70 wt % to 96 wt %, from 75 wt % to 95 wt %, from 77 wt % to 93 wt %, from 80 wt % to 90 wt %, from 82 wt % to 88 wt %, or from 83 wt % to 87 wt %. In one embodiment, the sweetener composition further comprises from 1 wt % to 50 wt % of sucralose based on the total weight of the sweetener composition, e.g. from 1 wt % to 40 wt %, from 3 wt % to 40 wt %, from 5 wt % to 35 wt %, from 5 wt % to 30 wt %, from 12 wt % to 25 wt %, or from 15 wt % to 22 wt %. In one embodiment, the sweetener composition further comprises from 0.1 wt % to 20 wt % of the composition X as defined above, e.g. from 0.5 wt % to 20 wt %, from 0.55 wt % to 18 wt %, from 0.60 wt % to 16 wt %, from 0.65 wt % to 14 wt %, from 0.70 wt % to 12 wt %, from 0.75 wt % to 10 wt %, from 0.80 wt % to 8 wt %, from 0.80 wt % to 7 wt %, from 0.80 to 6 wt %, from 0.80 to 5 wt %, from 0.85 wt % to 4 wt %, from 0.85 wt % to 3 wt %, from 0.85 wt % to 2.5 wt %, from 0.85 to 2.3 wt %, from 0.90 wt % to 2.2 wt %, 1.6 wt % to 2.2 wt % from 0.90 wt % to 2.1 wt %, from 1.0 wt % to 1.15 wt %, from 0.9 wt % to 1.2 wt %, from 0.90 to 2.0 wt %, or from 0.90 to 1.8 wt %.

In a preferred embodiment, the sweetener composition comprises from 45 wt % to 99.9 wt % of acesulfame potassium based on the total weight of the sweetener composition, e.g. from 60 wt % to 99.5 wt %, from 70 wt % to 99.5 wt %, from 75 wt % to 95 wt %, from 77 wt % to 93 wt %, from 80 wt % to 90 wt %, from 81 wt % to 89 wt %, or from 83 wt % to 89 wt %. In one embodiment, the sweetener composition further comprises from 1 wt % to 40 wt % of sucralose based on the total weight of the sweetener composition, e.g. from 3 wt % to 40 wt %, from 3 wt % to 35 wt %, from 3 wt % to 30 wt %, from 3 wt % to 25 wt %, from 5 wt % to 20 wt %, from 7 wt % to 17 wt %, from 9 wt % to 15 wt %, or from 10 wt % to 14 wt %. In one embodiment, the sweetener composition further comprises from 0.1 wt % to 20 wt % of the composition X as defined above, e.g. from 0.1 wt % to 18 wt %, from 0.1 wt % to 15 wt %, from 0.1 wt % to 10 wt %, from 0.1 wt % to 8 wt %, from 0.1 wt % to 5 wt %, from 0.1 wt % to 3 wt %, from 0.3 wt % to 8 wt %, from 0.3 to 5 wt %, from 0.3 to 3 wt %, from 0.5 wt % to 8 wt %, from 0.5 wt % to 5 wt %, from 0.5 wt % to 3 wt %, from 0.75 to 8 wt %, from 0.75 wt % to 5 wt %, 0.75 wt % to 3 wt %, from 1 wt % to 8 wt %, from 1 wt % to 5 wt %, from 1 wt % to 3 wt %, from 1.5 to 3 wt %, or from 1.5 to 2.5 wt %.

In a particularly preferred embodiment, the sweetener composition comprises from 82.0 wt % to 87.0 wt % acesulfame potassium, e.g., from 83.0 wt % to 86.4 wt % or from 83.5 wt % to 85.9 wt %. In one embodiment, the sweetener composition further comprises from 11.0 wt % to 12.0 wt % sucralose, e.g., from 11.2 wt % to 11.7 wt % or from 11.4 wt % to 11.6 wt %. In one embodiment, the sweetener composition further comprises 1.6 wt % to 2.2 wt % of the composition X, e.g., from 1.8 wt % to 2.0 wt % or from 1.85 wt. % to 1.89 wt %. In one embodiment the sweetener composition may comprise from 0.0 wt % to 5.0 wt % glycerol, e.g., from 0 wt. % to 4.0 wt. % or from 0.1 to 4.0 wt. %. The above weight percentages may be based on the total weight of the sweetener composition. Such embodiments are designated herein as "sweetener composition 1." These sweetener compositions 1, in one embodiment, are suitable for use in reducing the quantity of standard sugar such as sucrose that may be present in a consumable product.

In a particularly preferred embodiment, the sweetener composition comprises from 77.0 wt % to 82.0 wt % acesulfame potassium, e.g., from 77.4 wt % to 80.5 wt % or from 78 wt % to 80 wt %. In one embodiment, the sweetener composition further comprises from 17 wt % to 19 wt % sucralose, e.g., from 17.7 wt % to 18.4 wt % or from 17.8 wt % to 18.3 wt. %. In one embodiment, the sweetener composition further comprises 0.9 wt % to 1.2 wt % of the composition X, e.g., from 1.0 wt % to 1.1 wt % or from 1.0 wt. % to 1.05 wt. %. In one embodiment the sweetener composition may comprise from 0.0 wt % to 5.0 wt % glycerol, e.g., from 0 wt. % to 4.0 wt. % or from 0.1 to 4.0 wt. %. The above weight percentages may be based on the total weight of the sweetener composition. Such embodiments are designated herein as "sweetener composition 2." The preferred sweetener composition 2, in one embodiment, is suitable for reducing the quantity of standard sugar such as sucrose that may be present in a consumable product or for replacing or substantially replacing standard sugar such as sucrose that may be present in a consumable product.

In one embodiment, the at least one sweetness enhancer is present in an amount at or below the sweetness detection threshold level of the at least one sweetness enhancer. In some embodiments, the at least one sweetness enhancer is present in an amount below the sweetness detection threshold level of the at least one sweetness enhancer. The sweetness detection threshold level can be specific for a particular compound. However, generally, in some embodiments, the at least one sweetness enhancer is present in an amount ranging from 0.5 wppm to 3000 wppm, e.g., from 0.5 wppm to 1000 wppm, from 1 wppm to 300 wppm; from 0.1 wppm to 75 wppm.

As used herein, the terms "sweetness threshold," "sweetness recognition threshold," and "sweetness detection threshold" mean the level at which the lowest known concentration of a certain sweet compound is perceivable by the human sense of taste and it can vary from person to person. For example, a typical sweetness threshold level for sucrose in water can be 0.5%. Further, for example, the at least one sweetness enhancer to be used can be assayed in water at least 25% lower and at least 25% higher than the sucrose detection level of 0.5% in water to determine the sweetness threshold level. A person skilled in the art will be able to select the concentration of the at least one sweetness enhancer so that it may impart an enhanced sweetness to a composition comprising at least one sweetener. For example, a person skilled in the art may select a concentration for the at least one sweetness enhancer so that the at least one sweetness enhancer does not impart any perceptible sweetness to a composition that does not comprise at least one sweetener.

In some embodiments, the compounds listed above as sweeteners may also function as sweetness enhancers. Generally speaking, some sweeteners may also function as sweetness enhancers and vice versa. The sweetness enhancer(s)

may be present in the sweetener composition in the amounts discussed above with respect to the first sweetener.

In one embodiment of the invention, the sweetener composition of the invention is liquid at ambient conditions. In another embodiment of the invention, the sweetener composition of the invention is solid at ambient conditions.

The sweetener composition or the consumable product composition of the present invention may contain further additives known to those skilled in the art. These additives include but are not limited to dust control agents, bubble forming agents, surfactants, emulsifiers, slats, fats, gums, hydrocolloids, bulking agents, carriers, fibers, flavoring ingredients, flavor enhancers, flavor stabilizers, acidulants, anti-caking and free-flow agents. Such additives are for example described by H. Mitchell (H. Mitchell, "Sweeteners and Sugar Alternatives in Food Technology", Backwell Publishing Ltd, 2006, which is incorporated herein by reference in its entirety).

Preferably, the additional component is glycerol.

In one embodiment, the invention relates to a solution, e.g., a taste modifying solution, comprising a solvent and the composition X. Preferably, the solvent is or may include water or another polar solvent. Furthermore, the solvent may be or may include consumable organic solvent and/or a consumable inorganic solvent. Furthermore, the solvent, in particular water, may comprise one or more buffers like Tris/HCl, HEPES and the like.

In one embodiment, the composition X is dissolved in the solvent, thus forming the solution. In the solution, the composition X may be present in amounts ranging from 0.01 wppm to 1000 wppm, based on the total weight of the solution, e.g., from 0.05 to 1000 wppm, from 0.1 wppm to 1000 wppm, from 1 wppm to 1000 wppm, from 10 wppm to 1000 wppm, from 0.01 wppm to 500 wppm, from 0.05 wppm to 500 wppm, from 0.1 wppm to 500 wppm, from 1 wppm to 500 wppm, from 10 wppm to 500 wppm, from 0.01 wppm to 250 wppm, from 0.05 wppm to 250 wppm, from 0.1 wppm to 250 wppm, from 1 wppm to 250 wppm, or from 10 wppm to 250 wppm.

In one embodiment, the composition X and the components thereof may be present in the amounts (ranges) listed herein with respect to consumable product compositions. For example, if the composition X comprises naringin, the naringin may be present in the solution in a concentration from 0.5 wppm to 50 wppm, e.g. from 1 wppm to 40 wppm, from 2 wppm to 30 wppm, from 3 wppm to 20 wppm or from 4 wppm to 10 wppm.

In addition to the composition X and the solvent, the solution may further comprise at least one sweetener and/or at least one sweetness enhancer. In one embodiment, the at least one sweetener and/or sweetness enhancer may be those mentioned herein. In one embodiment, wherein a sweetner is included in the solution, the sweetener is preferably acesulfame potassium.

In one embodiment, the solution comprises the composition X and the sweetener. The composition X may be present in the solution in an amount such that, when the solution is added to a consumable product, the flavor of the sweetener (in the consumable product) is improved, as compared to a similar consumable product comprising the sweetner but not comprising the composition X.

In one embodiment, the solution comprises the composition X and the sweetener and the composition X may be present in the solution in an amount such that, when the solution is added to a consumable product, the composition X is not detectable by taste in the consumable product.

In one embodiment, the solution comprises the composition X and the sweetness enhancer and the sweetness enhancer may be present in the solution in an amount such that, when the solution is added to a consumable product, the sweetness enhancer is capable of enhancing a sweetness of the sweetener present in the consumable product composition. The composition X may be present in an amount such that the flavor of the composition X is not detectable by taste in the consumable product composition but still may be capable to exert its functions as defined herein.

In one embodiment, the solution may further comprise and acidic material, e.g., and edible acid. The acid may be present to maintain a preferred pH level in the solution. In one embodiment, the pH of the solution is less than 8, e.g., less than 7, less than 6, less than 5, less than 4, less than 3, or less than 2. Any suitable acidic material or combination of acidic materials may be used to achieve the desired pH levels. In one embodiment, the acidic material is combined with the other components. The order of the combination of components may vary widely.

In one embodiment, the solution may further comprise at least one preservative. The preservatives may vary widely. Many suitable preservatives are known in the art. In a preferred embodiment, the preservative comprises potassium sorbate.

In one embodiment, the solution may be processed to inactivate microorganisms that may be present in the solution. The processing step may vary widely. Many suitable processing steps are known in the art. For example, the solution may be subjected to UV treatment, microfiltration, pasteurization, and combinations thereof. This listing is merely exemplary and is not meant to limit the scope of potential processing steps.

In one embodiment, the sweetener composition has a sweetness level that is at least 190 greater than the sweetness level of natural sugar, e.g., granulated sugar. In one embodiment, the sweetener composition has a sweetness level ranging from 190 to 300 times the sweetness level of natural sugar, e.g., from 210 to 280 times the sweetness of natural sugar. Preferably, a 1 g portion of the sweetener composition is 190 to 300 times sweeter than a 1 gram portion of granulated sugar.

Preferably, a 1 gram portion of the sweetener composition provides sweetness comparable to one to three teaspoons of granulated sugar, preferably comparable to two teaspoons of granulated sugar. Preferably, one gram of the sweetener composition contains less calories and carbohydrates than 1 gram of granulated sugar, e.g., less than 0.5 grams of granulated sugar.

For example, the compositions may contain sweetness comparable to that of granulated sugar (sucrose), and therefore can be used "spoon-for-spoon" or "cup-for-cup" in place of sugar.

The form of the sweetener composition may vary widely. For example in one embodiment, the sweetener composition may be a fine, white powder. In one embodiment the sweetener composition is a fine white-yellow powder.

In one embodiment the sweetener composition has a solubility, e.g., at 20° C., of from 230 g/l to 310 g/l, e.g., from 250 g/l to 290 g/l, preferably being about 270 g/l. In one embodiment, the sweetener composition is stable at a pH ranging from 3.0 to 7.5. In one embodiment, the sweetener composition is pasteurization stable and/or UHT stable.

The sweetener composition may take any suitable form including, but not limited to, an amorphous solid, a crystal, a powder, a tablet, a liquid, a cube, a glaze or coating, a granulated product, an encapsulated form abound to or coated on to carriers/particles, wet or dried, or combinations thereof. In a preferred embodiment, the sweetener composition is a liquid at ambient conditions. In another embodiment, the sweetener composition is a solid at ambient conditions.

In one embodiment, the sweetener composition can be provided in pre-portioned packets or ready-to-use formulations, which include the sweetener composition. For example, in one embodiment in which a sweetener other than sucrose is employed, a single serving packet formulation (usually a 1 gram portion) can provide sweetness comparable to that contained in two teaspoons of granulated sugar (sucrose). It is known in the art that a "teaspoon" of sucrose contains approximately 4 grams of sucrose.

In another embodiment in which a sweetener other than sucrose is used, a volume of a ready-to-use formulation can provide sweetness comparable to the same volume of granulated sugar. Preferably, a single serving packet of the composition comprising the compound of formula (I) as defined above or a derivative or a stereoisomer or a salt or a hydrate thereof (e.g., 1 gram) can provide sweetness comparable to 0.9 to 9.0 grams of granulated sugar (sucrose). In another embodiment, 1 gram of the sweetener composition contains less calories and carbohydrates than 1 gram of granulated sugar.

Unless otherwise stated, all measurement numbers are presumed to have the word "about" in front of them if the word "about" is not expressly used. As used herein, the term "about" encompasses the range of experimental error that occurs in any measurement.

As used herein, the phrase "sweetness comparable" means that an experienced sensory evaluator, on average, will determine that the sweetness presented in a first composition X is within a range of 80% to 120% of the sweetness presented in a second composition X. The phrase "a sweetness comparable" relates to a determination ascertained by four or more experienced sensor evaluators in a sweetness matching test (designated hereinafter as "taste and spit assay"). Thus, for instance, 100 mg/ml of a sweetener composition provides "sweetness comparable" to 100 mg/ml of sucrose if the sweetener composition has a sweetness falling within the range of sweetness presented in 80-120 mg/ml of sucrose.

The sweetness properties of the sweetener composition, in some embodiments, can be identified by an in vitro in cell based assay as described in EP 1 865 316 B 1, which is incorporated herein by reference, or by field effector transistor technology of e.g. Alpha MOS.

The taste of the sweetener composition with regard to sweetness and/or sweetness enhancing properties and/or other tastes, in other embodiments, may be assessed in vivo by using a panel of trained sensory evaluators experienced in the sweet taste estimation procedure, e.g. in a taste and spit assay.

The taste-masking properties of the composition X as defined above, e.g., of the composition X as defined above is useful for modifying, masking, reducing and/or suppressing an unpleasant off-taste, aftertaste or lingering sweetness of the at least one sweetener and/or the sweetness enhancer in the sweetener composition may also be assessed using a taste and spit assay.

A taste and spit assay may also been used for assessing whether the effect of the composition X remains at least as long as the taste of the at least one sweetener or the at least one sweetness enhancer is perceived. A taste and spit assay may also be used in the analyses of other taste-related determinations and/or assessments.

In these cases, panelists are asked to take a sample of the liquid to be assessed, e.g., the sweetener composition comprising a composition X as defined above, into the mouth and after some time allowed for taste perception to spit the sample out completely. Subsequently, the panelists are asked to rinse their mouth well with water or black tea to reduce any potential carry over effects. The tasting of a sample can be repeated if required.

In a first descriptive test (qualitative assessment of the sweetener composition comprising the composition X as defined above for sweetness, off-taste, aftertaste and/or lingering sweetness) the panelists are asked to taste the quality of single samples (maximum 3 subsequent samples). The individuals of the taste panel are asked to answer the following questions with regard to the quality of taste: 1) does the sample taste sweet?, 2) is there another taste detectable (e.g. bitter, sour, salty, umami etc.)?, 3) is there any off- or aftertaste or lingering sweetness?, 4) is there anything else remarkable in the perception of the sample (e.g. rich taste)?

In a second test (qualitative assessment for taste masking properties of the composition X as defined above) the panelists are asked to answer questions in a pairwise comparison test to determine the taste-masking properties of the composition X as defined above. In this test the taste of the sweetener composition comprising the composition X as defined above is pairwise compared to the taste of the respective sweetener composition without the composition X as defined above. Again the panelists are given samples. Two samples are prepared for direct comparison regarding sweetness, off-taste, aftertaste and lingering sweetness.

One sample contains the sweetener composition without the composition X as defined above in a solvent. The other sample contains the sweetener composition comprising the composition X as defined above. Designation of the samples with A and B is randomized and is decoded after the taste procedure. The questions to be answered are: 1) does one sample taste sweeter than the other?, 2) if so, which one?, 3) are there any other differences in the taste between the two samples? The result of the taste and spit assay is a qualitative evaluation of the differences between the two samples.

Methods of Making a Sweetener Composition X

In another aspect, the present invention relates to a method of providing a sweetener or sweetness enhancer composition, comprising the step of adding to a sweetener or sweetness enhancer the composition X as defined above to yield a sweetener or sweetness enhancer composition. As a result, the sweetener or sweetness enhancer composition has substantially no unpleasant off-taste, aftertaste or lingering sweetness.

In one embodiment the invention relates to a method of providing a sweetener composition, comprising the step of adding to acesulfame potassium and sucralose the composition X as defined above to yield a sweetener composition. In a preferred embodiment, glycerol may be added to the sweetener composition.

In another aspect, the invention relates to a method of modifying, masking, reducing and/or suppressing the unpleasant off-taste, aftertaste or lingering sweetness of at least one sweetener or sweetness enhancer. The method comprises combining the composition X as defined above with the at least one sweetener or sweetness enhancer.

Preferably, the at least one sweetener (and/or sweetness enhancer) is selected from the group consisting of artificial and natural sweeteners as defined above. More preferably, the at least one sweetener is selected from the group consisting of acesulfame potassium, aspartame, sucralose and thaumatin. Most preferably the at least one sweetener is acesulfame potassium.

As discussed above, the composition of the invention may also be part of a liquid composition. Consequently, in a preferred embodiment, the present method of the invention also includes the step of dissolving the composition of the invention in a suitable solvent like water or another polar solvent.

Tabletop Sweetener Compositions

In another aspect, the present invention relates to tabletop sweetener compositions comprising the composition X as defined above and to methods of manufacturing such tabletop sweetener compositions.

As used herein, the term "tabletop sweetener," refers to sweetener compositions that comprise at least one sweetener, and optionally, at least one sweetness enhancer, which can be used in the preparation of various food items and/or as an additive to food items. As one example, the tabletop sweetener may be used in the preparation of baked goods or other sweetened foods. As another example, the tabletop sweetener may be used to season, sweeten, or otherwise customize a prepared food item, e.g., beverages, fruit, or yoghurt. In a preferred aspect, the tabletop sweetener is in a crystalline, granulated, or powder form. In various aspects, the tabletop sweetener will comprise one or more sweeteners and/or one or more sweetness enhancers. In one embodiment, the tabletop sweetener may comprise either or both a caloric sweetener and/or substantially non-caloric sweeteners, and, if appropriate, one or more sweetness enhancers. Typical examples of caloric sweeteners that may be used in tabletop sweeteners include sucrose, fructose, and glucose. Common tabletop forms of these caloric sweeteners include cane sugar, bee sugar, and the like. In recent decades, substantially non-caloric sweeteners have gained popularity. In many instances, these sweeteners can be used as substitutes for caloric sweeteners and are often referred to as "sugar substitutes."

In many instances, sugar substitutes provide a greater sweetening effect than comparable amounts of caloric sweeteners, such as sucrose or fructose. Therefore, smaller amounts of sugar substitutes are required to achieve sweetness comparable to that of an amount of sugar. Sugar substitutes, however, typically have a taste profile that differs from sucrose or fructose. Such differences include, but are not limited to, increased astringency, bitterness, various aftertastes, delayed onset of sweetness, and different mouthfeel. Therefore, sugar substitutes are often formulated with other materials that can provide bulk and can enhance the taste profile to be more similar to that of sucrose or fructose. Thus, sugar substitutes have been formulated to create a tabletop sweetener formulation that has a bulk and a taste profile that is comparable to sucrose or fructose. Nevertheless, consumers can still distinguish the low-calorie sweetener formulations from caloric tabletop sweeteners. Therefore, if low-calorie tabletop sweeteners are to replace caloric tabletop sweeteners, formulations of low-calorie sweeteners must be continuously improved to meet consumer demand.

Thus, there is a need for new tabletop sweetener formulations which are low in calories (or have no calories) containing novel taste-masking compositions, which can modify, mask, reduce and/or suppress an unpleasant off-taste, aftertaste or lingering sweetness in the oral cavity left by sweeteners or sweetness enhancers not having the disadvantages of known taste-masking substances. In particular, there is a great interest in new tabletop sweetener formulations comprising compositions having no taste of their own, which do not reduce the sweetening power of the sweetener or sweetness enhancer contained in the tabletop sweetener and in the best case even allow the quantity of sweetener or sweetness enhancer to be reduced. In particular, several or all unpleasant taste impressions including but not limited to bitter, astringent off-taste or aftertaste and/or lingering sweetness should be improved, i.e. reduced or suppressed.

Thus, in another aspect, the invention relates to a tabletop sweetener composition comprising (a) at least one sugar sweetener, which is selected from the group consisting of monosaccharides, disaccharides, oligosaccharides and polysaccharides, preferably the at least one sugar sweetener is selected from the group consisting of arabinose, dextrin, dextrose, fructose, high fructose corn syrup, fructooligosaccharides, fructooligosaccharide syrups, galactose, galactooligosaccharides, glucose, glucose and (hydrogenated) starch syrups/hydrolysates, isomaltulose, lactose, hydrolysed lactose, maltose, mannose, rhamnose, ribose, sucrose, stachyose, tagatose, trehalose, xylose, and combinations thereof, most preferably the at least one sugar sweetener is a disaccharide and/or fructose;

(b) at least one sugar alcohol (or polyol), which is selected from the group consisting of erythritol, galactitol, hydrogenated starch syrups including maltitol and sorbitol syrups, inositols, isomalt, lactitol, maltitol, mannitol, xylitol, and combinations thereof, preferably the at least one sugar alcohol is erythritol;

(c) at least one artificial or natural sweetener as defined above; and (d) a taste-masking amount of the composition X as defined above.

Preferably, the at least one artificial or natural sweetener is selected from the group consisting of acesulfame potassium, aspartame, sucralose and thaumatin.

As used herein, a "taste-masking amount" of the composition X as defined above means an amount of the composition X as defined above that imparts an unexpected improvement in the taste profile of e.g. tabletop sweetener compositions. As mentioned above, in some instances, for example, the taste-masking may be perceived as a reduction or masking of the bitterness of the sweetener composition, the tabletop sweetener composition or of the beverage or foodstuff containing the sweetener composition. In other instances, for example, the taste masking may also be perceived as an enhancement in the sweetness of the sweetener composition, the tabletop sweetener composition or of the beverage or foodstuff containing the sweetener composition. The taste masking may also be a combination of both bitterness reduction and sweetness enhancement.

In one embodiment, the tabletop sweetener composition comprises from 0.5 wt % to 20 wt % of the composition X as defined above based on the total weight of the tabletop sweetener composition, e.g. from 3 wt % to 18 wt % or from 4 wt % to 16 wt % of the composition X as defined above based on the total weight of the sweetener composition.

In one embodiment, the tabletop sweetener composition as defined above comprises the composition X as defined above in a taste-masking amount effective to modify, mask, reduce and/or suppress an unpleasant off-taste or aftertaste of the at least one artificial or natural sweetener, wherein the taste-masking amount is less than a taste threshold concentration associated with the composition X.

In a preferred embodiment, the tabletop sweetener composition as defined above comprises the composition X as defined above in an amount effective to modify, mask, reduce and/or suppress an unpleasant off-taste or aftertaste of acesulfame potassium, aspartame, sucralose or thaumatin wherein the amount is less than a taste threshold concentration associated with the composition X.

Preferably, the effect of the composition X remains at least as long as the taste of the sugar sweetener, the sugar alcohol and the at least one sweetener are perceived.

In one embodiment, the tabletop sweetener composition as defined above further comprises a taste-improving amount of cellulose.

In some embodiments, the tabletop sweetener composition comprises a disaccharide and contains no fructose. In other embodiments, the tabletop sweetener composition comprises fructose and does not contain disaccharide. In other embodiments, the tabletop sweetener compositions comprise both a disaccharide and fructose.

As used herein, the terms "sugar sweetener(s)" or "carbohydrate(s)" refer to monosaccharides, disaccharides, oligosaccharides and polysaccharides such as but not limited to arabinose, dextrin, dextrose, fructose, high fructose corn syrup, fructooligosaccharides, fructooligosaccharide syrups, galactose, galactooligosaccharides, glucose, glucose and (hydrogenated) starch syrups/hydrolysates, isomaltulose, lactose, hydrolysed lactose, maltose, mannose, rhamnose, ribose, sucrose, stachyose, tagatose, trehalose, xylose, and combinations thereof.

As used herein, the term "disaccharide" refers to any sugar having two monosaccharide units. The monosaccharide units may exist as either ketones or aldehydes, and may have either a cyclic or acyclic structure. When a monosaccharide exists as a cyclic structure, the monosaccharide may exist as a hemiacetal or hemiketal, among other forms. Moreover, when a monosaccharide exists as a cyclic structure, either anomer is included within this definition. Illustrative monosaccharides include trioses, tetroses, pentoses, hexoses, heptoses, octoses, and nonoses. In forming a disaccharide, the monosaccharide units may bond to form either reducing disaccharides or non-reducing disaccharides.

As used herein, the terms "sugar alcohol(s)" or "polyol(s)" refer to sugar alcohols such as but not limited to erythritol, galactitol, hydrogenated starch syrups including maltitol and sorbitol syrups, inositols, isomalt, lactitol, maltitol, mannitol, xylitol, and combinations thereof.

As used herein, the term "erythritol" refers to a sugar alcohol well known to the skilled person. Erythritol, in either food grade or reagent grade is readily available through commercial sources.

As used herein, the term "cellulose" refers to any cellulosic material known to the skilled person. In typical embodiments, the cellulose includes polysaccharides having linear chains of at least several hundred beta-linked D-glucose units. When obtained from commercial sources, for example, the cellulose may exist as a powder. Further, in typical embodiments, the cellulose is insoluble or substantially insoluble in water; yet, in an application like tabletop sweeteners, when incorporated in such an application, it preferably will not detract substantially from the overall product dissolution. Chemically modified celluloses can be employed in the compositions as defined above provided the modifications do not result in water soluble material. The cellulose may have any particle size (or particle size distribution) that is suitable for use in a sweetener composition. For example, in some embodiments, the size of the cellulose particles may range from 1 micron to 400 microns, e.g., from 3 microns to 300 microns, from 5 microns to 200 microns, or from 6 microns to 100 microns. In some embodiments, the insoluble cellulose is a cellulose that if used in amounts exceeding 1% in an aqueous medium can lead to significant viscosity change.

In some embodiments, a "taste-improving amount" of cellulose is used. This "taste-improving amount" refers to an amount of cellulose that imparts an unexpected improvement in the taste profile of sweetener compositions In some instances, for example, the taste improvement may be perceived as an enhancement in the sweetness of the sweetener composition or of the beverage or foodstuff containing the sweetener composition. In other instances, for example, the taste improvement may be perceived as a reduction or masking of the bitterness of the sweetener composition or of the beverage or foodstuff containing the sweetener composition. The taste improvement may also be a combination of both sweetness enhancement and bitterness reduction. In some embodiments of the sweetener compositions, the taste-improving amount of cellulose ranges from 0.4 wt % to 3.0 wt %, e.g., from 0.7 wt % to 2.0 wt %, of cellulose, based on the total weight of the sweetener composition. In some embodiments, the sweetener composition contains 1 wt % cellulose, based on the total weight of the sweetener composition.

In one embodiment, the disaccharide includes, but is not limited to, disaccharides containing glucose, fructose, and galactose. In another embodiment, the disaccharide includes, but is not limited to, sucrose, lactose, maltose, trehalose, and isomaltulose. In another embodiment, the disaccharide is isomaltulose.

In a preferred embodiment, the disaccharide is selected from the group consisting of sucrose, lactose, maltose, trehalose, and isomaltulose.

Sweetener compositions may contain varying amounts of at least one sugar sweetener, in particular of a disaccharide and/or fructose, of at least one sugar alcohol, in particular of erythritol, of the artificial or natural sweetener as defined above, and of cellulose. The desired amount of artificial or natural sweetener as defined above may vary depending on, among other factors, the desired use of the tabletop sweetener composition, the presence or absence of other components in the tabletop sweetener composition, the identity of any sugar sweetener, in particular of a disaccharide, if present, and the presence or absence of fructose.

In some embodiments, the tabletop sweetener composition contains from 40 wt % to 90 wt % sugar alcohol, in particular erythritol, based on the total weight of the sweetener composition, e.g., from 50 wt % to 60 wt %, from 55 wt % to 65 wt %, from 57 wt % to 63 wt %, or from 60 wt % to 62 wt %. In a preferred embodiment, the sweetener composition contains more than 50 wt % sugar alcohol, in particular erythritol, based on the total weight of the sweetener composition.

In some embodiments, the tabletop sweetener composition contains from 27 wt % to 50 wt % sugar sweetener, in particular disaccharide, based on the total weight of the sweetener composition, e.g., from 35 wt % to 45 wt %, from 30 wt % to 40 wt %, from 30 wt % to 38 wt %, from 32 wt % to 36 wt %, or from 33 wt % to 35 wt %. In some such embodiments, the sweetener composition contains 41 wt % of sugar sweetener, in particular disaccharide, based on the total weight of the sweetener composition. In still other embodiments, the tabletop sweetener composition contains 33-34 wt % of sugar sweetener, in particular disaccharide, based on the total weight of the sweetener composition. In a preferred embodiment, the sugar sweetener is isomaltulose.

In some embodiments, the sweetener composition contains from 0.5 wt % to 7.0 wt % of the artificial or natural sweetener as defined above, based on the total weight of the sweetener composition, e.g., from 0.7 wt % to 5.0 wt %, or from 1.0 wt % to 2.5 wt %. The amount of the artificial or natural sweetener as defined above used may in certain situations depend on the purity of the material. In one embodiment, the tabletop sweetener composition as defined above comprises from 0.5 wt % to 7.0 wt % acesulfame potassium, aspartame, sucralose or thaumatin.

In another embodiment, tabletop sweetener compositions as defined above contain (a) from 38 wt % to 43 wt % of isomaltulose; (b) from 50 wt % to 60 wt % erythritol; (c) from 0.75 wt % to 1.75 wt % the artificial or natural sweetener as defined above; and (d) from 4 wt % to 16 wt % composition as defined above; based on the total weight of the tabletop sweetener composition.

In another embodiment, tabletop sweetener compositions of the invention contain (a) from 30 wt % to 38 wt % of isomaltulose; (b) from 55 wt % to 65 wt % erythritol; (c) from 0.75 wt % to 1.75 wt % the artificial or natural sweetener as defined above; and (d) from 4 wt % to 16 wt % composition X as defined above based on the total weight of the tabletop sweetener composition.

Tabletop sweetener compositions of the invention may also contain amounts of other ingredients in addition to the sugar sweeteners such as disaccharide and/or fructose, the sugar alcohol such as erythritol, the artificial or natural sweetener as defined above and cellulose. Such additional ingredients include, but are not limited to, sweetness modifiers, mouthfeel enhancers, flavoring ingredients (e.g., vanilla flavoring), and the like. Honey and/or evaporated cane juice may be used in place of or in combination with the sugar alcohol, in particular in place of or in combination with erythritol. Natural flavors and other ingredients are preferred when the product is to be labeled as "all-natural."

In another embodiment, the tabletop sweetener composition comprises less than 2 wt % of a sweetness modifier, e.g., less than 1 wt %. In terms of ranges, the tabletop sweetener composition may, for example, comprise between 0.01 wt % and 2 wt % sweetness modifier, in particular between 0.1 wt % and 1.5 wt % sweetness modifier.

In another embodiment, the tabletop sweetener composition comprises less than 1 wt % of a mouthfeel enhancer, e.g., less than 0.5 wt %. In terms of ranges, the tabletop sweetener composition may, for example, comprise between 0.01 wt % and 1 wt % mouthfeel enhancer, in particular between 0.1 wt % and 0.5 wt % mouthfeel enhancer.

In another embodiment, the tabletop sweetener composition comprises less than 1 wt % of a flavoring ingredient, e.g., less than 0.5 wt %. In terms of ranges, the tabletop sweetener composition may, for example, comprise between 0.01 wt % and 1 wt % flavoring ingredient, in particular between 0.1 wt % and 0.5 wt % flavoring ingredient.

In some embodiments, sweetener compositions of the invention provide at least one, if not more than one, of the following desirable characteristics: (a) fewer calories per gram than standard table sugar; (b) fewer calories than an amount of standard table sugar perceived as providing comparable sweetness; and (c) lower glycemic index than that of standard table sugar. In some embodiments, the sweetener composition has less than 5 calories/gram, or less than 3 calories/gram, or less than 1 calorie/gram. As used herein, the term "calorie" refers to the unit of energy commonly appearing on the packaging of food and/or beverage items sold in the United States. The term, as such, does not refer to 1 cal. of energy, but rather corresponds to approximately 1 kcal. of energy. In a typical tabletop sweetener application, for example, the sweetener composition can be packaged in a form where it provides a similar sweetness to 7 grams of sucrose, preferably 5 g of sucrose, while providing less than 5 calories.

In another embodiment, tabletop sweetener compositions of the invention contain a plurality of sweetener particles, wherein such particles contain one or more of the ingredients present in the tabletop sweetener composition. In some embodiments, the tabletop sweetener composition substantially comprises sweetener particles. In such embodiments, the tabletop sweetener composition contains at least 80 wt % sweetener particles, or at least 85 wt % sweetener particles, or at least 90 wt % sweetener particles, based on the total weight of the tabletop sweetener composition.

Sweetener particles, when present in the tabletop sweetener composition, can have any size suitable for use of the composition as a sweetener. In some embodiments, the average size of the sweetener particles is between 50 microns and 1250 microns, e.g., between 100 microns and 1000 microns. Screening to eliminate particles of undesired sizes can be carried out during the manufacturing process. Thus, in some embodiments, the particle sizes, after screening to eliminate undesired large particles which may be as large as 1500 μm, may vary up to 16 mesh, e.g., up to 14 mesh, or up to 12 mesh, based on the standard United States sieve scale. Further, smaller particle sizes, e.g., 50 mesh, 100 mesh, or 150 mesh, or particles having sizes less than 1 μm, e.g., less than 0.5 μm, may be present with the larger particles. Screening to eliminate particles having sizes less than, for example, 100 mesh or 150 mesh can be carried out if desired.

Sweetener particles in the tabletop sweetener composition may or may not have uniform composition. Preferably, the tabletop sweetener compositions of the invention comprise the artificial or natural sweetener as defined above and an effective amount of the composition X as defined above where the composition is a mixture of particles. More specifically, the mixture comprises (a) particles having an erythritol core and (b) particles having a disaccharide core and the artificial or natural sweetener as defined above and the composition X as defined above, as well as other components, are predominantly coated on the particles. These coatings on the cores can be either a continuous phase or a discontinuous phase, i.e., where the different coating components form discrete regions in the core coatings.

Thus, in another aspect, the invention relates to a tabletop sweetener composition comprising:
(a) a plurality of first sweetener particles, where the first sweetener particles have (i) a sugar alcohol core, in particular an erythritol core, (ii) a first sugar alcohol core-coating layer, in particular a first erythritol core-coating layer comprising the artificial or natural sweetener as defined above and the composition X as defined above, and (iii) a second sugar alcohol core-coating layer, in particular a second erythritol core-coating layer comprising a sugar sweetener, in particular a disaccharide carbohydrate, where the second sugar alcohol core-coating layer, in particular the second erythritol core-coating layer is disposed over the first sugar alcohol core-coating layer, in particular over the erythritol core-coating layer; and
(b) a plurality of second sweetener particles, where the second sweetener particle has (i) a sugar sweetener core, in particular a disaccharide core, (ii) a first sugar sweetener core-coating layer, in particular a first disaccharide core-coating layer comprising the artificial or natural sweetener as defined above and the composition X as defined above, and (iii) a second sugar sweetener core-coating layer, in particular a second disaccharide core-coating layer comprising a sugar sweetener, in particular a disaccharide carbohydrate, where the second sugar sweetener core-coating layer, in particular the second disaccharide core-coating layer, is disposed over the first sugar sweetener core-coating layer, in particular over the disaccharide core-coating layer.

In such embodiments, the core-coating layers may or may not have uniform compositions, and may or may not substantially coat the underlying core or layer. In some embodiments, the first sugar alcohol core-coating layer, in particular the first erythritol core-coating layer and/or the first sugar sweetener core-coating layer, in particular the first disaccharide core-coating layer have discrete regions of the artificial or natural sweetener as defined above and the composition X as defined above.

In another embodiment, the tabletop sweetener composition comprises a mixture of the plurality of first sweetener particles and the plurality of second sweetener particles.

In another embodiment of the tabletop sweetener composition, the sugar sweetener core, in particular the disaccharide core contains isomaltulose. Further, in some embodiments, the second sugar alcohol core-coating layer in particular the second erythritol core-coating layer and/or the second sugar sweetener core-coating layer in particular the disaccharide core-coating layer contain isomaltulose.

These tabletop sweetener compositions may also contain flavoring ingredients (e.g., vanilla flavor), mouthfeel enhancers, and/or sweetness modifiers. When one or more of these are present, the first sugar alcohol core-coating layer, in particular the first erythritol core-coating layer and/or the sugar sweetener core-coating layer in particular the disaccharide core-coating layer may contain one or more of flavoring ingredients (e.g., vanilla flavor), mouthfeel enhancers, and/or sweetness modifiers. Moreover, as used herein, the term "layer" may or may not refer to a material that entirely surrounds the underlying material. Thus, a "layer" may be non-uniform in composition and may provide only discontinuous coverage of the underlying material. Moreover, when one layer covers another, the boundary between the layers may or may not be discrete; thus, the boundary between layers may be continuous or semi-continuous.

In the sweetener compositions described herein, the tabletop sweetener compositions may or may not contain other particles in addition to the plurality of first sweetener particles and the plurality of second sweetener particles. The first sweetener particles and the second sweetener particles may have any particle size that is suitable for use of the composition X as a sweetener.

In some embodiments, the average size of the first sweetener particles and second sweetener particles is between 50 microns and 1250 microns, e.g., between 100 microns and 1000 microns. In some embodiments, the particle sizes of the first sweetener particles and the second sweetener particles, after screening to eliminate undesired large particles which may be as large as 1500 μm, will vary up to 16 mesh, e.g., up to 14 mesh, or up to 12 mesh, based on the standard United States sieve scale. Further, smaller particle sizes, e.g., 50 mesh, 100 mesh, or 150 mesh, or particles having sizes less than 1 μm, e.g., less than 0.5 μm, will be present with the larger particles. In some embodiments, the tabletop sweetener composition comprises a mixture of the plurality of first sweetener particles and the second sweetener particles. Such a mixture may or may not contain other types of particles.

The layers in the sweetener composition particles are generally not distinct, i.e., there is no clear demarcation between the first layer and the second layer. For example, in one embodiment, the first layer contains the artificial or natural sweetener as defined above, optional flavoring components, etc., all encased in sugar sweetener, in particular encased in disaccharide; and the second layer will be predominantly sugar sweetener, in particular disaccharide with some of the other components. The relative quantities of the various components in the layers, and whether there are layers in the particles, can be modified as necessary by adjusting when during the manufacturing process the components are added.

In some embodiments of the invention, the tabletop sweetener composition comprises the artificial or natural sweetener as defined above and a taste-masking amount of the composition X as defined above as a mixture, where the mixture comprises (a) particles having a sugar alcohol core, in particular an erythritol core and (b) particles having a sugar sweetener core, in particular a disaccharide core. In some such embodiments, the disaccharide core comprises isomaltulose. Further, in some such embodiments, the sugar alcohol core, in particular the erythritol core and/or the sugar sweetener core, in particular the disaccharide core further comprise coating layers having discrete regions of the artificial or natural sweetener as defined above and the composition X as defined above. When such coating layers are present, the coating layers may or may not substantially coat the underlying core material. These particles may have any particle size that is suitable for use of the composition X as a sweetener. In some embodiments, the average size of the particles is between 50 microns and 1250 microns, e.g., between 100 microns and 1000 microns. In some embodiments, the particle sizes of the particles range from 16 mesh, or from 14 mesh, or from 12 mesh to 100 mesh, based on the standard United States sieve scale.

Sweetener compositions of the invention may have any dissolution rate in water that is suitable for their use as sweeteners. In some embodiments, the sweetener composition can have a dissolution rate in water at 10° C. of between 100 seconds and 200 seconds, e.g., between 125 seconds and 175 seconds, or between 140 seconds and 160 seconds, based on the dissolution of 2 grams of the sweetener composition in 240 ml of water. In some embodiments, the sweetener composition can have a dissolution rate in water at 45° C. of between 50 seconds and 150 seconds, e.g., between 75 seconds and 125 seconds, or between 85 seconds and 110 seconds, based on the dissolution of 2 grams of the sweetener composition in 240 ml of water. In some embodiments, the dissolution rate of the sweetener composition is 150 seconds at 10° C. and 96 seconds at 45° C., based on the dissolution of 2 grams of the sweetener composition in 240 ml of stirred water.

In another embodiment, the invention relates to single-serving packets.

In another embodiment, the invention relates to tabletop sweeteners comprising the artificial or natural sweetener as defined above. Preferably, the tabletop sweetener is a tabletop tablet sweetener, tabletop "spoon to spoon" sweetener, tabletop "sachet" sweetener, tabletop liquid sweetener. The tabletop sweeteners, in addition to the artificial or natural sweetener as defined above may contain further substances including but not limited to binding agents, citric acid, cyclamate, lactose, carboxymethylcellulose, leucin, maltodextrin, isomalt, NHDC, potassium hydroxide (in aqueous solution), dextrose, other bulking agents, sodium cyclamate, sodium hydrogen carbonate, sodium saccharin and tartaric acid.

In another embodiment, the invention relates to a package containing a predetermined amount, e.g., from 0.8 grams to 3.5 grams, of a solid tabletop sweetener composition, where the predetermined amount of the solid tabletop sweetener composition has a sweetness equivalent to four times (by weight) the predetermined amount of sucrose, and where the solid sweetener composition comprises:
(a) from 38 wt % to 43 wt % of isomaltulose;
(b) from 50 wt % to 60 wt % erythritol;
(c) from 0.75 wt % to 1.75 wt % of the artificial or natural sweetener as defined above; and
(d) from 4 wt % to 16 wt % the composition X as defined above.

In another embodiment, the invention relates to a package containing a predetermined amount, e.g., from 0.8 grams to 3.5 grams, of a solid sweetener composition, where the predetermined amount of the solid sweetener composition has a sweetness equivalent to four times (by weight) the predetermined amount of sucrose, and where the solid sweetener composition comprises:
(a) from 30 wt % to 38 wt % of isomaltulose;
(b) from 55 wt % to 65 wt % erythritol;
(c) from 0.75 wt % to 1.75 wt % of the artificial or natural sweetener as defined above; and
(d) from 4 wt % to 16 wt % the composition X as defined above.

In the tabletop sweetener packages containing a predetermined amount of the solid tabletop sweetener composition, the predetermined amount may be 1 gram and may have a sweetness equivalent to 4 grams of sucrose, or the predetermined amount may be 2 grams and may have a sweetness equivalent to 8 grams of sucrose.

The tabletop sweetener packages may contain a formulation for a ready-to-use sweetener or tabletop sweetener compositions in the form of cubes for use, for example, in restaurants. The cubes weigh approximately 8 grams and are of equivalent size to a standard cube of granulate sugar, which is 2.2 cm×2.2 cm×1 cm.

Tabletop sweetener compositions of the invention may have any bulk density that is suitable for their use as sweeteners. In some embodiments, the bulk density of the sweetener composition ranges from 0.5 g/cm³ to 1.0 g/cm³, or from 0.7 g/cm³ to 0.8 g/cm³. In some embodiments, the bulk density of the sweetener composition is 0.76 g/cm³.

In another aspect, the invention relates to a method of making a tabletop sweetener composition, comprising the steps of:
a) providing a fluid-bed coating apparatus;
b) introducing dry sugar sweetener, in particular disaccharide and/or fructose; dry sugar alcohol, in particular erythritol; dry artificial or natural sweetener as defined above; and dry composition X as defined above powder to the fluid-bed coating apparatus;
c) charging a substantially all of the dry ingredients in the fluid-bed coating apparatus;
d) spraying a coating solution into the fluid-bed coating apparatus to form coated sweetener particles; and
e) drying the coated sweetener particles.

In another aspect, the invention relates to a method of making a tabletop sweetener composition, comprising the steps of:
a) providing a fluid-bed coating apparatus;
b) introducing dry sugar sweetener, in particular disaccharide carbohydrate and/or fructose; dry sugar alcohol, in particular erythritol; and dry artificial or natural sweetener as defined above to the fluid-bed coating apparatus;
c) charging a substantially all of the dry ingredients in the fluid-bed coating apparatus;
d) spraying a coating solution into the fluid-bed coating apparatus to form coated sweetener particles;
e) during the spraying step, introducing dry composition X as defined above powder to the fluid-bed coating apparatus; and
f) drying the coated sweetener particles.

The methods of the invention described above may be carried out as described in WO 2010/025158 A1, which is incorporated herein by reference in its entirety.

Consumables Containing a Composition X of the Invention, a Sweetener Composition of the Invention or a Tabletop Sweetener Composition of the Invention The compositions X of the invention as defined above or a sweetener composition of the invention as defined above can be added to any consumable products including but not limited to beverages, dental products, cosmetic products, pharmaceutical products and animal feed or animal food, in particular to beverages. The tabletop sweetener compositions of the invention as described above can be added to any consumable products, which are produced in a household or on a small scale. Such consumable products may contain an amount of natural sugar.

Thus, in another aspect, the invention relates to a consumable product composition comprising
(a) a consumable product; and
(b) a composition X as defined above.

Thus, in another aspect, the invention relates to a consumable product composition comprising
(a) a consumable product; and
(b) a sweetener composition as defined above.

Thus, in another aspect, the invention relates to a consumable product composition comprising
(a) a consumable product; and
(b) a tabletop sweetener composition as defined above.

The invention, in another aspect, further relates to a consumable product composition as defined above, wherein the composition X as defined above is present in the consumable product composition in an amount effective to modify, mask, reduce and/or suppress an unpleasant off-taste, aftertaste or lingering sweetness of at least one sweetener, a sweetness enhancer or a consumable product, wherein the amount is less than a taste threshold concentration associated with the composition X.

Preferably, the effect of the composition X remains as long as the taste of the sweetener, the sweetness enhancer or the consumable product are perceived.

Preferably, the unpleasant off-taste of the sweetener, the sweetness enhancer or the consumable product is an acidic off-taste, an astringent off-taste, a bitter off-taste, a liquorice off-taste, a metallic off-taste or a throat-burning off-taste.

Preferably, the unpleasant aftertaste of the sweetener, the sweetness enhancer or the consumable product is an astringent or bitter aftertaste.

Preferably, the composition X as defined above is present in an amount effective to impart rich taste to a consumable product.

As used herein, the unit "wppm" refers to weight parts per million and means 1 part per kilogram, i.e. 1 milligram per kilogram.

In one embodiment, the composition X as defined above is present in the consumable product composition in a concentration from 0.01 wppm to 50 wppm, e.g. from 0.05 wppm to 40 wppm, from 0.1 wppm to 30 wppm, from 0.15 wppm to 20 wppm, from 0.2 wppm to 10 wppm, from 0.3 wppm to 9 wppm, from 0.4 wppm to 8 wppm, from 0.5 wppm to 7 wppm, from 0.6 wppm to 6 wppm.

In a preferred embodiment, the consumable product composition comprises the sweetener composition 1. The composition X as defined above is present in the consumable product composition in a concentration from 1.00 wppm to 8 wppm, e.g. from 1.80 wppm to 6 wppm, e.g., from 2.1 wppm to 5.3 wppm, from 2.5 wppm to 5.3 wppm, from 1.7 wppm to 4.4 wppm, from 2.0 to 4.4 wppm, or from 2.4 wppm to 6 wppm.

In a preferred embodiment, the consumable product composition comprises the sweetener composition 2. The composition X as defined above is present in the consumable product composition in a concentration from 0.3 wppm to 8 wppm, e.g. from 0.5 wppm to 6 wppm, from 0.7 wppm to 1.7 wppm, from 2.5 wppm to 4.4 wppm, from 3.4 wppm to 4.9 wppm, from 2.2 wppm to 3.8 wppm, from 0.6 to 1.4 wppm, from 2.1 wppm to 3.6 wppm, from 2.7 wppm to 4 wppm, from 1.8 wppm to 3.1 wppm, from 0.8 wppm to 1.8 wppm, from 2.7 wppm to 4.8 wppm, from 3.7 to 5.3 wppm, from 2.4 wppm to 4.1 wppm.

Preferably, the sweetener composition of the invention and the tabletop sweetener composition of the invention are present in the consumable in an amount effective to increase a sweetness level of the consumable.

In one embodiment, the sweetener composition as defined as defined above is present in the consumable product composition in a concentration from 0.1 wppm to 900 wppm, e.g. from 10 wppm to 850 wppm, from 50 wppm to 800 wppm, from 100 wppm to 750 wppm, from 60 wppm to 500 wppm, from 70 wppm to 400 wppm, from 110 wppm to 270 wppm, from 130 wppm to 270 wppm, from 70 wppm to 150 wppm, from 230 wppm to 400 wppm, from 310 wppm to 440 wppm or from 200 wppm to 340 wppm.

In one embodiment, the tabletop sweetener composition as defined above is present in the consumable product composition in a concentration from 0.1 wppm to 80 wppm, e.g. from 0.2 wppm to 50 wppm, from 0.5 wppm to 10 wppm or from 1 wppm to 5 wppm.

Preferably, the sweetener composition or the tabletop sweetener composition of the consumable product composition comprises acesulfame potassium.

In one embodiment, acesulfame potassium is present in the consumable product composition in a concentration from 0.1 wppm to 900 wppm, e.g. from 10 wppm to 850 wppm, from 50 to 800 wppm or from 100 to 750 wppm.

Preferably, the sweetener composition or the tabletop sweetener composition of the consumable product composition comprises acesulfame potassium and sucralose.

In one embodiment, sucralose is present in the consumable product composition in a concentration from 0.1 wppm to 900 wppm, e.g. from 10 wppm to 850 wppm, from 50 wppm to 800 wppm or from 100 wppm to 750 wppm.

Preferably, the sweetener composition or the tabletop sweetener composition of the consumable product composition comprises acesulfame potassium and thaumatin.

The following consumable products and their ingredients are suitable for use in embodiments of the present invention.

Consumable products include all food products, including but not limited to cereal products, rice products, tapioca products, sago products, baker's products, biscuit products, pastry products, bread products, confectionery products, desert products, gums, chewing gums, chocolates, ices, honey products, treacle products, yeast products, baking-powder, salt and spice products, savoury products, mustard products, vinegar products, sauces (condiments), tobacco products, cigars, cigarettes, processed foods, cooked fruits and vegetable products, meat and meat products, jellies, jams, fruit sauces, egg products, milk and dairy products, yoghurts, cheese products, butter and butter substitute products, milk substitute products, soy products, edible oils and fat products, pharmaceuticals, beverages, carbonated beverages, alcoholic drinks, beers, soft drinks, mineral and aerated waters and other non-alcoholic drinks, fruit drinks, fruit juices, coffee, artificial coffee, tea, cacoa, including forms requiring reconstitution, food extracts, plant extracts, meat extracts, condiments, sweeteners, nutraceuticals, gelatins, pharmaceutical and non-pharmaceutical gums, tablets, lozenges, drops, emulsions, elixirs, syrups and other preparations for making beverages, and combinations thereof.

As used herein, the term "non-alcoholic drinks" includes, but is not limited to all non-alcoholic drinks mentioned in the Directive 2003/115/EC of 22 Dec. 2003 and in the Directive 94/35/EC of 30 Jun. 2004, which are incorporated herein by reference, on sweeteners for use in foodstuffs. Examples include, but are not limited to water-based, flavored drinks, energy-reduced or with no added sugar, milk- and milk-derivative-based or fruit-juice-based drinks, energy-reduced or with no added sugar, "Gaseosa": non-alcoholic water-based drink with added carbon dioxide, sweeteners and flavorings.

Consumable products include without limitation, water-based consumable products, solid dry consumable products, dairy products, dairy-derived products and dairy-alternative products.

In one embodiment, the consumable product is a water-based consumable product selected from the group consisting of beverage, water, near water drink, aqueous beverage, enhanced/slightly sweetened water drink, flavored carbonated and still mineral and table water, non-carbonated beverage, carbonated water, still water, soft drink, carbonated soft drink, non-alcoholic drink, alcoholic drink, beer, wine, liquor, fruit drink, juice drink, juice, fruit juice, vegetable juice, nectar, broth drink, coffee, tea, black tea, green tea, oolong tea, herbal infusion, cacoa (water-based), tea-based drink, coffee-based drinks, cacao-based drink, dessert, syrup, frozen fruit, frozen fruit juice, water-based ice, fruit ice, sorbet, dressing, salad dressing, jams, marmalades, canned fruit, savoury, delicatessen products like delicatessen salads, sauces, ketchup, mustard, pickles and marinated fish, sauce, soup, and beverage botanical materials (whole or ground), or instant powder for reconstitution (coffee beans, ground coffee, instant coffee, cacao beans, cacao powder, instant cacao, tea leaves, instant tea powder).

Near water drinks as used herein, are drinks comprising lower sensory attributes in terms of sweetness, acidity, flavor, color compared to other categories. Near water drinks are containing the major traditionally used ingredients known in the beverage industry but at lower dosage to achieve a character closer to water.

In another embodiment, the consumable product is a solid dry consumable product selected from the group consisting of cereals, baked food products, biscuits, bread, breakfast cereal, cereal bar, energy bars/nutritional bars, granola, cakes, rice cakes, cookies, crackers, donuts, muffins, pastries, confectioneries, chewing gum, chocolate products, chocolates, fondant, candy, hard candy, marshmallow, pressed tablets, snack foods, botanical materials (whole or ground), and instant powders for reconstitution.

In another embodiment, the consumable product is a dairy product, dairy-derived product and/or dairy-alternative product selected from the group consisting of milk, fluid milk, cultured milk product, cultured and noncultured dairy-based drink, cultured milk product cultured with lactobacillus, yoghurt, yoghurt-based beverage, smoothy, lassi, milk shake, acidified milk, acidified milk beverage, butter milk, kefir, milk-based beverages, milk/juice blend, fermented milk beverage, icecream, dessert, sour cream, dip, salad dressing, cottage cheese, frozen yoghurt, soy milk, rice milk, soy drink, and rice milk drink.

In a preferred embodiment, the consumable product is a beverage.

In a particularly preferred embodiment, the beverage is a near water drink, a tea-based drink, a carbonated soft drink, a juice drink or nectar.

In a particularly preferred embodiment, the consumable product is a tea-based drink comprising the sweetener composition 1, and the composition X as defined above is present in the tea-based drink in a concentration from 1.50 wppm to 6.0 wppm, e.g. from 1.76 wppm to 5.94 wppm, from 2.15 wppm to 5.27 wppm, or from 2.42 wppm to 4.32 wppm.

In a preferred embodiment, the consumable product composition is a tea-based drink and the sweetener composition 1 as defined above is present in the consumable product composition in a concentration from 110 wppm to 270 wppm, e.g., from 130 wppm to 250 wppm.

In a particularly preferred embodiment, the consumable product is a carbonated soft drink comprising the sweetener composition 1, and the composition X as defined above is present in the carbonated soft drink in a concentration from 1.50 wppm to 6.0 wppm, e.g. from 2.08 wppm to 5.94 wppm, from 2.54 wppm to 5.27 wppm, 2.08 wppm to 4.32 wppm, or from 2.86 wppm to 5.94 wppm.

In a preferred embodiment, the consumable product composition is a carbonated soft drink and the sweetener composition 1 as defined above is present in the consumable product composition in a concentration from 130 wppm to 270 wppm, e.g., from 150 wppm to 250 wppm.

In a particularly preferred embodiment, the consumable product is a juice drink comprising the sweetener composition 1, and the composition X as defined above is present in the juice drink in a concentration from 1.50 wppm to 6.0 wppm, e.g. from 2.08 wppm to 5.94 wppm, from 2.54 wppm to 5.27 wppm, 2.08 wppm to 4.32 wppm, or from 2.86 wppm to 5.94 wppm.

In a preferred embodiment, the consumable product composition is a juice drink and the sweetener composition 1 as defined above is present in the consumable product composition in a concentration from 130 wppm to 270 wppm, e.g., from 150 wppm to 250 wppm.

In a particularly preferred embodiment, the consumable product is a near water drink comprising the sweetener composition 2, and the composition X as defined above is present in the near water drink in a concentration from 0.50 wppm to 6.0 wppm, e.g. from 0.63 wppm to 1.80 wppm, from 0.77 wppm to 1.65 wppm, from 0.63 wppm to 1.35 wppm, or from 0.84 wppm to 1.80 wppm.

In a preferred embodiment, the consumable product composition is a near water drink and the sweetener composition 1 as defined above is present in the consumable product composition in a concentration from 70 wppm to 150 wppm, e.g., from 80 wppm to 140 wppm.

In a particularly preferred embodiment, the consumable product is a tea-based drink comprising the sweetener composition 2, and the composition X as defined above is present in the tea-based drink in a concentration from 0.50 wppm to 6.0 wppm, e.g. from 2.07 wppm to 4.80 wppm, from 2.53 wppm to 4.40 wppm, from 2.07 wppm to 3.6 wppm, or from 2.76 wppm to 4.8 wppm.

In a preferred embodiment, the consumable product composition is a tea drink and the sweetener composition 1 as defined above is present in the consumable product composition in a concentration from 230 wppm to 400 wppm, e.g., from 250 wppm to 480 wppm.

In a particularly preferred embodiment, the consumable product is a carbonated soft drink comprising the sweetener composition 2, and the composition X as defined above is present in the carbonated soft drink in a concentration from 0.50 wppm to 6.0 wppm, e.g. from 2.79 wppm to 5.28 wppm, from 3.41 wppm to 4.84 wppm, from 2.79 wppm to 3.96 wppm, or from 3.72 wppm to 5.28 wppm.

In a preferred embodiment, the consumable product composition is a carbonated soft drink and the sweetener composition 1 as defined above is present in the consumable product composition in a concentration from 310 wppm to 440 wppm, e.g., from 330 wppm to 420 wppm.

In a particularly preferred embodiment, the consumable product is a juice drink comprising the sweetener composition 2, and the composition X as defined above is present in the juice drink in a concentration from 0.50 wppm to 6.0 wppm, e.g. from 2.79 wppm to 5.28 wppm, from 3.41 wppm to 4.84 wppm, from 2.79 wppm to 3.96 wppm, or from 3.72 wppm to 5.28 wppm.

In a preferred embodiment, the consumable product composition is a juice drink and the sweetener composition 1 as defined above is present in the consumable product composition in a concentration from 310 wppm to 440 wppm, e.g., from 330 wppm to 420 wppm.

In a particularly preferred embodiment, the consumable product is nectar comprising the sweetener composition 2, and the composition X as defined above is present in the nectar in a concentration from 0.50 wppm to 6.0 wppm, e.g. from 1.80 wppm to 4.08 wppm, from 2.2 wppm to 3.74 wppm, from 1.8 wppm to 3.06 wppm, or from 2.40 wppm to 4.08 wppm.

In a preferred embodiment, the consumable product composition is nectar and the sweetener composition 1 as defined above is present in the consumable product composition in a concentration from 200 wppm to 340 wppm, e.g., from 220 wppm to 320 wppm.

In one embodiment, the consumable product composition is characterized by the dosage of the sweetener composition therein. For example, the consumable product composition may comprise from 0.07 to 0.44 g/l of the sweetener composition, e.g., from 0.11 g/l to 0.27 g/l, from 0.13 g/l to 0.27 g/l, from 0.07 to 0.15 g/l, from 0.23 g/l to 0.4 g/l, from 0.31 g/l to 0.44 g/l, or from 0.2 g/l to 0.34 g/l.

The sweetener compositions may be employs in near water drinks, tea-based drinks, carbonated soft drinks, juice drinks and nectars. Some exemplary embodiments are shown in the table below.

| Exemplary consumable product compositions | Sugar standard dosage | | sugar dosage | Examples: Sugar reduction with Sweetener composition 1 dosage: sweetener composition 1 | Examples: Sugar replacement with sweetener composition 2 dosage: sweetener composition 2 |
|---|---|---|---|---|---|
| calorie reduced and low caloric Beverages/ Drinks | low | high | | | |
| near water drinks | 20 g/l | 40 g/l | | | 0.07-0.15 g/l |
| Tea Drinks | 60 g/l | 90 g/l | 40 g/l | 0.11-0.27 g/l | 0.23-0.40 g/l |
| carbonated softdrinks | 75 g/l | 100 g/l | 50 g/l | 0.13-0.27 g/l | 0.31-0.44 g/l |
| juice drinks | 75 g/l | 100 g/l | 50 g/l | 0.13-0.27 g/l | 0.31-0.44 g/l |
| nectars | 50 g/l | 80 g/l | | | 0.20-0.34 g/l |

In one embodiment, the consumable product composition comprises a beverage; and a sweetener composition comprising acesulfame potassium, sucralose and the composition X as defined above.

Preferably, the consumable product is a carbonated drink and the invention relates to a carbonated drink comprising a sweetener composition of the invention or a tabletop sweetener composition of the invention.

Preferably, the consumable product is a non-carbonated drink and the invention relates to a non-carbonated drink comprising a sweetener composition of the invention or a tabletop sweetener composition of the invention.

In another embodiment, the consumable products are alcoholic beverages and the invention relates to alcoholic beverages comprising a sweetener composition of the invention or a tabletop sweetener composition of the invention, preferably to shandy beer, wine cooler, wildberry cooler (e.g., 5% alcohol), strawberry daiquiri cooler (e.g., 5% alcohol), margarita cooler (e.g., 5% alcohol) and raspberry cooler. In addition, the alcoholic beverages may contain further substances including but not limited to acesulfame potassium, aspartame, beer, color, citric acid monohydrate, cyclamate, fruit juice (e.g., peach, pineapple), lemon flavor, margarita flavor, rum flavor, sucrose, vodka, wildberry flavor, wine and water.

In another embodiment, the consumable products are fruit juices and the invention relates to fruit juices comprising a sweetener composition of the invention or a tabletop sweetener composition of the invention, preferably to functional fruit drinks (e.g., 30% fruit juice content), fruit nectar, fruit juice drinks, no sugar added fruit beverages (e.g., 5% juice, kiwi-strawberry flavored) and ruby red grapefruit and tangerine juice drinks (from concentrate). In addition, the fruit juices may contain further substances including but not limited to acesulfame potassium, aspartame, anthocyane, ascorbic acid, carotinoids, citric acid (e.g., anhydrous), cyclamate, luteine, fruit concentrate, fruit juice concentrate, flavor, fruit, grapefruit pulp cells, grapefruit flavor, kiwi juice concentrate, kiwi-strawberry flavor, malic acid, pectin, ruby red grapefruit concentrate, strawberry juice concentrate, tangerine juice concentrate, tangerine flavor, grape extract, vegetable extract (e.g., pumpkin, carrot, aronia, blackcurrant, hibiscus etc.) and water.

In another embodiment, the consumable product is ice tea and the invention relates to ice tea comprising a sweetener composition of the invention or a tabletop sweetener composition of the invention, preferably to ice tea and sugar free ice tea mix. In addition, the ice tea may contain further substances including but not limited to base with lemon flavor, base with tea component, citric acid, cyclamate, flavor, instant tea, lemon juice, maltodextrin, malic acid (e.g., powdered), saccharin, sucralose, sucrose, tea and tea extract.

In another embodiment, the consumable products are soft drinks without sugar and the invention relates to soft drinks without sugar comprising a sweetener composition of the invention or a tabletop sweetener composition of the invention, preferably to soft drinks Cola flavored, fruit nectars, fruit juice drinks, soft drinks, soft drinks lemon lime flavored, diet sparkling waters (e.g., peach flavored) and sugar free liquid beverages. In addition, the soft drinks without sugar may contain further substances including but not limited to acesulfame potassium, alitame, aspartame, bilberry flavor, citric acid monohydrate, caffeine, cola flavor, cyclamate, peach flavor, potassium citrate, sodium-cyclamate, grape color, grape flavor, sodium benzoate, sodium citrate, sodium-saccharin, ethylmaltol, flavor, lemon-lime flavor, maltol, neotame, NHDC, passion fruit flavor, pectin, phosphoric acid (85%), saccharin, sucralose and water.

In another embodiment, the consumable products are soft drinks with sugar and the invention relates to soft drinks with sugar comprising a sweetener composition of the invention or a tabletop sweetener composition of the invention. In addition, the soft drinks with sugar may contain further substances including but not limited to acesulfame potassium, aspartame, citric acid monohydrate, concentrate, caffeine, flavor, fructose, glucose, glucose syrup, high fructose corn syrup (HFCS, e.g., HFCS having total solids: approx. 77%, fructose: 55% and glucose: 41%), neotame, orangeade base, phosphoric acid (e.g., 85%), sodium-cyclamate, sucrose and water.

In another embodiment, the consumable products are sports drinks and the invention relates to sports drinks comprising a sweetener composition of the invention or a tabletop sweetener composition of the invention, preferably to isotonic energy drinks and whey drinks. In addition, the sports drinks may contain further substances including but not limited to acesulfame potassium, aspartame, ascorbic acid, concentrate, caffeine, citric acid, flavor, glucose (e.g., anhydrous), herbs, minerals, neohesperidine-DC, natural extracts, sucralose, taurine, vitamins, water and whey powder.

In another embodiment, the consumable products are dry powder beverages and the invention relates to dry powder beverages comprising a sweetener composition of the invention or a tabletop sweetener composition of the invention. In addition, the dry powder beverages may contain further substances including but not limited to acesulfame potassium, aspartame, apple flavor, ascorbic acid, citric acid, cherry flavor, malic acid, orange flavor, raspberry flavor, sodium chloride, trisodium citrate, tricalcium phosphate, titanium dioxide and xantham gum.

In another embodiment, the consumable product is ice coffee and the invention relates to ice coffee comprising a sweetener composition of the invention or a tabletop sweetener composition of the invention. In addition, the ice coffee may contain further substances including but not limited to acesulfame potassium, aspartame, coffee extract, ethylmaltol, flavor and neohesperidine-DC.

In another embodiment, the consumable products are instant cake fillings and the invention relates to instant cake fillings comprising a sweetener composition of the invention or a tabletop sweetener composition of the invention. In addition, the cake fillings may contain further substances including but not limited to milk, isomalt, oligofructose, modified starch, flavors and colors. In another embodiment, the cake fillings may contain further substances including but not limited to raspberries, strawberry puree, polydextrose, isomalt, sorbitol, glycerin, fructose, pectin, locust bean gum, calcium chloride, sodium bicarbonate, citric acid and water.

In another embodiment, the consumable products are biscuits and the invention relates to biscuits comprising a sweetener composition of the invention or a tabletop sweetener composition of the invention. In addition, the biscuits may contain further substances including but not limited to isomalt, powdered isomalt, granulated isomalt, polydextrose, shortening, water, sodium bicarbonate, ammonium bicarbonate, skimmed milk powder, salt, flour, cake flour, flavor, inulin, wheat fiber, shortening, ground raisins, raisin paste, salt, oatrim gel, liquid whole eggs, liquid egg whites, powdered egg whites, egg yolk, vanilla, butter flavor, vanilla flavor, chocolate flavor, cocoa, high fructose corn syrup (HFCS), methocel, baking soda, cinnamon, sodium acid pyrophosphate, margarine spread, margarine, emulsifier, molasses, mono- and diglycerides, powdered cellulose, ground hazelnuts, hazelnuts, sorbitol, oat fiber, vital wheat gluten, chocolate chips, maltitol and fat replacer.

In another embodiment, the consumable products are cakes and the invention relates to cakes comprising a sweetener composition of the invention or a tabletop sweetener composition of the invention. In addition, the cakes may contain further substances including but not limited to baking powder, baking soda, blueberry flavor, all purpose flour, cake flour, diacetyl 4×, dextrose, dried butter flavor, flour, cellulose, crystalline fructose, emulsifier, egg whites solid, eggs, dried egg white, fat replacers such as inulin, isomalt, lecithin, milk, non fat dry milk, modified starch, maltodextrin, oligofructose, potato fiber, polydextrose, salt, shortening, crystalline sorbitol, sodium aluminium phosphate, sucrose, butter flavor, chocolate flavor, (dried) vanilla flavor, water, wheat fiber, xanthan gum and vegetable oil.

In another embodiment, the consumable products are bakery products other than cakes and the invention relates to bakery products other than cakes comprising a sweetener composition of the invention or a tabletop sweetener composition of the invention, preferably to light hot fudge toppings, tartlets with strawberry fillings, sugar free maple flavored syrups, sugar free dark chocolate coatings, sugar free chocolate syrups, reduced-calorie chocolate syrups, no sugar added caramel corn, light chocolate frostings, light caramel toppings and light apple tart. In addition, the bakery products may contain further substances including but not limited to acesulfame potassium, aspartame, baking powder, baking soda, disodium phosphate, maple flavor, caramel flavor, caramel color, flour, carrageenan, cocoa powder, cocoa butter, (microcrystalline) cellulose, citric acid, calcium chloride, crystalline fructose, fructose, chocolate liquor, eggs, dried egg white, fudge flavor, isomalt, lecithin, non fat dry milk, hydrogenated starch hydrolysate, margarine, modified starch, maltisorb, maltodextrin, nonfat dry milk, oligofructose, potassium sorbate, pectin, potato fiber, hydrogenated potato starch, polydextrose, skimmed milk powder, shortening, (crystalline) sorbitol, sodium benzoate, salt, sorbitol, potassium sorbate, (powdered) sucrose, butter flavor, chocolate flavor, vanillin, (dried) vanilla flavor, water, wheat fiber and xanthan gum.

In another embodiment, the consumable products are confectionery products and the invention relates to confectionery products comprising a sweetener composition of the invention or a tabletop sweetener composition of the invention, preferably to all confectionery products mentioned in the Directive 2003/115/EC of 22 Dec. 2003 and in the Directive 94/35/EC of 30 Jun. 2004 on sweeteners for use in foodstuffs, each of which are incorporated herein by reference. Examples include, but are not limited to, confectioneries (with or without added sugar), cocoa- or dried-fruit-based confectioneries, energy-reduced or with not added sugar, starch-based confectioneries, energy-reduced or with not added sugar, comets and wafers for ice-cream, with not added sugar, Essoblaten, cocoa-, milk-, dried-fruit- or fat-based sandwich spreads, energy-reduced or with not added sugar, breakfast cereals, e.g., with a fiber content of more than 15%, and containing at least 20% bran, energy-reduced or sugar-reduced, breath-freshening micro-sweets with or without added sugar, strongly flavored freshening throat pastilles with or without added sugar, chewing gum with or without added sugar, energy-reduced tablet form confectioneruies, cider and perry, drinks consisting of a mixture of a non-alcoholic drink and beer, cider, perry, spirits or wine, spirit drinks containing less than 15% alcohol by volume, alcohol-free beer or beer with an alcohol content not exceeding 1.2% vol., "bière de table/Tafelbier/table beer" (original wort content less than 6%), except for "obergäriges Einfachbier", beers with a minimum aciditiy of 30 milli-equivalents expressed as NaOH, brown beers of the "oud bruin" type, energy-reduced beer, edible ices, energy-reduced or sugar-reduced canned or bottled fruit, energy-reduced or with or without added sugar, energy-reduced jams, jellies and marmalades, energy-reduced fruit and vegetable preparations, sweet-sour preserves of fruit and vegetables, *Feinkostsalat*, sweet-sour preserves and semi-preserves of fish and marinades of fish, crustaceans and mollusks, energy-reduced soups, sauces, mustard, fine bakery products for special nutritional uses, foods intended for use in energy-restricted diets for weight reduction as referred to in Directive 1996/8/EC, dietary foods for special medical purposes as defined in Directive 1999/21/EC, food supplements as defined in Directive 2002/46/EC supplied in a liquid form, food supplements as defined in Directive 2002/46/EC supplied in a solid form, food supplements as defined in Directive 2002/46/EC, based on vitamins and/or mineral elements and supplied in a syrup-type or chewable form. These Directives are incorporated herein by reference. Particularly preferred confectionary products are sugar free hard candy, reduced calorie no sugar added hard candy, hard candies, sugar free milk chocolate, milk chocolate, sugar free gummy bear, reduced calorie no sugar added gummy bear, sugar free dark chocolate, reduced calorie no sugar added hard candy, reduced calorie no sugar added caramel, reduced calorie caramel, raspberry jellies, jellies, plain bitter chocolate, toffees, sugar-free rice cake, sugar free peppermint breathmint, sugar free orange chewy candy and sugar free jelly beans. In addition, the confectionary products may contain further substances including but not limited to butter fat, (caramel) flavor, citric acid (monohydrate), cherry flavor, chocolate liquor, cocoa butter, cocoa mass, color, corn syrup, (microcrystalline) cellulose, disodium phosphate, egg Albumen-dried, evaporated milk, gelatin, glycerol monostearate, gum Arabic, hydrogenated starch hydrolysate, hydrogenated fat, isomalt, lecithin, lemon oil, maltitol (syrup, powdered and/or granular), medium-grain brown rice, Korean black rice, maltol, mocha paste, neohesperidine-DC, orange flavor, pectin, peppermint flavor, polydextrose, raspberry puree, raspberry puree, salt, sodium caseinate, sorbitol (powder), starch, sucrose, vanillin, vegetable fat, whole milk powder, skimmed milk powder, water and xylitol.

U.S. Pat. Nos. 6,627,233; 5,698,181; 5,688,491; 5,451,404; and 5,009,893 are hereby incorporated by reference in their entireties, including, but not limited to, the flavorings, sweeteners, sweetness enhancers, additional flavoring ingredients, solutions, consumables, consumable compositions, and formulations that are disclosed therein."

In another embodiment, the consumable products are delicacies sauces and the invention relates to delicacies sauces comprising a sweetener composition of the invention or a tabletop sweetener composition of the invention, preferably to sugar reduced ketchup with sugar, no added sugar Ketchup and tomato ketchup. In addition, the delicacies sauces may contain further substances including but not limited to citric acid, modified starch, mustard, onions, pectin, polydextrose, saccharine sodium, salt, spices, sucralose, sugar, thickener, tomato concentrate and vinegar.

In another embodiment, the consumable products are cereals and the invention relates to cereals comprising a sweetener composition of the invention or a tabletop sweetener composition of the invention.

In another embodiment, the consumable products are dairy products and the invention relates to dairy products comprising a sweetener composition of the invention or a tabletop sweetener composition of the invention, preferably to fruit quarks, whipped creams, (vanilla flavored skim) milk drinks and yoghurt drinks. In addition, the dairy products may contain further substances including but not limited to acesulfame potassium, aspartame, blackcurrant, blackberry, blueberry, cyclamate, flavor, fruit preparation, fruit juice concentrate, fructose, gelatin, inulin, oat, orange juice, pectin, raspberry, redcurrant, stabilizer, wheat fiber, water, quarks, yoghurt, whipped cream and whey.

In another embodiment, the consumable products are desserts and the invention relates to desserts comprising a sweetener composition of the invention or a tabletop sweetener composition of the invention, preferably to jellied red fruit cocktails, strawberry sorbet, (fat-free/sugar-free) instant pudding chocolate flavors, instant desserts, vanilla puddings, vanilla pudding—powder mixtures and litchee gelees. In addition, the desserts may contain further substances including but not limited to acesulfame potassium, aspartame, blackberries, brandy, citric acid, caramel color, color, cyclamate, chocolate flavor, cocoa powder, corn starch, disodium phosphate, emulsifier, fructose, granulated sugar, white soft sugar, agar powder, ingestible dextrin, mannan, maltodextrin, mono- and diglycerides, inulin, polydextrose, lemon juice, maltodextrin, milk modified food starch, polydextrose, raspberries, redcurrant juice, salt, soy lecithin, strawberries, strawberry puree, tetrasodium pyrophosphate, litchee flavor, vanilla flavor, wheat starch, water and xanthan gum.

As used herein, the term "desserts" includes, but is not limited to all desserts mentioned in the Directive 2003/115/EC of 22 Dec. 2003 and in the Directive 94/35/EC of 30 Jun. 2004 on sweeteners for use in foodstuffs. These Directives are incorporated herein by reference. Examples include, but are not limited to water-based flavored desserts, energy-reduced or with not added sugar, milk- and milk-derivative-paste preparations, energy-reduced or with no added sugar, fruit-and-vegetable-based desserts, energy-reduced or with no added sugar, egg-based desserts, energy-reduced or with no added sugar, cereal-based desserts, energy-reduced or with no added sugar, breakfast cereals or cereal-based products, energy-reduced or with no added sugar, fat-based desserts, energy-reduced or with no added sugar, edible ices, energy-reduced or with no added sugar, jams, jellies, marmalades and crystallized fruit, energy-reduced or with no added sugar, fruit preparations, energy-reduced or with no added sugar, and "snacks", certain flavors of ready-to-eat, prepacked, dry, savoury starch products and coated nuts.

In another embodiment, the consumable product is water-based ice and the invention relates to water-based ice comprising a sweetener composition of the invention or a tabletop sweetener composition of the invention, preferably to "ice-pops" and no sugar added strawberry sorbet. In addition, the water-based ice may contain further substances including but not limited to acesulfame potassium, aspartame, citric acid, color, fruit concentrate, flavor, isomalt, lemon juice, polydextrose, strawberry puree, sorbitol, thickener and water.

In another embodiment, the consumable product is ice cream and the invention relates to ice cream comprising a sweetener composition of the invention or a tabletop sweetener composition of the invention. In addition, the ice-cream may contain further substances including but not limited to color, emulsifier, flavor, isomalt, milk fat, fat replacer, skim milk powder, polydextrose and lactitol.

In another embodiment, the consumable product is yoghurt and the invention relates to yoghurt comprising a sweetener composition of the invention or a tabletop sweetener composition of the invention. In addition, the yoghurt may contain further substances including but not limited to acesulfame potassium, alitame, aspartame, citric aid monohydrate, tricalcium-dicitrate, cyclamate, Na-cyclamate, fruit preparation, high fructose corn syrup (HFCS), inulin, fructose, fructose syrup, oligofructose syrup, neohesperidine-DC, pectin-solution, saccharin, starch, strawberries, strawberry-flavor, sucralose, water and (low fat, preferably between 0.1% to 1.5% fat) yoghurt.

In another embodiment, the consumable products are jams and the invention relates to jams comprising a sweetener composition of the invention or a tabletop sweetener composition of the invention. In addition, the jams may contain further substances including but not limited to gelling agent, isomalt, maltitol, pectin, sorbitol and strawberries.

In another embodiment, the consumable product is chewing-gum and the invention relates to chewing-gum comprising a sweetener composition of the invention or a tabletop sweetener composition of the invention.

The amount of the sweetener composition in the consumable of the invention is dependent on the concentration of the natural and or artificial sweeteners contained therein as well as on the presence of further auxiliary substances such as carbon dioxide, flavors (e.g. spices, natural extract or oils), colors, acidulants (e.g. phosphoric acid and citric acid), preservatives, potassium, sodium.

In another embodiment, the consumable product is a dental product and the invention relates to a dental product comprising a sweetener composition of the invention. Dental products include, but are not limited to toothpaste, dental floss, mouthwash, denture adhesive, enamel whitener, fluoride treatments and oral care gels. These products are also known in the art.

In a preferred embodiment the consumable product is toothpaste and the invention relates to toothpaste comprising a sweetener composition of the invention. In addition, the toothpaste may contain further substances including but not limited to abrasive silica, dicalcium phosphate dehydrate, hydrated silica (thickener), ethyl alcohol, peppermint flavor, mint flavor, potassium sorbate, sodium lauryl sulphate, sodium carboxymethylcellulose, sodium monofluorophosphate, sodium monofluorophosphate, sorbitol solution, tetrasodium phosphate and titanium dioxide.

In another embodiment, the consumable product is a cosmetic product and the invention relates to a cosmetic product comprising a sweetener composition of the invention. Cosmetic products include but are not limited to lipstick, lip balm, lip gloss, and petroleum jelly. These products are also known in the art.

In another embodiment, the consumable product is a pharmaceutical product and the invention relates to a pharmaceutical product comprising a sweetener composition of the invention. Pharmaceutical products include but are not limited to over-the-counter and prescription drugs including but not limited to non-tobacco snuff, tobacco substitutes, chewable medications, cough syrups, throat sprays, throat lozenges, cough drops, antibacterial products, pill coatings, gel caplets, soluble fiber preparations, antacids, tablet cores, rapidly absorbed liquid compositions, stable foam compositions, rapidly disintegrating pharmaceutical dosage forms, beverage concentrates for medicinal purposes, aqueous pharmaceutical suspensions, liquid concentrate compositions, and stabilized sorbic acid solutions, phosphate buffers, saline solutions, emulsion, non-aqueous pharmaceutical solvents, aqueous pharmaceutical carriers, solid pharmaceutical carrier, and pharmaceutical preservatives/additives (antimicrobials, antioxidants, chelating agents, inert gases, flavoring agents, coloring agents).

In another embodiment, the consumable product is animal feed or animal food and the invention relates to animal feed or animal food comprising a sweetener composition of the invention.

A conventional beverage may comprise from 20 g/l to 100 g/l standard sugar such as e.g. sucrose and this standard sugar may achieve a first level sweetness. It has now been found that by using the inventive sweetener composition to replace at least a portion of this standard sugar, the amount of standard sugar in a beverage can be reduced or eliminated maintaining the same sweetness level.

A conventional tea drink may comprise from 60 g/l to 90 g/l standard sugar such as e.g. sucrose. It has now been found that by using the inventive sweetener composition, e.g., sweetener composition 1, the amount of sugar in the tea drink may be reduced by at least 20%, e.g. at least 30%, at least 40%, or at least 55%. In one embodiment wherein the beverage is a tea drink, the tea drink comprises from 20 g/l to 60 g/l, e.g. from 30 g/l to 50 g/l, 35 g/l to 45 g/l standard sugar. In one embodiment the tea drink comprises the sweetener composition 1 in an amount ranging from 0.11 g/l to 0.27 g/l. e.g., from 0.14 g/l to 0.24 g/l. As a result, the inventive tea drink comprises less standard sugar than a conventional tea drink while maintaining the same sweetness.

A conventional carbonated soft drink may comprise from 75 g/l to 100 g/l standard sugar such as e.g. sucrose. It has now been found that by using the inventive sweetener composition, e.g., sweetener composition 1, the amount of sugar in the carbonated soft drink may be reduced by at least 20%, e.g. at least 30%, at least 40%, or at least 50%. In one embodiment wherein the beverage is a carbonated soft drink, the carbonated soft drink comprises from 25 g/l to 75 g/l, e.g. from 30 g/l to 70 g/l, 40 g/l to 60 g/l standard sugar. In one embodiment the carbonated soft drink comprises the sweetener composition 1 in an amount ranging from 0.13 g/l to 0.27 g/l, e.g., from 0.16 g/l to 0.24 g/l. As a result, the inventive carbonated soft drink comprises less standard sugar than a conventional carbonated soft drink while maintaining the same sweetness.

A conventional juice drink may comprise from 75 g/l to 100 g/l standard sugar such as e.g. sucrose. It has now been found that by using the inventive sweetener composition, e.g., sweetener composition 1, the sugar dosage may be reduced by at least 20%, e.g. at least 30%, at least 40%, or at least 50%. In one embodiment wherein the beverage is a juice drink, the juice drink comprises from 25 g/l to 75 g/l, e.g. from 30 g/l to 70 g/l, 40 g/l to 60 g/l standard sugar. In one embodiment the juice drink comprises the sweetener composition 1 in an amount ranging from 0.13 g/l to 0.27 g/l, e.g., from 0.16 g/l to 0.24 g/l. As a result, the inventive juice drink comprises less standard sugar than a conventional carbonated soft drink while maintaining the same sweetness.

A conventional near water drink may comprise from 20 g/l to 40 g/l standard sugar such as e.g. sucrose. It has now been found that by using the inventive sweetener composition, e.g., sweetener composition 2, the sugar dosage may be eliminated or substantially eliminated. In one embodiment wherein the beverage is a near water drink, the near water drink comprises 0 g/l standard sugar. In one embodiment, the near water drink comprises the sweetener composition 2 in an amount ranging from 0.07 g/l to 0.15 g/l, e.g., from 0.09 g/l to 0.14 g/l. As a result, the inventive near water drink comprises little or no standard sugar and still maintains the sweetness similar to that of a sugar-sweetened near water drink.

A conventional tea drink may comprise from 60 g/l to 90 g/l standard sugar such as e.g. sucrose. It has now been found that by using the inventive sweetener composition, e.g., sweetener composition 2, the sugar dosage may be eliminated or substantially eliminated. In one embodiment wherein the beverage is a tea drink, the tea drink comprises little or no standard sugar. In one embodiment the tea drink comprises the sweetener composition 2 in an amount ranging from 0.23 g/l to 0.40 g/l, e.g., from 0.26 g/l to 0.37 g/l. As a result, the inventive tea drink comprises little or no standard sugar and still maintains the sweetness similar to that of a sugar-sweetened tea drink.

A conventional carbonated soft drink may comprise from 75 g/l to 100 g/l standard sugar such as e.g. sucrose. It has now been found that by using the inventive sweetener composition, e.g., sweetener composition 2, the sugar dosage may be eliminated or substantially eliminated. In one embodiment wherein the beverage is a carbonated soft drink, the carbonated soft drink comprises 0 g/l standard sugar. In one embodiment the carbonated soft drink comprises the sweetener composition 2 in an amount ranging from 0.31 g/l to 0.44 g/l, e.g., from 0.34 g/l to 0.41 g/l. As a result, the inventive carbonated soft drink comprises little or no standard sugar and still maintains the sweetness similar to that of a sugar-sweetened carbonated soft drink.

A conventional juice drink may comprise from 75 g/l to 100 g/l standard sugar such as e.g. sucrose. It has now been found that by using the inventive sweetener composition, e.g., sweetener composition 2, the sugar dosage may be eliminated or substantially eliminated. In one embodiment wherein the beverage is a juice drink, the juice drink comprises 0 g/l standard sugar. In one embodiment the juice drink comprises the sweetener composition 2 in an amount ranging from 0.31 g/l to 0.44 g/l, e.g., from 0.28 g/l to 0.41 g/l. As a result, the inventive juice drink comprises little or no standard sugar and still maintains the sweetness similar to that of a sugar-sweetened juice drink.

A conventional nectar may comprise from 50 g/l to 80 g/l standard sugar such as e.g. sucrose. It has now been found that by using the inventive sweetener composition, e.g., sweetener composition 2, the sugar dosage may be eliminated or substantially eliminated. In one embodiment wherein the beverage is a nectar and, nectar comprises 0 g/l standard sugar. In one embodiment the nectar comprises the sweetener composition 2 in an amount ranging from 0.20 g/l to 0.34 g/l, e.g., from 0.17 g/l to 0.31 g/l. As a result, the inventive nectar comprises little or no standard sugar and still maintains the sweetness similar to that of a sugar-sweetened nectar.

In a particular preferred embodiment, the consumable product composition comprises
(a) a beverage; and
(b) a sweetener composition comprising acesulfame potassium and a composition X comprising the following substances:
  (1) L-valin;
  (2) maltol;
  (3) naringin;
  (4) maltodextrine MD 14
  (5) arabicgum (spraygum);
  (6) acetoin;
  (7) delta dodecalactone;
  (8) delta decalactone; and
  (9) massoia lactone.

In a particular preferred embodiment, the consumable product composition comprises
(a) a beverage; and
(b) a sweetener composition comprising acesulfame potassium and a composition X comprising the following substances:
  (1) L-valin;
  (2) maltol;
  (3) naringin;
  (4) maltodextrine MD 14
  (5) arabicgum (spraygum);
  (6) acetoin;
  (7) delta dodecalactone;
  (8) delta decalactone;
  (9) massoia lactone;
  (11) L-alanine;
  (12) L-leucine;
  (13) glycine;
  (14) L-aspartic acid;
  (15) L-threonine;
  (16) L-isoleucine;
  (17) L-tyrosine;
  (18) L-proline;
  (19) L-serine;
  (20) L-glutamic acid;
  (21) taurine;
  (22) syringaldehyde;
  (23) delta undecalactone;
  (24) whiskey lactone; and
  (25) delta tetradecalactone.

In a particular preferred embodiment, the consumable product composition comprises
(a) a beverage; and
(b) a sweetener composition comprising acesulfame potassium and a composition X comprising the following substances:
(1) L-valin;
(2) maltol;
(3) naringin;
(4) maltodextrine MD 14
(5) arabicgum (spraygum);
(6) acetoin;
(7) delta dodecalactone;
(8) delta decalactone;
(9) massoia lactone;
(11) L-alanine;
(12) L-leucine;
(13) glycine;
(14) L-aspartic acid;
(15) L-threonine;
(16) L-isoleucine;
(17) L-tyrosine;
(18) L-proline;
(19) L-serine;
(20) L-glutamic acid;
(21) taurine;
(22) syringaldehyde;
(23) delta undecalactone;
(24) whiskey lactone;
(25) delta tetradecalactone; and
(26) methoxy salicylaldehyde.

In one embodiment, the consumable product composition comprises
(a) a beverage; and
(b) a sweetener composition comprising acesulfame potassium and a composition X comprising the following substances:
(1) L-valin;
(2) maltol;
(3) naringin;
(4) maltodextrine MD 14
(5) arabicgum (spraygum);
(6) acetoin;
(7) delta dodecalactone;
(8) delta decalactone;
(9) massoia lactone; and
(10) diacetyl.

In a particular preferred embodiment, the consumable product composition comprises
(a) a beverage; and
(b) a sweetener composition comprising acesulfame potassium and a composition X comprising the following substances:
(1) L-valin;
(2) maltol;
(3) naringin;
(4) maltodextrine MD 14
(5) arabicgum (spraygum);
(6) acetoin;
(7) delta dodecalactone;
(8) delta decalactone;
(9) massoia lactone;
(10) diacetyl;
(11) L-alanine;
(12) L-leucine;
(13) glycine;
(14) L-aspartic acid;
(15) L-threonine;
(16) L-isoleucine;
(17) L-tyrosine;
(18) L-proline;
(19) L-serine;
(20) L-glutamic acid;
(21) taurine;
(22) syringaldehyde;
(23) delta undecalactone;
(24) whiskey lactone; and
(25) delta tetradecalactone.

In a particular preferred embodiment, the consumable product composition comprises
(a) a beverage; and
(b) a sweetener composition comprising acesulfame potassium and a composition X comprising the following substances:
(1) L-valin;
(2) maltol;
(3) naringin;
(4) maltodextrine MD 14
(5) arabicgum (spraygum);
(6) acetoin;
(7) delta dodecalactone;
(8) delta decalactone;
(9) massoia lactone;
(10) diacetyl;
(11) L-alanine;
(12) L-leucine;
(13) glycine;
(14) L-aspartic acid;
(15) L-threonine;
(16) L-isoleucine;
(17) L-tyrosine;
(18) L-proline;
(19) L-serine;
(20) L-glutamic acid;
(21) taurine;
(22) syringaldehyde;
(23) delta undecalactone;
(24) whiskey lactone;
(25) delta tetradecalactone; and
(26) methoxy salicylaldehyde.

In another aspect, the invention relates to a method of sweetening a consumable product composition, comprising the step of adding to a consumable product the composition X as defined above to yield a sweetened consumable product composition, wherein the sweetened consumable product has substantially no unpleasant off-taste, aftertaste or lingering sweetness.

Preferably, the effect of the composition X remains at least as long as the taste of the consumable product is perceived.

Preferably, the sweetened consumable product has a rich taste.

In another aspect, the invention relates to a method of providing a sweetener or sweetness enhancer composition, comprising the step of adding to a sweetener or sweetness enhancer the composition X as defined above to yield a sweetener or sweetness enhancer composition, wherein the sweetener or sweetness enhancer composition has substantially no unpleasant off-taste, aftertaste or lingering sweetness.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. n the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

EXAMPLES

Taste and Spit Assay with the Compositions X of the Invention

The following Examples are specific embodiments of the present invention which are intended to illustrate but not to limit the invention.

1. General Test Conditions

All tests were conducted under controlled and standardized conditions.

The samples were prepared by a trained laboratory assistant.

35 ml of the samples were served in clear plastic cups. All beverages were measured at a serving temperature of 6.0° C. to 8.0° C. The data was collected on paper (in order to be quick and straight forward) along with a digital stop-watch.

Neutralization between samples was guaranteed by both time (breaks of minimum 15 minutes) and by offering a selection of neutralizing food and drinks such as still water, cucumber, white baguette and unsalted rice crackers. However, in the last 5 min of the break only water was allowed to give the mouth time to recover.

2. Test Conditions

The panel used the sweetness scale anchored by three concentrations of sucrose:

| | |
|---|---|
| 1.1% sucrose | very weak (intensity 1 on a 10 point line scale) |
| 7% sucrose | moderate (intensity 5 on a 10 point line scale) |
| 21.5% sucrose | very strong (intensity 10 on a 10 point line scale) |

Sweetness was assessed with the $1^{st}$ sip (max. 30 ml, min of 15 ml) and scored in the aftertaste (after 2 minutes).

With the $2^{nd}$ sip (max. 30 ml, min of 15 ml) bitter aftertaste (after 2 minutes) was evaluated and scored independent of the temporal dimension.

All samples were tested in duplicate.

The panelists were asked to estimate the bitter aftertaste in each case on a scale from 0 (not perceivable) to 10 (very strong).

3. Example 1

Taste and Spit Assay with Regard to Bitter Aftertaste

The taste of a sample of a sweetener composition comprising acesulfame potassium, sucralose and the composition X of the invention with regard to bitter aftertaste was assessed by using a panel of trained sensory evaluators experienced in the descriptive sensory analysis. 4 panelists were asked to taste the quality of single samples of 35 ml volume.

The following liquids have been assessed:

Sample 1: A preparation containing Sugar Target (saccharose 10 Brix) and water

Sample 2: A preparation containing 500 wppm acesulfame K and water

Sample 3: A preparation containing 350 wppm acesulfame K and water

Sample 4: A preparation containing 350 wppm acesulfame K, 80 wppm sucralose and water Sample 5: A preparation containing water, acesulfame K, sucralose and the composition X comprising substances (1) to (10):

| Ingredient | Concentration (wppm) |
|---|---|
| Acesulfame K | 350 |
| Sucralose | 80 |
| (1) L-valin of natural origin | 0.003 |
| (2) maltol of natural origin | 3 |
| (3) naringin of natural origin | 2 |
| (4) maltodextrine MD 14 | 0.15 |
| (5) arabicgum (spraygum) | 0.066 |
| (6) acetoin of natural origin | 0.0023 |
| (7) delta dodecalactone of natural origin | 0.057 |
| (8) delta decalactone of natural origin | 0.007 |
| (9) massoia lactone of natural origin | 0.014 |
| (10) diacetyl of natural origin | 0.0002 |

Sample 6: A preparation containing water, acesulfame K, sucralose and the composition X comprising substances (1) to (25):

| Ingredient | Concentration (wppm) |
|---|---|
| Acesulfame K | 350 |
| Sucralose | 80 |
| (1) L-valin | 0.0024 |
| (2) maltol | 2.4 |
| (3) naringin of natural origin | 1.6 |
| (4) maltodextrine MD 14 | 0.31 |
| (5) arabicgum (spraygum) | 0.13 |
| (6) acetoin | 0.0015 |
| (7) delta dodecalactone | 0.0388 |
| (8) delta decalactone | 0.0048 |
| (9) massoia lactone of natural origin | 0.0097 |
| (10) diacetyl | 0.0001 |
| (11) L-alanine | 0.0048 |
| (12) L-leucine | 0.0030 |
| (13) glycine | 0.0075 |
| (14) L-aspartic acid | 0.0132 |
| (15) L-threonine | 0.0057 |
| (16) L-isoleucine | 0.0032 |
| (17) L-tyrosine | 0.0048 |
| (18) L-proline | 0.0067 |
| (19) L-serine | 0.0315 |
| (20) L-glutamic acid | 0.0201 |
| (21) taurine | 0.0056 |
| (22) syringaldehyde | 0.0802 |
| (23) delta undecalactone | 0.0388 |
| (24) whiskey lactone | 0.0291 |
| (25) delta tetradecalactone | 0.0388 |

Sample 7: A preparation containing water, acesulfame K, sucralose and the composition X comprising substances (1) to (26)

| Ingredient | Concentration (wppm) |
| --- | --- |
| Acesulfame K | 350 |
| Sucralose | 80 |
| (1) L-valin | 0.0024 |
| (2) maltol | 2.4 |
| (3) naringin of natural origin | 1.6 |
| (4) maltodextrine MD 14 | 0.31 |
| (5) arabicgum (spraygum) | 0.13 |
| (6) acetoin | 0.0015 |
| (7) delta dodecalactone | 0.0388 |
| (8) delta decalactone | 0.0048 |
| (9) massoia lactone of natural origin | 0.0097 |
| (10) diacetyl | 0.0001 |
| (11) L-alanine | 0.0048 |
| (12) L-leucine | 0.0030 |
| (13) glycine | 0.0075 |
| (14) L-aspartic acid | 0.0132 |
| (15) L-threonine | 0.0057 |
| (16) L-isoleucine | 0.0032 |
| (17) L-tyrosine | 0.0048 |
| (18) L-proline | 0.0067 |
| (19) L-serine | 0.0315 |
| (20) L-glutamic acid | 0.0201 |
| (21) taurine | 0.0056 |
| (22) syringaldehyde | 0.0802 |
| (23) delta undecalactone | 0.0388 |
| (24) whiskey lactone | 0.0291 |
| (25) delta tetradecalactone | 0.0388 |
| (26) methoxy salicylaldehyde | 0.0025 |

Sample 8: A preparation containing water, acesulfame K, sucralose and the composition X comprising substances (1) to (9):

| Ingredient | Concentration (wppm) |
| --- | --- |
| Acesulfame K | 350 |
| Sucralose | 80 |
| (1) L-valin of natural origin | 0.003 |
| (2) maltol of natural origin | 3 |
| (3) naringin of natural origin | 2 |
| (4) maltodextrine MD 14 | 0.15 |
| (5) arabicgum (spraygum) | 0.066 |
| (6) acetoin of natural origin | 0.0023 |
| (7) delta dodecalactone of natural origin | 0.057 |
| (8) delta decalactone of natural origin | 0.007 |
| (9) massoia lactone of natural origin | 0.014 |

Sample 9: A preparation containing water, acesulfame K, sucralose and the composition X comprising substances (1) to (9) and (11) to (25):

| Ingredient | Concentration (wppm) |
| --- | --- |
| Acesulfame K | 350 |
| Sucralose | 80 |
| (1) L-valin | 0.0024 |
| (2) maltol | 2.4 |
| (3) naringin of natural origin | 1.6 |
| (4) maltodextrine MD 14 | 0.31 |
| (5) arabicgum (spraygum) | 0.13 |
| (6) acetoin | 0.0015 |
| (7) delta dodecalactone | 0.0388 |
| (8) delta decalactone | 0.0048 |
| (9) massoia lactone of natural origin | 0.0097 |
| (11) L-alanine | 0.0048 |
| (12) L-leucine | 0.0030 |
| (13) glycine | 0.0075 |
| (14) L-aspartic acid | 0.0132 |
| (15) L-threonine | 0.0057 |
| (16) L-isoleucine | 0.0032 |
| (17) L-tyrosine | 0.0048 |
| (18) L-proline | 0.0067 |
| (19) L-serine | 0.0315 |
| (20) L-glutamic acid | 0.0201 |
| (21) taurine | 0.0056 |
| (22) syringaldehyde | 0.0802 |
| (23) delta undecalactone | 0.0388 |
| (24) whiskey lactone | 0.0291 |
| (25) delta tetradecalactone | 0.0388 |

Sample 10: A preparation containing water, acesulfame K, sucralose and the composition X comprising substances (1) to (9) and (11) to (26)

| Ingredient | Concentration (wppm) |
| --- | --- |
| Acesulfame K | 350 |
| Sucralose | 80 |
| (1) L-valin | 0.0024 |
| (2) maltol | 2.4 |
| (3) naringin of natural origin | 1.6 |
| (4) maltodextrine MD 14 | 0.31 |
| (5) arabicgum (spraygum) | 0.13 |
| (6) acetoin | 0.0015 |
| (7) delta dodecalactone | 0.0388 |
| (8) delta decalactone | 0.0048 |
| (9) massoia lactone of natural origin | 0.0097 |
| (11) L-alanine | 0.0048 |
| (12) L-leucine | 0.0030 |
| (13) glycine | 0.0075 |
| (14) L-aspartic acid | 0.0132 |
| (15) L-threonine | 0.0057 |
| (16) L-isoleucine | 0.0032 |
| (17) L-tyrosine | 0.0048 |
| (18) L-proline | 0.0067 |
| (19) L-serine | 0.0315 |
| (20) L-glutamic acid | 0.0201 |
| (21) taurine | 0.0056 |
| (22) syringaldehyde | 0.0802 |
| (23) delta undecalactone | 0.0388 |
| (24) whiskey lactone | 0.0291 |
| (25) delta tetradecalactone | 0.0388 |
| (26) methoxy salicylaldehyde | 0.0025 |

The panelists were asked to taste the samples 1 to 10 and to evaluate the bitter aftertaste of samples 1 to 10 to determine the bitter aftertaste of a sweetener composition comprising acesulfame potassium, sucralose and the composition X of the invention.

Results:

The results of the taste and spit assay are based on a qualitative evaluation of the differences between the seven samples. The samples 5 to 10 comprising acesulfame potassium, sucralose and a composition X of the invention were perceived by all panelists as having a significantly lower bitter aftertaste compared to the respective sweetener composition of samples 2 to 4 without a composition X of the invention and these samples were perceived to be sweeter than samples 1 to 4.

4. Example 2

Taste and Spit Assay with Regard to Sweetness in the Aftertaste

The taste of a sample of a sweetener composition comprising acesulfame potassium, sucralose and the composition X of the invention was assessed with regard to sweetness in the aftertaste by using a panel of trained sensory evaluators experienced in the descriptive sensory analysis in comparison to the sweet aftertaste of saccharose and a sweetener composition comprising acesulfame potassium, respectively. 4 panelists were asked to taste the quality of single samples of 35 ml volume.

The samples with the same composition as in Example 1 have been assessed:

The panelists were asked to taste the samples 1 to 10 and to evaluate the sweet aftertaste of samples 1 to 10 in to determine the sweetness in the aftertaste of a sweetener composition comprising acesulfame potassium, sucralose and the composition X of the invention.

Results:

The results of the taste and spit assay are based on a qualitative evaluation of the differences between the seven samples. Sample 1 containing saccharose was perceived by all panelists as less sweet in the aftertaste compared to acesulfame potassium and sucralose. The samples 5 to 10 comprising acesulfame potassium, sucralose and a composition X of the invention were perceived by all panelists as having a significantly lower lingering aftertaste compared to the respective sweetener composition of samples 2 to 4 without a composition X of the invention.

5. Summary

The results of the taste and spit assay demonstrate that, surprisingly and unexpectedly, the compositions X of the invention 1) significantly reduce the bitter aftertaste of sweetener compositions; and 2) increase the sweetness perception and 3) result in decreasing the sweet lingering of the sweetener composition in the aftertaste. As such, the compositions X of the invention are capable for providing for a reduction in the quantity of sweetener used.

The following embodiments are also subject-matter of the present invention:
1. A composition X comprising the following substances:
   (1) L-valin;
   (2) maltol;
   (3) naringin;
   (4) maltodextrine MD 14
   (5) arabicgum (spraygum);
   (6) acetoin;
   (7) delta dodecalactone;
   (8) diacetyl;
   (9) delta decalactone; and
   (10) massoia lactone.
2. The composition X of embodiment 1, wherein at least one of the substances (1) to (10) is of natural origin.
3. The composition X of embodiment 1 or 2, wherein all of the substances (1) to (10) are of natural origin or wherein all of the substances apart from substance (4) and (5) are of natural origin.
4. The composition X of any one of embodiments 1 to 3, wherein massoia lactone (10) is (R)-5,6-dihydro-6-pentyl-2H-pyran-2-one.
5. The composition X of any one of embodiments 1 to 4, wherein the substance (1) is present in the composition X in an amount ranging from 0.01 wt % to 0.09 wt %.
6. The composition X of any one of embodiments 1 to 5, wherein the substance (2) is present in the composition X in an amount ranging from 30 wt % to 80 wt %.
7. The composition X of any one of embodiments 1 to 6, wherein the substance (3) is present in the composition X in an amount ranging from 15 wt % to 55 wt %.
8. The composition X of any one of embodiments 1 to 7, wherein the substance (4) is present in the composition X in an amount ranging from 0.5 wt % to 15.0 wt %.
9. The composition X of any one of embodiments 1 to 8, wherein the substance (5) is present in the composition X in an amount ranging from 0.6 wt % to 5.0 wt %.
10. The composition X of any one of embodiments 1 to 9, wherein the substance (6) is present in the composition X in an amount ranging from 0.005 wt % to 0.09 wt %.
11. The composition X of any one of claims 1 to 10, wherein the substance (7) is present in the composition X in an amount ranging from 0.5 wt % to 1.5 wt %.
12. The composition X of any one of embodiments 1 to 11, wherein the substance (8) is present in the composition X in an amount ranging from 0.0005 wt % to 0.009 wt %.
13. The composition X of any one of embodiments 1 to 12, wherein the substance (9) is present in the composition X in an amount ranging from 0.06 wt % to 0.6 wt %.
14. The composition X of any one of embodiments 1 to 13, wherein the substance (10) is present in the composition X in an amount ranging from 0.06 wt % to 0.7 wt %.
15. The composition X of any one of embodiments 1 to 14, further comprising at least one additional substance.
16. The composition X of embodiment 15, wherein the additional substances are:
   (11) L-alanine;
   (12) L-leucine;
   (13) glycine;
   (14) L-aspartic acid;
   (15) L-threonine;
   (16) L-isoleucine;
   (17) L-tyrosine;
   (18) L-proline;
   (19) L-serine;
   (20) L-glutamic acid;
   (21) taurine;
   (22) syringaldehyde;
   (23) delta undecalactone;
   (24) whiskey lactone; and
   (25) delta tetradecalactone.
17. The composition X of embodiment 16, wherein whiskey lactone (24) is a mixture of cis-3-methyl-4-octanolide (cis-whiskey lactone) and trans-3-methyl-4-octanolide (trans-whiskey lactone).
18. A process for the preparation of a composition X of any one of embodiments 1 to 17 comprising admixing the substances (1) to (10).
19. A sweetener composition, comprising
   (a) at least one sweetener; and
   (b) a composition X as defined in any one of embodiments 1 to 17.
20. The sweetener composition of embodiment 19, wherein the at least one sweetener is selected from the group consisting of abiziasaponin, abrusosides, in particular abrusoside A, abrusoside B, abrusoside C, abrusoside D, acesulfame potassium, advantame, albiziasaponin, alitame, aspartame, superaspartame, bayunosides, in particular bayunoside 1, bayunoside 2, brazzein, bryoside, bryonoside, bryonodulcoside, carnosifloside, carrelame, curculin, cyanin, chlorogenic acid, cyclamates and its salts, cyclocaryoside I, dihydroquercetin-3-acetate, dihydroflavenol, dulcoside, gaudichaudioside, glycyrrhizin, glycyrrhetin acid, gypenoside, hematoxylin, hernandulcin, iso-mogrosides, in particular iso-mogroside V, lugduname, magap, mabinlins, micraculin, mogrosides (lo han guo), in particular mogroside IV and mogroside V, monatin and its derivatives, monellin, mukurozioside, naringin dihydrochalcone (NarDHC), neohesperidin dihydrochalcone (NDHC), neotame, osladin, pentadin, periandrin I-V, perillartine, D-phenylalanine, phlomisosides, in particular phlomisoside 1, phlomisoside 2, phlomisoside 3, phlomisoside 4, phloridzin, phyllodulcin, polpodiosides, polypodoside A, pterocaryosides, rebaudiosides, in particular rebaudioside A, rebaudioside B, rebaudioside C, rebaudioside D, rebaudioside F, rebaudioside G, rebaudioside H), rubusosides, saccharin and its salts and derivatives, scandenoside, selligueanin A, siamenosides, in particular siamenoside I, stevia, steviolbioside, stevioside and other steviol glycosides, strogines, in particular strogin 1, strogin 2, strogin 4, suavioside A, suavioside B, suavioside G, suavioside H, suavioside I, suavioside J, sucralose, sucronate, sucrooctate, talin, telosmoside $A_{15}$, thaumatin, in particular thaumatin I and II, trans-anethol, trans-cinnamaldehyde, trilobtain and D-tryptophane, including extracts or enriched fractions of the natural sweeteners.

21. The sweetener composition of embodiment 19 or 20, wherein the at least one sweetener is selected from the group consisting of acesulfame potassium, aspartame, sucralose and thaumatin.
22. The sweetener composition of any one of embodiments 19 to 21, wherein the at least one sweetener comprises acesulfame potassium.
23. The sweetener composition of any one of embodiments 19 to 21, wherein the at least one sweetener comprises acesulfame potassium and sucralose.
24. The sweetener composition of any one of embodiments 19 to 21, wherein the at least one sweetener comprises acesulfame potassium and thaumatin.
25. The sweetener composition of any one of embodiments 19 to 24, wherein the amount of the substances (1) to (10) in the sweetener composition is below their taste threshold concentration.
26. The sweetener composition of any one of embodiments 19 to 25, comprising from 80 wt % to 99.5 wt % of the at least one sweetener based on the total weight of the sweetener composition.
27. The sweetener composition of any one of embodiments 19 to 26, comprising from 0.5 wt % to 20 wt % of the composition X as defined in any one of embodiments 1 to 17 based on the total weight of the sweetener composition.
28. The sweetener composition of embodiment 27, comprising from 94.0 wt % to 99.5 wt % of the at least one sweetener based on the total weight of the sweetener composition, particularly preferred from 94.0 wt % to 98.4 wt %.
29. The sweetener composition of embodiment 28, wherein the at least one sweetener comprises acesulfame potassium and sucralose.
30. The sweetener composition of embodiment 29, wherein the acesulfame potassium is present in an amount ranging from 82.0 wt % to 87.0 wt % and the sucralose is present in an amount ranging from 11.0 wt % to 12.0 wt % based on the total weight of the sweetener composition.
31. The sweetener composition of any one of embodiments 19 to 30, wherein the composition X as defined in any one of embodiments 1 to 19 is present in an amount ranging from 1.6 wt % to 2.2 wt %.
32. The sweetener composition of embodiment 31, comprising from 94.0 wt % to 99.5 wt % of the at least one sweetener based on the total weight of the sweetener composition, preferably from 94.0 wt % to 99.1 wt %.
33. The sweetener composition of embodiment 32, wherein the at least one sweetener comprises acesulfame potassium and sucralose.
34. The sweetener composition of embodiment 32, wherein the acesulfame potassium is present in an amount ranging from 77.0 wt % to 82.0 wt % and the sucralose is present in an amount ranging from 17.0 wt % to 19.0 wt % based on the total weight of the sweetener composition.
35. The sweetener composition of any one of embodiments 19 to 30 and 32 to 34, wherein the composition X as defined in any one of embodiments 1 to 17 is present in an amount ranging from 0.9 wt % to 1.2 wt %.
36. The sweetener composition of any one of embodiments 19 to 35 wherein the composition further comprises glycerol, and the glycerol is preferably present in an amount ranging from 0.1 wt % to 4.0 wt %.
37. The sweetener composition of any one of embodiments 19 to 35, wherein the composition, has a sweetness level that is at least 190 times the sweetness of natural sugar.
38. The sweetener composition of any one of embodiments 19 to 35, wherein the composition, has a sweetness level that ranges from 190 to 300 times the sweetness of natural sugar.
39. The sweetener composition of any one of embodiments 19 to 35, wherein the composition is stable when maintained at pH ranging from 3.0 to 7.5.
40. The sweetener composition of any one of embodiments 19 to 39, further comprising at least one additional sweetener.
41. The sweetener composition of embodiment 40, wherein the at least one additional sweetener is selected from the group consisting of erythritol, galactitol, hydrogenated starch syrups, maltitol and sorbitol syrups, inositols, isomalt, lactitol, maltitol, mannitol, xylitol, arabinose, dextrin, dextrose, fructose, high fructose corn syrup, fructooligosaccharides, fructooligosaccharide syrups, galactose, galactooligosaccharides, glucose, glucose and (hydrogenated) starch syrups/hydrolysates, isomaltulose, lactose, hydrolysed lactose, maltose, mannose, rhamnose, ribose, sucrose, tagatose, trehalose, xylose, and combinations thereof.
42. The sweetener composition of embodiment 40 or 41, wherein the at least one additional sweetener is a caloric sweetener.
43. The sweetener composition of embodiment 40 or 41, wherein the at least one additional sweetener is a non-caloric sweetener.
44. The sweetener composition of any one of embodiments 19 to 43, further comprising at least one sweetness enhancer.
45. The sweetener composition of any one of embodiments 19 to 44, wherein the composition X as defined in any one of embodiments 1 to 17 is present in an amount effective to modify, mask, reduce and/or suppress an unpleasant off-taste, aftertaste or lingering sweetness of the at least one sweetener or the at least one sweetness enhancer, wherein the amount of the composition X in the sweetener composition is less than a taste threshold concentration associated with the composition X and wherein the effect of the composition X remains at least as long as the taste of the at least one sweetener or the at least one sweetness enhancer is perceived.
46. The sweetener composition of embodiment 45, wherein the unpleasant off-taste of the sweetener or the sweetness enhancer is an acidic off-taste, an astringent off-taste, a bitter off-taste, a liquorice off-taste, a metallic off-taste or a throat-burning off-taste.
47. The sweetener composition of embodiment 46, wherein the unpleasant aftertaste of the sweetener or the sweetness enhancer is an astringent or bitter aftertaste.

48. The sweetener composition of any one of embodiments 19 to 47, wherein the sweetener composition is a liquid at ambient conditions.
49. The sweetener composition of any one of embodiments 19 to 47, wherein the sweetener composition is a solid at ambient conditions.
50. The sweetener composition of any one of embodiments 19 to 49, further comprising an additional component selected from the group consisting of dust control agents, in particular glycerol, bubble forming agents, surfactants, emulsifiers, salts, fats, gums, and hydrocolloids, bulking agents, carriers, fibers, at least one additional flavoring ingredient, flavor enhancers, flavor stabilizers, acidulants, anti-caking and free-flow agents.
51. A method of modifying, masking, reducing and/or suppressing the unpleasant off-taste, aftertaste or lingering sweetness of at least one sweetener or sweetness enhancer, the method comprising combining the composition X as defined in any one of embodiments 1 to 17 with the at least one sweetener or sweetness enhancer.
52. The method of embodiment 51, wherein the method comprises modifying, masking, reducing and/or suppressing the unpleasant off-taste, aftertaste or lingering sweetness of at least one sweetener or at least one sweetness enhancer, the method comprising combining an amount of the composition X as defined in any one of embodiments 1 to 17 effective to modify, mask, reduce and/or suppress an unpleasant off-taste, aftertaste or lingering sweetness of the at least one sweetener or the at least one sweetness enhancer with the at least one sweetener or at least one sweetness enhancer, wherein the amount of the composition X in the sweetener composition is less than a taste threshold concentration associated with the composition X and wherein the effect of the composition X remains at least as long as the taste of the at least one sweetener or the at least one sweetness enhancer is perceived.
53. The method of embodiment 51 or 52, wherein the at least one sweetener is selected from the group consisting of abiziasaponin, abrusosides, in particular abrusoside A, abrusoside B, abrusoside C, abrusoside D, acesulfame potassium, advantame, albiziasaponin, alitame, aspartame, superaspartame, bayunosides, in particular bayunoside 1, bayunoside 2, brazzein, bryoside, bryonoside, bryonodulcoside, carnosifloside, carrelame, curculin, cyanin, chlorogenic acid, cyclamates and its salts, cyclocaryoside I, dihydroquercetin-3-acetate, dihydroflavenol, dulcoside, gaudichaudioside, glycyrrhizin, glycyrrhetin acid, gypenoside, hematoxylin, hernandulcin, isomogrosides, in particular iso-mogroside V, lugduname, magap, mabinlins, micraculin, mogrosides (lo han guo), in particular mogroside IV and mogroside V, monatin and its derivatives, monellin, mukurozioside, naringin dihydrochalcone (NarDHC), neohesperidin dihydrochalcone (NDHC), neotame, osladin, pentadin, periandrin I-V, perillartine, D-phenylalanine, phlomisosides, in particular phlomisoside 1, phlomisoside 2, phlomisoside 3, phlomisoside 4, phloridzin, phyllodulcin, polpodiosides, polypodoside A, pterocaryosides, rebaudiosides, in particular rebaudioside A, rebaudioside B, rebaudioside C, rebaudioside D, rebaudioside F, rebaudioside G, rebaudioside H), rubusosides, saccharin and its salts and derivatives, scandenoside, selligueanin A, siamenosides, in particular siamenoside I, stevia, steviolbioside, stevioside and other steviol glycosides, strogines, in particular strogin 1, strogin 2, strogin 4, suavioside A, suavioside B, suavioside G, suavioside H, suavioside I, suavioside J, sucralose, sucronate, sucrooctate, talin, telosmoside $A_{15}$, thaumatin, in particular thaumatin I and II, trans-anethol, trans-cinnamaldehyde, trilobtain and D-tryptophane, including extracts or enriched fractions of the natural sweeteners.
54. The method of any one of embodiments 51 to 53, wherein the at least one sweetener is selected from the group consisting of acesulfame potassium, aspartame, sucralose and thaumatin.
55. A tabletop sweetener composition comprising
    (a) at least one sugar sweetener, which is selected from the group consisting of monosaccharides, disaccharides, oligosaccharides and polysaccharides, preferably the at least one sugar sweetener is selected from the group consisting of arabinose, dextrin, dextrose, fructose, high fructose corn syrup, fructooligosaccharides, fructooligosaccharide syrups, galactose, galactooligosaccharides, glucose, glucose and (hydrogenated) starch syrups/hydrolysates, isomaltulose, lactose, hydrolysed lactose, maltose, mannose, rhamnose, ribose, sucrose, stachyose, tagatose, trehalose, xylose, and combinations thereof, most preferably the at least one sugar sweetener is a disaccharide and/or fructose;
    (b) at least one sugar alcohol (or polyol), which is selected from the group consisting of erythritol, galactitol, hydrogenated starch syrups including maltitol and sorbitol syrups, inositols, isomalt, lactitol, maltitol, mannitol, xylitol, and combinations thereof, preferably the at least one sugar alcohol is erythritol;
    (c) at least one sweetener as defined in embodiment 18; and
    (d) an amount of a composition X as defined in any one of embodiments 1 to 17.
56. The tabletop sweetener composition of embodiment 55, wherein the at least one sweetener is selected from the group consisting of acesulfame potassium, aspartame, sucralose and thaumatin.
57. The tabletop sweetener composition of embodiment 55 or 56, further comprising a taste-improving amount of cellulose.
58. The tabletop sweetener composition of any one of embodiments 55 to 57, wherein the tabletop sweetener composition comprises from 40 wt % to 90 wt % sugar alcohol based on the total weight of the tabletop sweetener composition.
59. The tabletop sweetener composition of any one of embodiments 55 to 58, wherein the tabletop sweetener composition comprises from 27 wt % to 50 wt % sugar sweetener based on the total weight of the tabletop sweetener composition.
60. The tabletop sweetener composition of any one of embodiments 55 to 59, wherein the tabletop sweetener composition comprises from 0.5 wt % to 7.0 wt % acesulfame potassium, aspartame, sucralose or thaumatin.
61. The tabletop sweetener composition of any one of embodiments 55 to 60, wherein the tabletop sweetener composition comprises from 0.5 wt % to 20 wt % of the composition as defined in any one of embodiments 1 to 13.
62. The tabletop sweetener composition of any one of embodiments 55 to 61, wherein the composition X as defined in any one of embodiments 1 to 17 is present in an amount effective to modify, mask, reduce and/or suppress an unpleasant off-taste or aftertaste of acesulfame potassium, aspartame, sucralose and thaumatin, wherein the amount is less than a taste threshold concentration associated with the composition.
63. The tabletop sweetener composition of any one of embodiments 55 to 61, wherein the composition X as defined in any one of embodiments 1 to 17 is present in an amount effective to modify, mask, reduce and/or suppress an unpleasant off-taste or aftertaste of acesulfame potassium, aspartame, sucralose and thaumatin, wherein the amount of the composition X in the tabletop sweetener composition is less than a taste threshold concentration associated with the composition and wherein the effect of the composition X remains at least as long as the taste of the sugar sweetener, the sugar alcohol and the at least one sweetener are perceived.

64. Consumable product composition comprising
   (a) a consumable product; and
   (b) a composition X as defined in any one of embodiments 1 to 17.

65. Consumable product composition comprising
   (a) a consumable product; and
   (b) a sweetener composition as defined in any one of embodiments 19 to 50.

66. Consumable product composition comprising
   (a) a consumable product; and
   (b) a tabletop sweetener composition as defined in any one of embodiments 55 to 63.

67. The consumable product composition of any one of embodiments 64 to 66, wherein the consumable product is selected from water-based consumables, solid dry consumables, dairy products, dairy-derived products and dairy-alternative products.

68. The consumable product composition of any one of embodiments 64 to 67, wherein the consumable product is a water-based consumable product selected from the group consisting of beverage, water, near water drink, aqueous beverage, enhanced/slightly sweetened water drink, flavored carbonated and still mineral and table water, non-carbonated beverage, carbonated water, still water, soft drink, carbonated soft drink, non-alcoholic drink, alcoholic drink, beer, wine, liquor, fruit drink, juice drink, juice, fruit juice, vegetable juice, nectar, broth drink, coffee, tea, black tea, green tea, oolong tea, herbal infusion, cacoa (water-based), tea-based drink, coffee-based drinks, cacao-based drink, dessert, syrup, frozen fruit, frozen fruit juice, water-based ice, fruit ice, sorbet, dressing, salad dressing, jams, marmalades, canned fruit, savoury, delicatessen products like delicatessen salads, sauces, ketchup, mustard, pickles and marinated fish, sauce, soup, and beverage botanical materials (whole or ground), or instant powder for reconstitution (coffee beans, ground coffee, instant coffee, cacao beans, cacao powder, instant cacao, tea leaves, instant tea powder).

69. The consumable product composition of any one of embodiments 64 to 67, wherein the consumable product is a solid dry consumable product selected from the group consisting of cereals, baked food products, biscuits, bread, breakfast cereal, cereal bar, energy bars/nutritional bars, granola, cakes, rice cakes, cookies, crackers, donuts, muffins, pastries, confectioneries, chewing gum, chocolate products, chocolates, fondant, candy, hard candy, marshmallow, pressed tablets, snack foods, botanical materials (whole or ground), and instant powders for reconstitution.

70. The consumable product composition of any one of embodiments 64 to 67, wherein the consumable product is a dairy product, dairy-derived product and/or dairy-alternative product selected from the group consisting of milk, fluid milk, cultured milk product, cultured and noncultured dairy-based drink, cultured milk product cultured with lactobacillus, yoghurt, yoghurt-based beverage, smoothy, lassi, milk shake, acidified milk, acidified milk beverage, butter milk, kefir, milk-based beverages, milk/juice blend, fermented milk beverage, icecream, dessert, sour cream, dip, salad dressing, cottage cheese, frozen yoghurt, soy milk, rice milk, soy drink, and rice milk drink.

71. The consumable product composition of any one of embodiments 64 to 67, wherein the consumable product is a beverage, in particular a near water drink, a carbonated beverage, in particular a carbonated soft drink, a juice drink, nectar, or a tea-based drink.

72. The consumable product composition of embodiment 64 or 65, wherein the consumable product is a dental product selected from the group consisting of toothpaste, dental floss, mouthwash, denture adhesive, enamel whitener, fluoride treatments and oral care gels, preferably toothpaste.

73. The consumable product composition of embodiment 64 or 65, wherein the consumable product is a cosmetic product selected from the group consisting of lipstick, lip balm, lip gloss and petroleum jelly.

74. The consumable product composition of embodiment 64 or 65, wherein the consumable product is a pharmaceutical product selected from the group consisting of over-the-counter and prescription drugs, non-tobacco snuff, tobacco substitutes, chewable medications, cough syrups, throat sprays, throat lozenges, cough drops, antibacterial products, pill coatings, gel caplets, soluble fiber preparations, antacids, tablet cores, rapidly absorbed liquid compositions, stable foam compositions, rapidly disintegrating pharmaceutical dosage forms, beverage concentrates for medicinal purposes, aqueous pharmaceutical suspensions, liquid concentrate compositions, and stabilized sorbic acid solutions, phosphate buffers, saline solutions, emulsion, non-aqueous pharmaceutical solvents, aqueous pharmaceutical carriers, solid pharmaceutical carrier, and pharmaceutical preservatives/additives (antimicrobials, antioxidants, chelating agents, inert gases, additional flavoring agents, coloring agents).

75. The consumable product composition of embodiment 64 or 65, wherein the consumable product is an animal feed or animal food.

76. The consumable product composition of any one of embodiments 64 to 75, wherein the composition X as defined in any one of embodiments 1 to 17 is present in the consumable product composition in an amount effective to modify, mask, reduce and/or suppress an unpleasant off-taste, aftertaste or lingering sweetness of at least one sweetener, a sweetness enhancer or a consumable product, wherein the amount is less than a taste threshold concentration associated with the composition.

77. The consumable product composition of any one of embodiments 64 to 75, wherein the composition X as defined in any one of embodiments 1 to 17 is present in the consumable product composition in an amount effective to modify, mask, reduce and/or suppress an unpleasant off-taste, aftertaste or lingering sweetness of at least one sweetener, a sweetness enhancer or a consumable product, wherein the amount of the composition X is less than a taste threshold concentration associated with the composition X and wherein the effect of the composition X remains at least as long as the taste of the sweetener, the sweetness enhancer or the consumable product are perceived.

78. The consumable product composition of embodiment 77, wherein the unpleasant off-taste of the sweetener, the sweetness enhancer or the consumable product is an acidic off-taste, an astringent off-taste, a bitter off-taste, a liquorice off-taste, a metallic off-taste or a throat-burning off-taste.

79. The consumable product composition of embodiment 77, wherein the unpleasant aftertaste of the sweetener, the sweetness enhancer or the consumable product is an astringent or bitter aftertaste.
80. The consumable product composition of any one of embodiments 64 to 75, wherein the composition X as defined in any one of embodiments 1 to 17 is present in an amount effective to impart rich taste to a consumable product.
81. The consumable product composition of any one of embodiments 64 to 75, wherein the composition X as defined in any one of embodiments 1 to 17 is present in the consumable product composition in a concentration from 0.01 wppm to 50 wppm, in particular from 0.7 wppm to 6 wppm.
82. The consumable product composition of any one of embodiments 64 to 75, wherein the sweetener composition as defined in any one of embodiments 15 to 45 is present in the consumable product composition in a concentration from 0.1 wppm to 900 wppm, in particular from 70 wppm to 440 wppm.
83. The consumable product composition of embodiment 65 comprising the sweetener composition as defined in any one of embodiments 27 to 31.
84. The consumable product composition of embodiment 83, wherein the sweetener composition is present in an amount ranging from 110 wppm to 270 wppm, in particular, from 130 wppm to 270 wppm.
85. The consumable product composition of embodiment 83, wherein the consumable product is a tea drink and the sweetener composition is present in an amount ranging from 110 wppm to 270 wppm.
86. The consumable product composition of embodiment 83, wherein the consumable product is a carbonated soft drink and the sweetener composition is present in an amount ranging from 130 wppm to 270 wppm.
87. The consumable product composition of embodiment 83, wherein the consumable product is a juice drink and the sweetener composition is present in an amount ranging from 130 wppm to 270 wppm.
88. The consumable product of embodiment 83, wherein the consumable product composition has a reduced amount of sugar and/or calories.
89. The consumable product composition of embodiment 65 comprising the sweetener composition 32 to 35.
90. The consumable product composition of embodiment 89, wherein the sweetener composition is present in an amount ranging from 70 wppm to 440 wppm, in particular, from 200 wppm to 440 wppm.
91. The consumable product composition of embodiment 89, wherein the consumable product is a tea drink and the sweetener composition is present in an amount ranging from 230 wppm to 400 wppm.
92. The consumable product composition of embodiment 89, wherein the consumable product is a near water drink and the sweetener composition is present in an amount ranging from 70 wppm to 150 wppm.
93. The consumable product composition of embodiment 89, wherein the consumable product is a carbonated soft drink and the sweetener composition is present in an amount ranging from 310 wppm to 440 wppm.
94. The consumable product composition of embodiment 89, wherein the consumable product is a juice drink and the sweetener composition is present in an amount ranging from 310 wppm to 440 wppm.
95. The consumable product composition of embodiment 89, wherein the consumable product is a nectar and the sweetener composition is present in an amount ranging from 200 wppm to 340 wppm.
96. The consumable product of embodiments 91 to 95, wherein the consumable product composition has a reduced amount of sugar and/or calories.
97. The consumable product of embodiments 91 to 95, wherein the consumable product composition comprises substantially no sugar and/or calories.
98. The consumable product of embodiments 91 to 95, wherein the consumable product composition comprises no sugar and/or calories.
99. The consumable product composition of any one of embodiments 66 to 71, wherein the tabletop sweetener composition as defined in any one of embodiments 55 to 63 is present in the consumable product composition in a concentration from 0.1 wppm to 80 wppm.
100. The consumable product composition of any one of embodiments 66 to 71, wherein the sweetener composition or the tabletop sweetener composition comprises acesulfame potassium.
101. The consumable product composition of any one of embodiments 66 to 71, wherein the sweetener composition or the tabletop sweetener composition comprises acesulfame potassium and sucralose.
102. The consumable product composition of any one of embodiments 66 to 71, wherein the sweetener composition or the tabletop sweetener composition comprises acesulfame potassium and thaumatin.
103. The consumable product composition of embodiment 65, wherein the consumable product is a beverage and the sweetener composition comprises acesulfame potassium, sucralose and the composition X as defined in any one of embodiments 1 to 17.
104. A method of modifying, masking, reducing and/or suppressing an unpleasant off-taste, aftertaste or lingering sweetness of a consumable product composition, comprising the step of adding to a consumable product the composition X as defined in any one of embodiments 1 to 17 in an amount effective to modify, mask, reduce or suppress the unpleasant off-taste, aftertaste or lingering sweetness of at least one sweetener, a sweetness enhancer or a consumable product, that is less than the composition's taste threshold concentration.
105. The method of embodiment 104, wherein the amount of the composition X is less than the composition X's taste threshold concentration and wherein the effect of the composition X remains at least as long as the taste of the consumable product is perceived.
106. A method of imparting rich taste to a consumable product, comprising adding to a consumable product the composition X as defined in any one of embodiments 1 to 17.
107. The method of embodiment 104 or 105, wherein the composition X as defined in any one of embodiments 1 to 17 shall be contained in the consumable product in an amount of 0.01 wppm to 50 wppm.
108. Use of a composition X as defined in any one of embodiments 1 to 17 for modifying, masking, reducing and/or suppressing an unpleasant off-taste, aftertaste or lingering sweetness of at least one sweetener, at least one sweetness enhancer or a consumable product.
109. The use of embodiment 108, wherein the amount of the composition X in the sweetener composition as defined in any one of embodiments 19 to 50 is less than a taste threshold concentration associated with the composition X and wherein the effect of the composition X remains at least as long as the taste of the at least one sweetener, the at least one sweetness enhancer or the consumable product are perceived.

110. The use of embodiment 108 or 109, wherein the unpleasant off-taste of the sweetener, the sweetness enhancer or a consumable product is an acidic off-taste, an astringent off-taste, a bitter off-taste, a liquorice off-taste, a metallic off-taste or a throat-burning off-taste.

111. The use of embodiment 110, wherein the unpleasant aftertaste of the sweetener, the sweetness enhancer or the consumable product is an astringent or bitter aftertaste.

112. Use of a composition X as defined in any one of embodiments 1 to 17 for imparting rich taste to a consumable product.

113. A method of sweetening a consumable product composition, comprising the step of adding to a consumable product the composition X as defined in any one of embodiments 1 to 17 to yield a sweetened consumable product composition, wherein the sweetened consumable product has substantially no unpleasant off-taste, aftertaste or lingering sweetness.

114. The method of embodiment 113, comprising the step of adding to a consumable product the composition X as defined in any one of embodiments 1 to 17 in an amount effective to modify, mask, reduce or suppress the unpleasant off-taste, aftertaste or lingering sweetness of at least one sweetener, a sweetness enhancer or a consumable product, that is less than the composition X's taste threshold concentration, to yield a sweetened consumable product composition, wherein the sweetened consumable product has substantially no unpleasant off-taste, aftertaste or lingering sweetness.

115. The method of embodiment 114, wherein the sweetened consumable product has a rich taste.

116. A method of providing a sweetener or sweetness enhancer composition, comprising the step of adding to a sweetener or sweetness enhancer the composition X as defined in any one of embodiments 1 to 17 to yield a sweetener or sweetness enhancer composition, wherein the sweetener or sweetness enhancer composition has substantially no unpleasant off-taste, aftertaste or lingering sweetness.

117. The method of embodiment 116, comprising the step of adding to a sweetener or sweetness enhancer the composition X as defined in any one of embodiments 1 to 17 to yield a sweetener or sweetness enhancer composition, wherein the sweetener or sweetness enhancer composition has substantially no unpleasant off-taste, aftertaste or lingering sweetness.

118. A solution comprising
(a) a solvent; and
(b) a composition X as defined in any one of embodiments 1 to 17.

119. The solution of embodiment 118, wherein the composition X is present in an amount ranging from 0.01 wppm to 1000 wppm, based on the total weight of the solution.

120. The solution of embodiment 118 or 119, wherein the solvent comprises a consumable organic solvent, a consumable inorganic solvent and/or a consumable polar solvent.

121. The solution of embodiments 118-120, wherein the solvent is water.

122. The solution of embodiments 118-121, further comprising at least one sweetener and/or sweetness enhancer.

123. The solution of embodiment 122, wherein the at least one sweetener and/or sweetness enhancer comprises acesulfame potassium.

We claim:

1. A composition X comprising the following substances:
L-valine present in an amount ranging from 0.01 wt % to 0.09 wt %;
maltol present in an amount ranging from 30 wt % to 80 wt %;
naringin present in an amount from 15 wt % to 55 wt %;
acetoin present in an amount ranging from 0.005 wt % to 0.09 wt %;
delta dodecalactone present in an amount ranging from 0.5 wt % to 1.5 wt %;
delta decalactone present in an amount ranging from 0.06 wt % to 0.6 wt %; and
massoia lactone present in an amount from 0.06 wt % to 0.7 wt %,
wherein the weight percentages are based on the total weight of the composition X.

2. The composition X of claim 1, wherein the composition X further comprises the following substance:
diacetyl.

3. The composition X of claim 1, wherein massoia lactone is (R)-5,6-dihydro-6-pentyl-2H-pyran-2-one.

4. The composition X of claim 1, wherein at least one of the substances is of natural origin.

5. The composition X of claim 1, further comprising at least one additional substance.

6. The composition X of claim 5, wherein the at least one additional substance comprises:
L-alanine;
L-leucine;
glycine;
L-aspartic acid;
L-threonine;
L-isoleucine;
L-tyrosine;
L-proline;
L-serine;
L-glutamic acid;
taurine;
syringaldehyde;
delta undecalactone;
whiskey lactone; and
delta tetradecalactone.

7. The composition X of claim 6, wherein whiskey lactone is a mixture of cis-3-methyl-4-octanolide(cis-whiskey lactone) and trans-3-methyl-4-octanolide(trans-whiskey lactone).

8. A sweetener composition, comprising
(a) at least one sweetener comprising acesulfame potassium; and
(b) a composition X comprising the following substances:
L-valine present in an amount ranging from 0.01 wt % to 0.09 wt %;
maltol present in an amount ranging from 30 wt % to 80 wt %;
naringin present in an amount from 15 wt % to 55 wt %;
acetoin present in an amount ranging from 0.005 wt % to 0.09 wt %;
delta dodecalactone present in an amount ranging from 0.5 wt % to 1.5 wt %;
delta decalactone present in an amount ranging from 0.06 wt % to 0.6 wt %; and
massoia lactone present in an amount from 0.06 wt % to 0.7 wt %,
wherein the weight percentages are based on the total weight of the composition X.

9. The sweetener composition of claim 8, wherein the at least one sweetener further comprises an additional sweetener selected from the group consisting of abiziasaponin, abrusosides, advantame, albiziasaponin, alitame, aspartame, superaspartame, bayunosides, brazzein, bryoside, bryonoside, bryonodulcoside, carnosifloside, carrelame, curculin, cyanin, chlorogenic acid, cyclamates and its salts, cyclocaryoside I, dihydroquercetin-3-acetate, dihydroflavenol, dulcoside, gaudichaudioside, glycyrrhizin, glycyrrhetin acid, gypenoside, hematoxylin, hernandulcin, isomogrosides, lugduname, magap, mabinlins, micraculin, mogrosides (lo han guo), monatin and its derivatives, monellin, mukurozioside, naringin dihydrochalcone (NarDHC), neohesperidin dihydrochalcone (NDHC), neotame, osladin, pentadin, periandrin I-V, perillartine, D-phenylalanine, phlomisosides, phloridzin, phyllodulcin, polpodiosides, polypodoside A, pterocaryosides, rebaudiosides, rubusosides, saccharin and its salts and derivatives, scandenoside, selligueanin A, siamenosides, *stevia*, steviolbioside, stevioside and other steviol glycosides, strogines, suavioside A, suavioside B, suavioside G, suavioside H, suavioside I, suavioside J, sucralose, sucronate, sucrooctate, talin, telosmoside $A_{15}$, thaumatin, trans-anethol, trans-cinnamaldehyde, trilobatin and D-tryptophane, including extracts or enriched fractions of the natural sweeteners.

10. The sweetener composition of claim 8, wherein the at least one sweetener further comprises an additional sweetener selected from the group consisting of aspartame, sucralose and thaumatin.

11. The sweetener composition of claim 8, wherein the at least one sweetener comprises acesulfame potassium and sucralose.

12. The sweetener composition of claim 8, wherein the at least one sweetener comprises acesulfame potassium and thaumatin.

13. The sweetener composition of claim 8, wherein the amount of the substances in the sweetener composition is below their taste threshold concentration.

14. The sweetener composition of claim 8, comprising from 80 wt % to 99.5 wt % of the at least one sweetener based on the total weight of the sweetener composition.

15. The sweetener composition of claim 8, comprising from 0.5 wt % to 20 wt % of the composition X based on the total weight of the sweetener composition.

16. A method of modifying, masking, reducing and/or suppressing the unpleasant off-taste, aftertaste or lingering sweetness of at least one sweetener or sweetness enhancer, the method comprising combining with the at least one sweetener or sweetness enhancer comprising acesulfame potassium a composition X comprising the following substances:
L-valine present in an amount ranging from 0.01 wt % to 0.09 wt %;
maltol present in an amount ranging from 30 wt % to 80 wt %;
naringin present in an amount from 15 wt % to 55 wt %;
acetoin present in an amount ranging from 0.005 wt % to 0.09 wt %;
delta dodecalactone present in an amount ranging from 0.5 wt % to 1.5 wt %;
delta decalactone present in an amount ranging from 0.06 wt % to 0.6 wt %; and
massoia lactone present in an amount from 0.06 wt % to 0.7 wt %,
wherein the weight percentages are based on the total weight of the composition X.

17. A tabletop sweetener composition comprising
(a) at least one sugar sweetener selected from the group consisting of monosaccharides, disaccharides, oligosaccharides and polysaccharides;
(b) at least one sugar alcohol (or polyol) selected from the group consisting of erythritol, galactitol, hydrogenated starch syrups including maltitol and sorbitol syrups, inositols, isomalt, lactitol, maltitol, mannitol, xylitol, and combinations thereof;
(c) at least one additional sweetener comprising acesulfame potassium; and
(d) an amount of a composition X comprising the following substances:
L-valine present in an amount ranging from 0.01 wt % to 0.09 wt %;
maltol present in an amount ranging from 30 wt % to 80 wt %;
naringin present in an amount from 15 wt % to 55 wt %;
acetoin present in an amount ranging from 0.005 wt % to 0.09 wt %;
delta dodecalactone present in an amount ranging from 0.5 wt % to 1.5 wt %;
delta decalactone present in an amount ranging from 0.06 wt % to 0.6 wt %; and
massoia lactone present in an amount from 0.06 wt % to 0.7 wt %,
wherein the weight percentages are based on the total weight of the composition X.

18. A consumable product composition comprising
(a) a consumable product; and
(b) a composition X comprising the following substances:
L-valine present in an amount ranging from 0.01 wt % to 0.09 wt %;
maltol present in an amount ranging from 30 wt % to 80 wt %;
naringin present in an amount from 15 wt % to 55 wt %;
acetoin present in an amount ranging from 0.005 wt % to 0.09 wt %;
delta dodecalactone present in an amount ranging from 0.5 wt % to 1.5 wt %;
delta decalactone present in an amount ranging from 0.06 wt % to 0.6 wt %; and
massoia lactone present in an amount from 0.06 wt % to 0.7 wt %,
wherein the weight percentages are based on the total weight of the composition X.

19. The consumable product composition of claim 18, wherein the consumable product is selected from water-based consumables, solid dry consumables, dairy products, dairy-derived products and dairy-alternative products.

20. A consumable product composition comprising
(a) a consumable product; and
(b) a sweetener composition comprising
a sweetener comprising acesulfame potassium; and
a composition X comprising the following substances:
L-valine present in an amount ranging from 0.01 wt % to 0.09 wt %;
maltol present in an amount ranging from 30 wt % to 80 wt %;
naringin present in an amount from 15 wt % to 55 wt %;
acetoin present in an amount ranging from 0.005 wt % to 0.09 wt %;
delta dodecalactone present in an amount ranging from 0.5 wt % to 1.5 wt %;
delta decalactone present in an amount ranging from 0.06 wt % to 0.6 wt %; and massoia lactone present in an amount from 0.06 wt % to 0.7 wt %,
wherein the weight percentages are based on the total weight of the composition X.

21. The consumable product composition of claim 20, wherein the consumable product is selected from water-based consumables, solid dry consumables, dairy products, dairy-derived products and dairy-alternative products.

22. The consumable product composition of claim 20, wherein the consumable product is a beverage and the sweetener composition comprises acesulfame potassium and sucralose.

* * * * *